United States Patent
Shin et al.

(10) Patent No.: US 11,778,608 B2
(45) Date of Patent: Oct. 3, 2023

(54) METHOD FOR TRANSMITTING UPLINK DATA IN WIRELESS COMMUNICATION SYSTEM SUPPORTING NARROWBAND INTERNET OF THINGS, AND APPARATUS THEREFOR

(71) Applicant: LG ELECTRONICS INC., Seoul (KR)

(72) Inventors: Seokmin Shin, Seoul (KR); Seonwook Kim, Seoul (KR); Changhwan Park, Seoul (KR); Hanjun Park, Seoul (KR); Joonkui Ahn, Seoul (KR); Suckchel Yang, Seoul (KR); Seunggye Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 129 days.

(21) Appl. No.: 17/267,491

(22) PCT Filed: Aug. 8, 2019

(86) PCT No.: PCT/KR2019/009987
§ 371 (c)(1),
(2) Date: Feb. 9, 2021

(87) PCT Pub. No.: WO2020/032629
PCT Pub. Date: Feb. 13, 2020

(65) Prior Publication Data
US 2021/0274526 A1      Sep. 2, 2021

(30) Foreign Application Priority Data

Aug. 9, 2018  (KR) .................. 10-2018-0092737
Aug. 9, 2018  (KR) .................. 10-2018-0092756

(Continued)

(51) Int. Cl.
*H04W 72/1268*    (2023.01)
*H04W 76/27*      (2018.01)
(Continued)

(52) U.S. Cl.
CPC ....... *H04W 72/1268* (2013.01); *H04W 76/27* (2018.02); *G16Y 10/40* (2020.01);
(Continued)

(58) Field of Classification Search
CPC ............ H04W 72/1268; H04W 76/27; H04W 72/042; H04W 52/0229; H04W 52/0216;
(Continued)

(56) References Cited

U.S. PATENT DOCUMENTS

2016/0366682 A1* 12/2016 Tseng ................ H04W 72/0446
2020/0146042 A1*  5/2020 Suzuki ................ H04W 16/24
(Continued)

OTHER PUBLICATIONS

Samsung, Discussion on transmission in preconfigured UL resources for MTC, 3GPP TSG RAN WG1 Meeting #95, Spokane, USA, Nov. 12-16, 2018, R1-1812940 (Year: 2018).*
(Continued)

*Primary Examiner* — Shailendra Kumar
(74) *Attorney, Agent, or Firm* — LEE HONG DEGERMAN KANG WAIMEY

(57) ABSTRACT

According to an embodiment of the present disclosure, a method for transmitting, by a user equipment (UE), uplink data in a wireless communication system supporting a narrowband Internet of things (NB-IoT) system includes: receiving information related to a preconfigured uplink (UL) resource (PUR) for transmitting the uplink data in an RRC connected state; and transmitting the uplink data by using the preconfigured uplink resource (PUR) in an RRC idle state. In the transmitting of the uplink data, when the preconfigured UL resource (PUR) is a dedicated resource
(Continued)

and there is no data to be transmitted in the preconfigured UL resource (PUR), transmission of the uplink data is skipped.

11 Claims, 17 Drawing Sheets

(30) Foreign Application Priority Data

Sep. 24, 2018 (KR) .................. 10-2018-0114524
Nov. 2, 2018 (KR) .................. 10-2018-0133996
Nov. 12, 2018 (KR) .................. 10-2018-0138075

(51) Int. Cl.
| | | |
|---|---|---|
| *G16Y 10/80* | (2020.01) | |
| *G16Y 10/40* | (2020.01) | |
| *G16Y 10/60* | (2020.01) | |
| *H04J 11/00* | (2006.01) | |
| *H04L 5/14* | (2006.01) | |
| *H04L 27/26* | (2006.01) | |
| *H04W 72/23* | (2023.01) | |

(52) U.S. Cl.
CPC .............. *G16Y 10/60* (2020.01); *G16Y 10/80* (2020.01); *H04J 11/0069* (2013.01); *H04L 5/14* (2013.01); *H04L 27/2602* (2013.01); *H04L 27/2607* (2013.01); *H04W 72/23* (2023.01)

(58) Field of Classification Search
CPC ......... H04W 52/0241; H04W 56/0045; H04W 56/0055; G16Y 10/40; G16Y 10/60; G16Y 10/80; H04J 11/0069; H04L 5/14; H04L 27/2602; H04L 27/2607; H04L 1/1812; H04L 1/1896; H04L 5/0044; H04L 5/0094; Y02D 30/07
See application file for complete search history.

(56) References Cited

U.S. PATENT DOCUMENTS

2022/0007391 A1* 1/2022 Höglund ........... H04W 72/1268
2022/0094508 A1* 3/2022 Keating ................. H04B 7/063

OTHER PUBLICATIONS

ZTE Corporation, Sanechips, Remaining issues for UL aspects of D-PUR in IDLE, 3GPP TSG-RAN2 meeting#106, Reno, Nevada, USA, May 13-17, 2019, R2-1905642 (Year: 2019).*
Ericsson, New WID on Rel-16 MTC enhancements for LTE, 3GPP TSG RAN Meeting #80, La Jolla, USA, Jun. 11-14, 2018, RP-181450. (Year: 2018).*
Huawei, Summary of email discussion [99#42][NB-IoT] on SPS options, 3GPP TSG-RAN WG2 Meeting#99bis, Prague, Czech Republic, Oct. 9-13, 2017, R2-1711329 (Year: 2017).*
Ericsson, "NEW WID on Rel-16 MTC enhancements for LTE," 3GPP TSG-RAN #80, RP-181450, Jun. 2018, 4 pages.
Huawei, "Summary of email discussion [99#42][NB-IoT]," 3GPP TSG-RAN WG2 #99bis, R2-1711329, Oct. 2017, 23 pages.
Samsung, "HARQ for autonomous UL access," 3GPP TSG-RAN WG1 #90, R1-1713523, Aug. 2017, 3 pages.
Mediatek Inc., "NB-IoT Idle mode SPS for M2M regular reporting," 3GPP TSG-RAN WG2 #101, R2-1802617, Mar. 2018, 5 pages.
PCT International Application No. PCT/KR2019/009987, International Search Report dated Dec. 11, 2019, 3 pages.
European Patent Office Application Serial No. 19846205.3, Search Report dated Oct. 13, 2021, 9 pages.
Samsung, "Discussion on transmission in preconfigured UL resources for MTC," 3GPP TSG RAN WG1 Meeting #95, R1-1812940, Nov. 2018, 6 pages.
ZTE Corporation et al., "Remaining issues for UL aspects of D-PUR in Idle," 3GPP TSG-RAN2 meeting#106, R2-1905642, May 2019, 7 pages.

* cited by examiner

[FIG. 1]
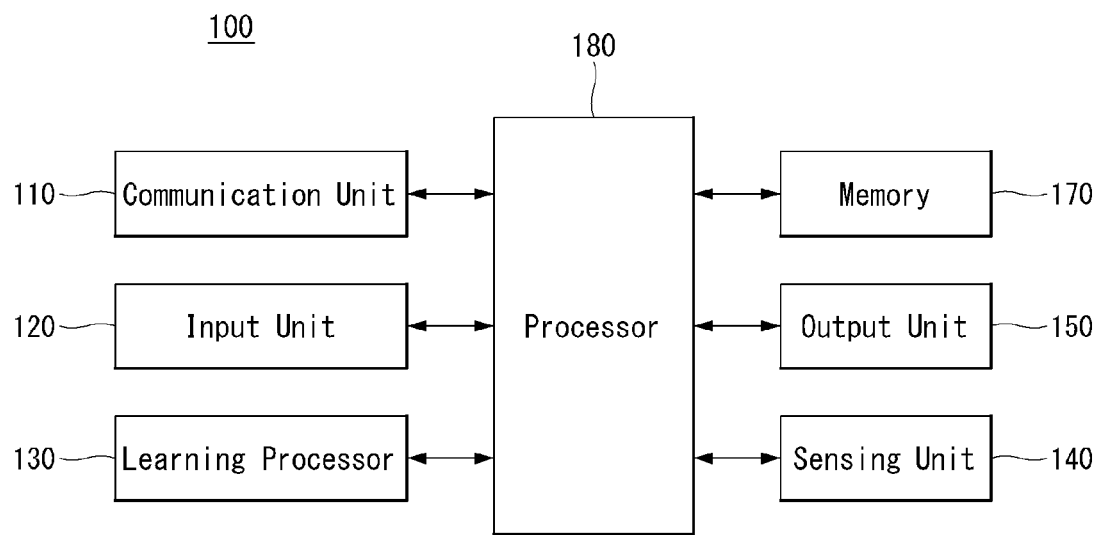

[FIG. 2]
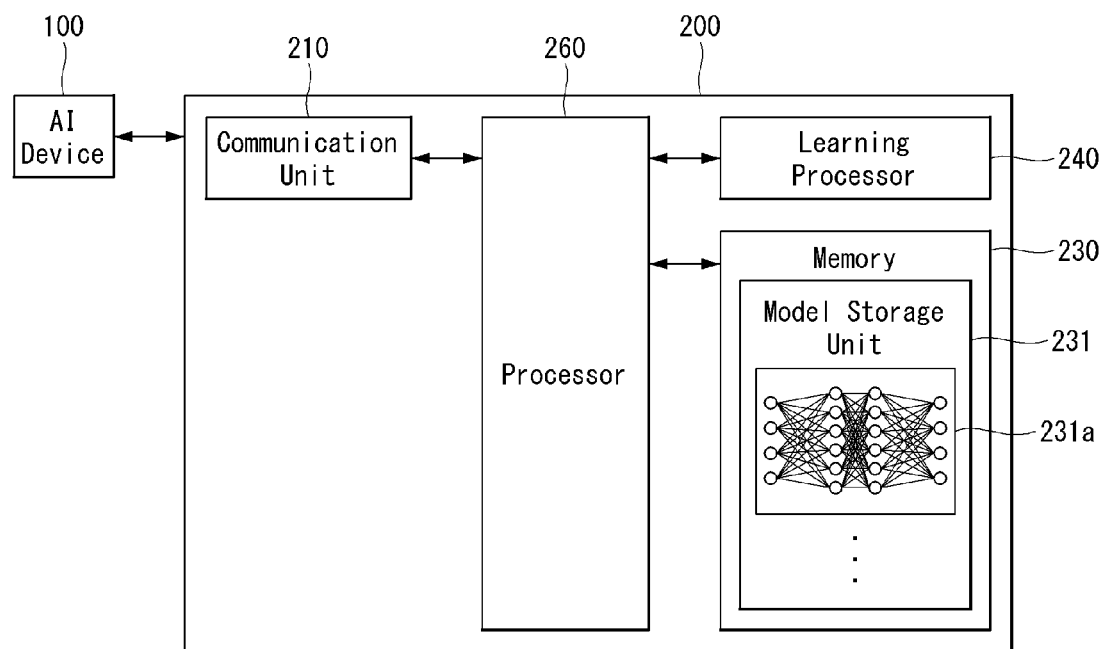

[FIG. 3]
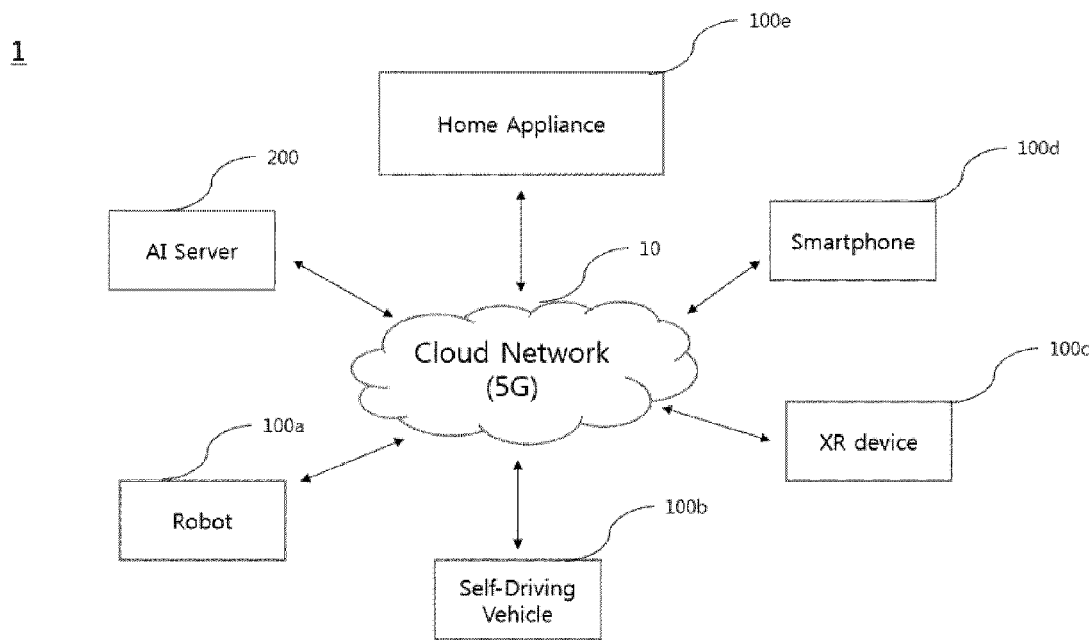

[FIG. 4]
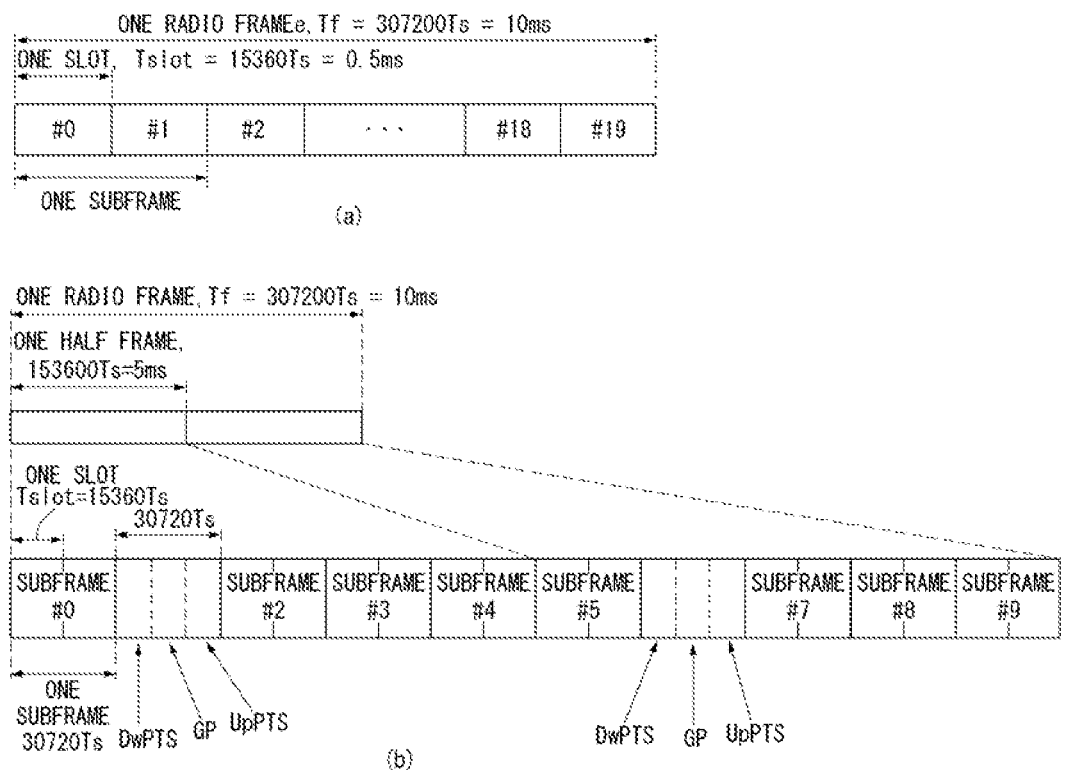

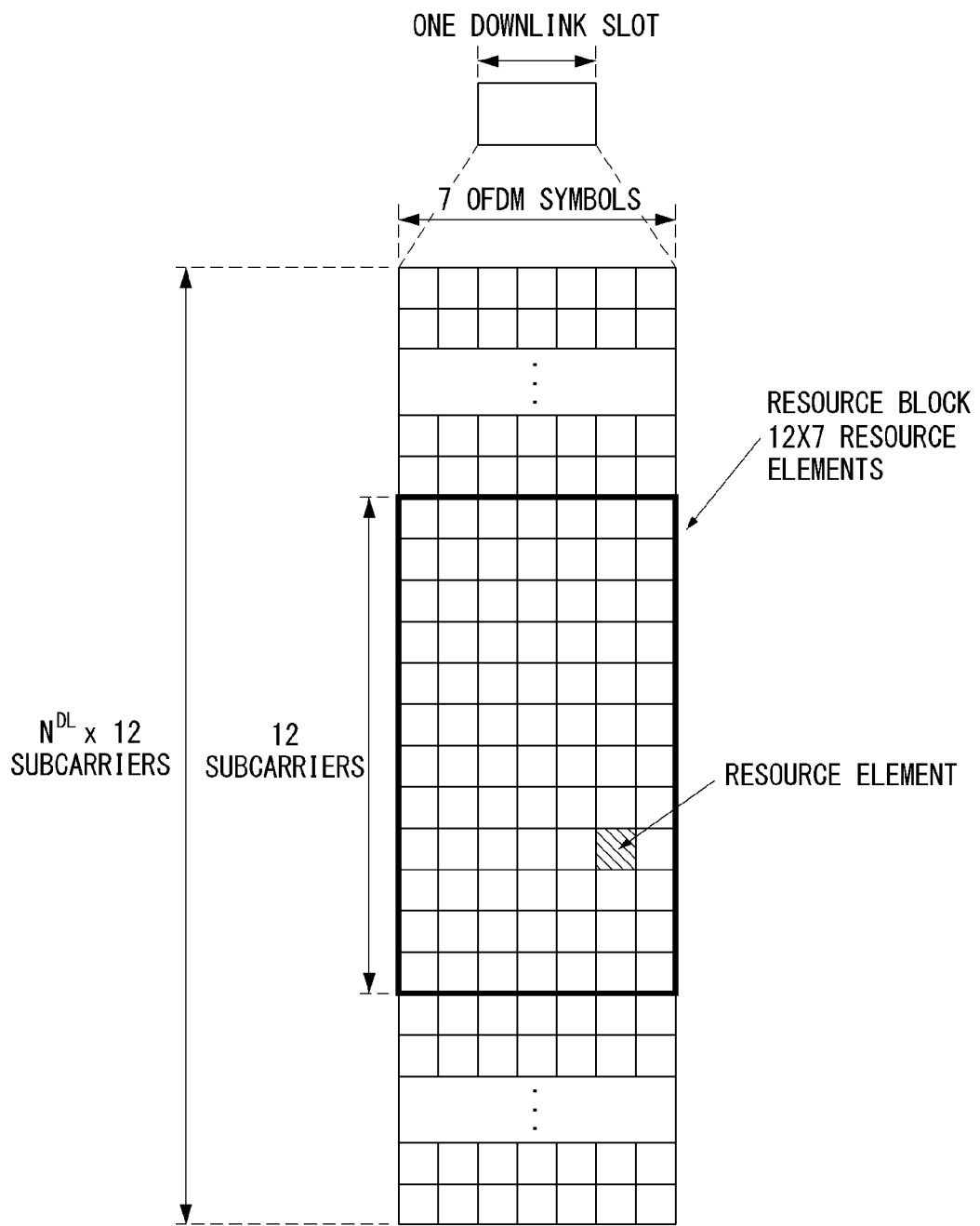
[FIG. 5]

[FIG. 6]
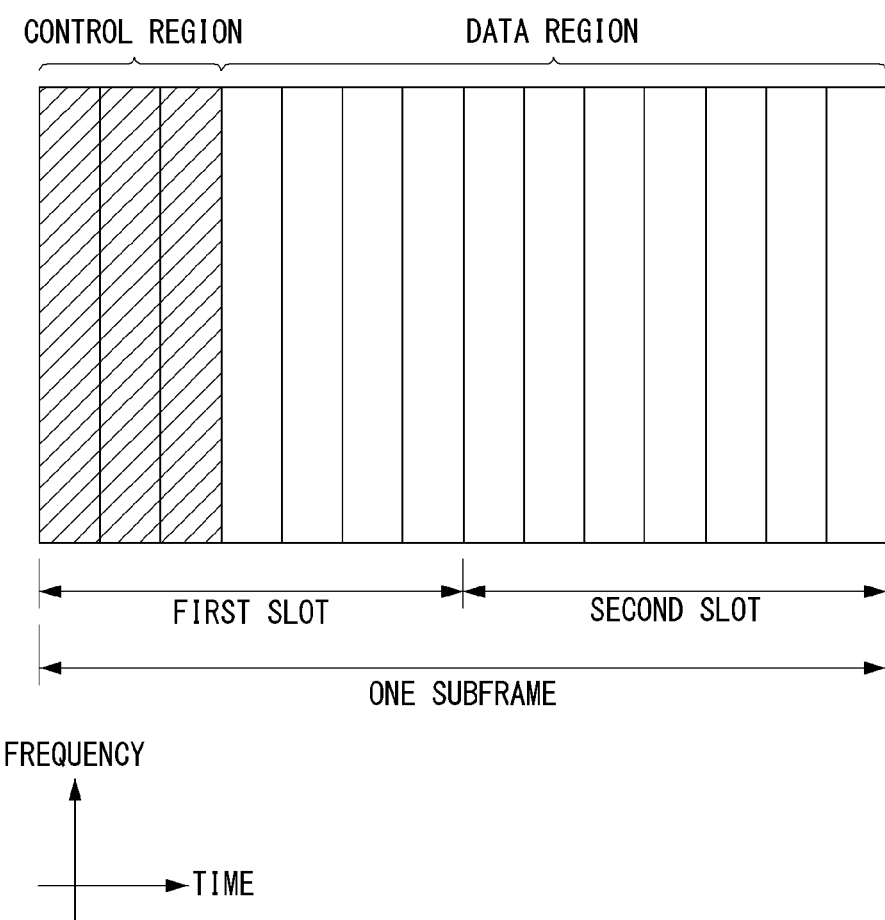

[FIG. 7]
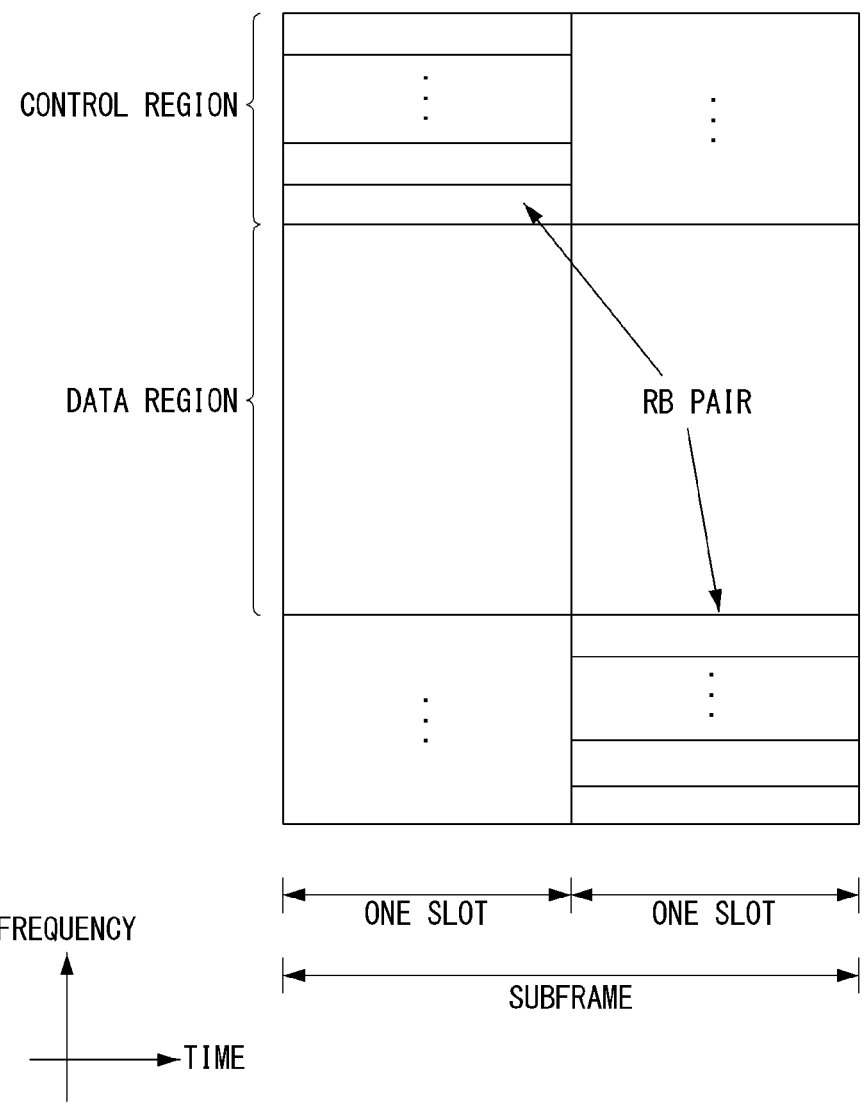

[FIG. 8]
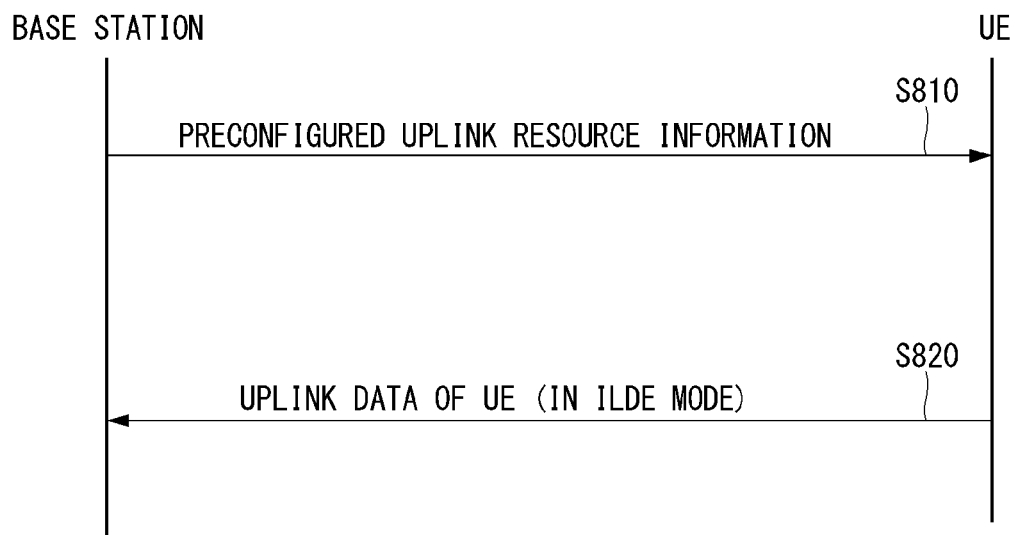

[FIG. 9]
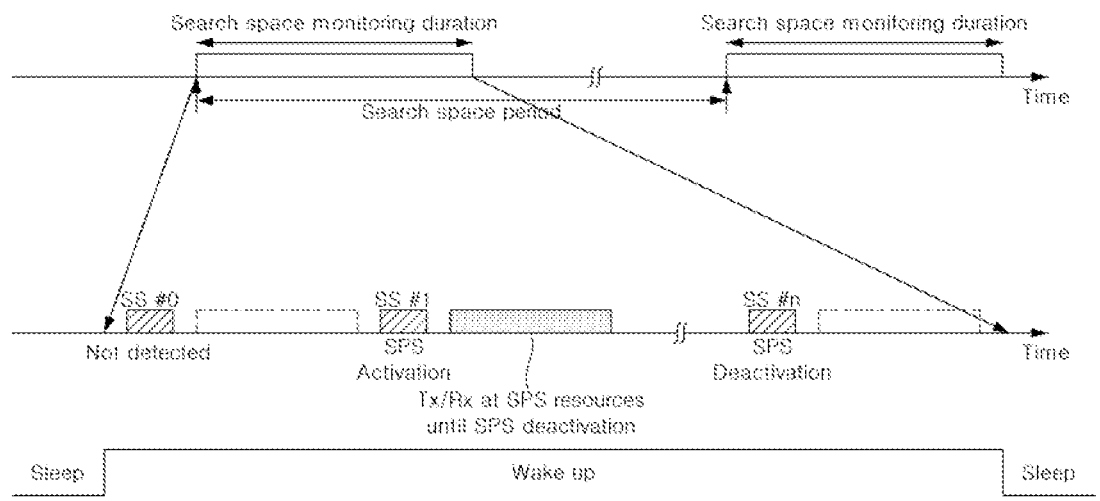

[FIG. 10]
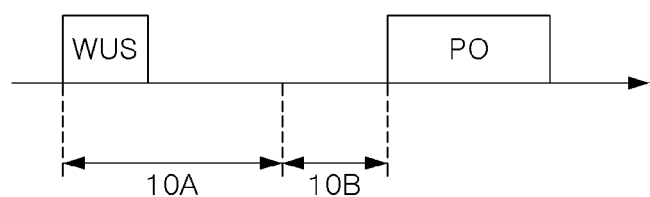

[FIG. 11]
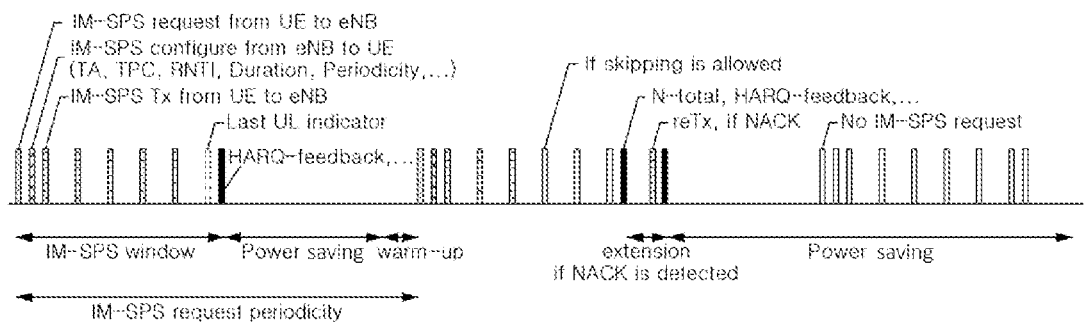

[FIG. 12]
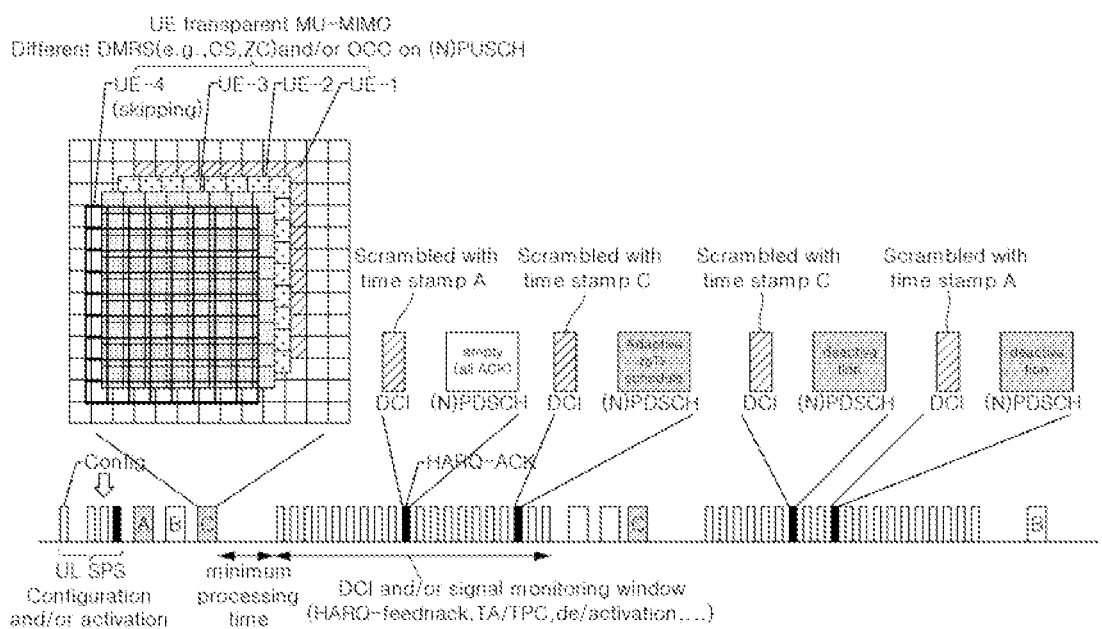

[FIG. 13]
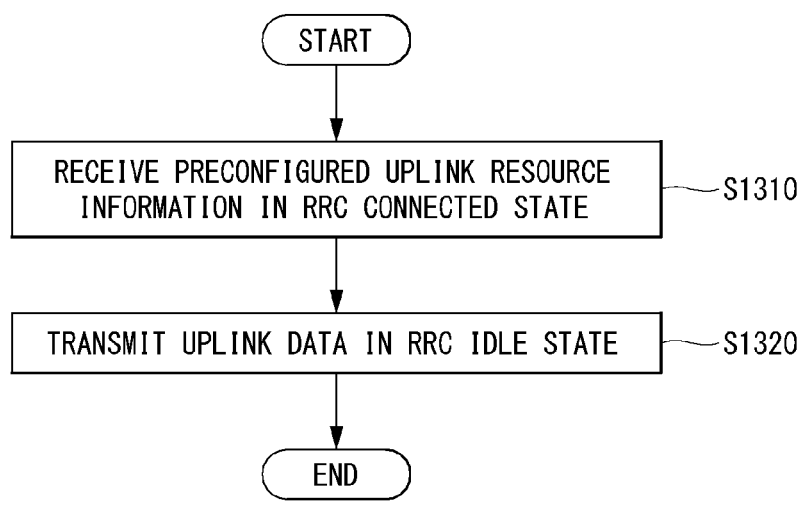

[FIG. 14]
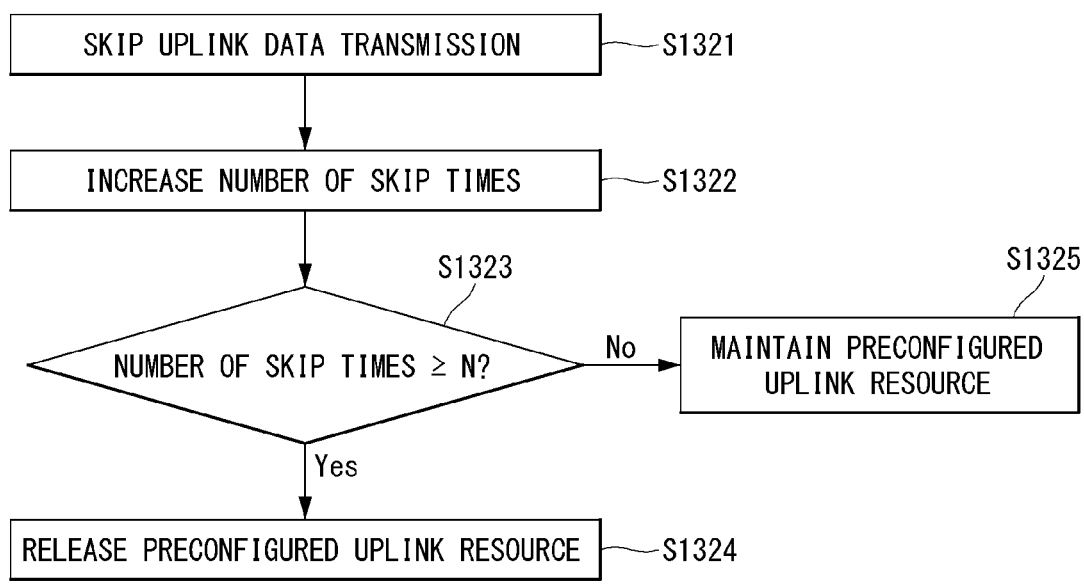

[FIG. 15]
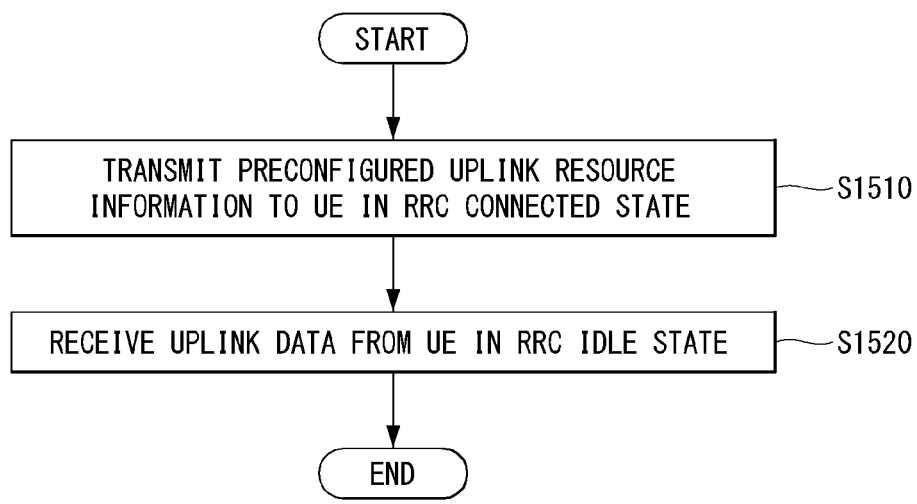

[FIG. 16]
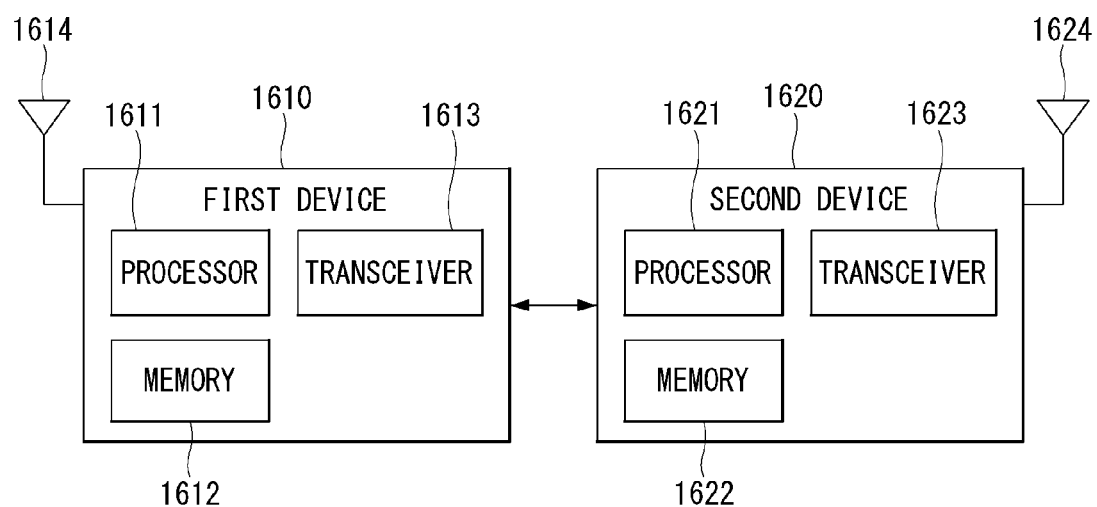

[FIG. 17]
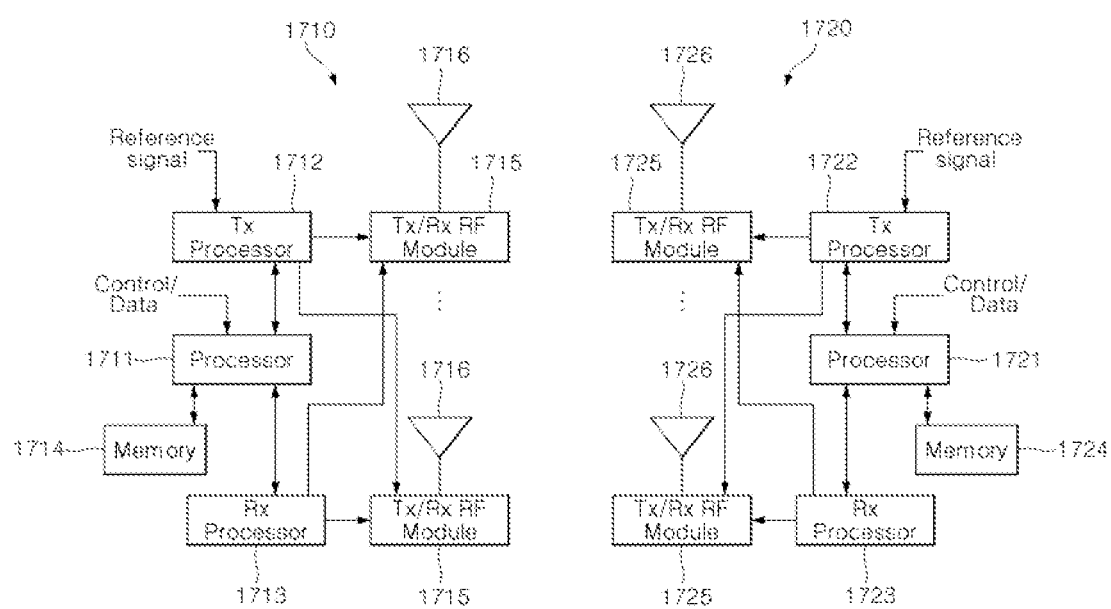

METHOD FOR TRANSMITTING UPLINK DATA IN WIRELESS COMMUNICATION SYSTEM SUPPORTING NARROWBAND INTERNET OF THINGS, AND APPARATUS THEREFOR

CROSS-REFERENCE TO RELATED APPLICATIONS

This application is the National Stage filing under 35 U.S.C. 371 of International Application No. PCT/KR2019/009987, filed on Aug. 8, 2019, which claims the benefit of earlier filing date and right of priority to Korean Application Nos. 10-2018-0092737, filed on Aug. 9, 2018, 10-2018-0092756, filed on Aug. 9, 2018, 10-2018-0114524, filed on Sep. 24, 2018, 10-2018-0133996, filed on Nov. 2, 2018, and 10-2018-0138075, filed on Nov. 12, 2018, the contents of which are all incorporated by reference herein in their entireties.

TECHNICAL FIELD

The present disclosure relates to a method for transmitting uplink data in a wireless communication system supporting a narrowband Internet of things system, and an apparatus therefor.

BACKGROUND ART

Mobile communication systems have been developed to provide voice services, while ensuring activity of users. However, coverage of the mobile communication systems has been extended up to data services, as well as voice service, and currently, an explosive increase in traffic has caused shortage of resources, and since users expect relatively high speed services, an advanced mobile communication system is required.

Requirements of a next-generation mobile communication system include accommodation of explosive data traffic, a significant increase in a transfer rate per user, accommodation of considerably increased number of connection devices, very low end-to-end latency, and high energy efficiency. To this end, there have been researched various technologies such as dual connectivity, massive multiple input multiple output (MIMO), in-band full duplex, non-orthogonal multiple access (NOMA), super wideband, device networking, and the like.

DISCLOSURE

Technical Problem

An embodiment of the present disclosure provides a method for transmitting uplink data, which is capable of performing a semi-persistent scheduling operation in a wireless communication system supporting a narrowband Internet of things, and an apparatus therefor.

Furthermore, an embodiment of the present disclosure is to effectively release a semi-persistent scheduling configuration.

Furthermore, an embodiment of the present disclosure is to effectively utilize a preconfigured UL resource (PUR).

Furthermore, an embodiment of the present disclosure is to normally perform operations related to tracking of a timing advance (TA) and a semi-persistent scheduling (SPS) configuration even when transmission of uplink data is skipped in the preconfigured uplink resource (PUR).

The technical objects of the present disclosure are not limited to the aforementioned technical objects, and other technical objects, which are not mentioned above, will be apparently appreciated by a person having ordinary skill in the art from the following description.

Technical Solution

According to an embodiment of the present disclosure, a method for transmitting, by a user equipment (UE), uplink data in a wireless communication system supporting a narrowband Internet of things (NB-IoT) system includes: receiving information related to a preconfigured uplink (UL) resource (PUR) for transmitting the uplink data in an RRC connected state; and transmitting the uplink data by using the preconfigured uplink resource (PUR) in an RRC idle state. In the transmitting of the uplink data, when the preconfigured UL resource (PUR) is a dedicated resource and there is no data to be transmitted in the preconfigured UL resource (PUR), transmission of the uplink data is skipped.

When the transmission of the uplink data is skipped for a predetermined number of times or more, the preconfigured uplink resource (PUR) is released.

When the preconfigured uplink resource (PUR) is released, the UE transmits information indicating the release in the preconfigured uplink resource (PUR) positioned at a timing after the transmission of the uplink data is skipped by the predetermined number of times.

Only when the transmission of the uplink data is consecutively skipped for the predetermined number of times or more, the preconfigured uplink resource (PUR) is released.

When the transmission of the uplink data is skipped, the number of skip times is counted and when the uplink data is transmitted in the preconfigured uplink resource (PUR), the number of skip times is initialized.

In the transmitting of the uplink data, when the transmission of the uplink data is skipped in the preconfigured uplink resource (PUR), skip related information indicating the skip is transmitted.

The skip related information is transmitted in one region of the preconfigured uplink resource (PUR).

The skip related information includes information on the number of times related to the skip of the uplink data transmission and is transmitted only once when the uplink data transmission is consecutively skipped for a multiple number of times.

In a resource region corresponding to the skip of the multiple number of times among regions according to the preconfigured uplink resource (PUR), uplink data of another UE in the RRC idle state is transmitted.

The transmitting of the uplink data further includes receiving a narrow physical downlink control channel (NPDCCH) in the RRC idle state, and the narrow physical downlink control channel (NPDCCH) includes information indicating disable of the skip.

In the transmitting of the uplink data, when the skip is disabled, a specific signal is transmitted in the preconfigured uplink resource (PUR).

The specific signal is a signal for tracking of a timing advance (TA) related to a transmission timing of the uplink data or a signal related to confirmation of setting or release of the preconfigured uplink resource (PUR).

The signal for the tracking of the timing advance (TA) is a demodulation reference signal (DMRS) for demodulation of the uplink data or a narrowband physical random access channel (NPRACH) preamble.

According to another embodiment of the present disclosure, a user equipment (UE) for transmitting uplink data in a wireless communication system supporting a narrowband Internet of things (NB-IoT) system includes: a transceiver transceiving a radio signal; a memory; and a processor connected to the transceiver and the memory.

The processor is configured to: receive information related to a preconfigured UL resource (PUR) for transmitting the uplink data in an RRC connected state, and transmit the uplink data by using the preconfigured uplink resource (PUR) in an RRC idle state.

The processor may be configured to skip transmission of the uplink data when the preconfigured UL resource (PUR) is a dedicated resource and there is no data to be transmitted in the preconfigured UL resource (PUR).

When the transmission of the uplink data is skipped for a predetermined number of times or more, the preconfigured uplink resource (PUR) is released.

Only when the transmission of the uplink data is consecutively skipped for the predetermined number of times or more, the preconfigured uplink resource (PUR) is released.

According to yet another embodiment of the present disclosure, an apparatus for transmitting uplink data in a wireless communication system supporting a narrowband Internet of things (NB-IoT) system includes: a memory; and a processor connected to the memory.

The processor is configured to: receive information related to a preconfigured UL resource (PUR) for transmitting the uplink data in an RRC connected state, and transmit the uplink data by using the preconfigured uplink resource (PUR) in an RRC idle state.

The processor may be configured to skip transmission of the uplink data when the preconfigured UL resource (PUR) is a dedicated resource and there is no data to be transmitted in the preconfigured UL resource (PUR).

Advantageous Effects

Since the information related to the preconfigured UL resource (PUR) is transmitted through radio resource control (RRC) signaling in the present disclosure, and as a result, the UE in the RRC idle state may transmit the uplink data. Therefore, in the present disclosure, complexity may be reduced and power consumption may be reduced.

Furthermore, in the present disclosure, when there is no data to be transmitted in the preconfigured uplink resource (PUR), the transmission of the uplink data is skipped and when the transmission of the uplink data is skipped for a predetermined number of times or more, the preconfigured uplink resource (PUR) is released. Therefore, since the UE need not separately receive release information from the base station, battery performance of the UE may be improved in the present disclosure.

Furthermore, in the present disclosure, when the transmission of the uplink data is consecutively skipped for a predetermined number of times or more, the preconfigured uplink resource (PUR) is released, and as a result, the UE in the RRC idle state need not re-enter the RRC connected state for reconfiguration of the preconfigured uplink resource (PUR). Therefore, in the present disclosure, even when the transmission of the uplink data is intermittently skipped, the number of skipping times is accumulated to prevent the SPS configuration from being released, thereby further saving power consumed in the UE.

Furthermore, in the present disclosure, when the transmission of the uplink data is consecutively skipped for a multiple number of times, in a resource region corresponding to the skip of the multiple number of times among regions according to the preconfigured uplink resource (PUR), uplink data of another UE in the RRC idle state may be transmitted. Therefore, resource utilization may be increased when the preconfigured uplink resource (PUR) is configured to be UE specific Furthermore, in the present disclosure, when the skip of the uplink data transmission is disabled, the specific signal is transmitted, and as a result, it is possible to confirm TA tracking or the configuration or release of the preconfigured uplink resource (PUR) by using the specific signal. Therefore, in the present disclosure, it is possible to minimize an influence which the skip of the uplink data transmission exerts on the semi-persistent scheduling (SPS) operation.

Effects obtainable in the present disclosure are not limited to the aforementioned effects and other unmentioned effects will be clearly understood by those skilled in the art from the following description.

DESCRIPTION OF DRAWINGS

FIG. 1 illustrates an artificial intelligence (AI) device 100 according to an embodiment of the present disclosure.

FIG. 2 illustrates an AI server 200 according to an embodiment of the present disclosure.

FIG. 3 illustrates an AI system 1 according to an embodiment of the present disclosure.

FIG. 4 illustrates a structure of a radio frame in a wireless communication system to which the disclosure is applicable.

FIG. 5 is a diagram illustrating a resource grid for one downlink slot in a wireless communication system to which the present disclosure is applicable.

FIG. 6 illustrates a structure of a downlink subframe in a wireless communication system to which the present disclosure is applicable.

FIG. 7 illustrates a structure of an uplink subframe in a wireless communication system to which the present disclosure is applicable.

FIG. 8 is a flowchart for describing an example of signaling for applying a semi-persistent scheduling operation according to an embodiment of the present disclosure.

FIG. 9 is a diagram for describing a search space in relation to a semi-persistent scheduling operation according to an embodiment of the present disclosure.

FIG. 10 is a diagram for describing a wake up signal in relation to a semi-persistent scheduling operation according to an embodiment of the present disclosure.

FIG. 11 is a diagram for describing an RACH procedure in relation to a semi-persistent scheduling operation according to an embodiment of the present disclosure.

FIG. 12 is a diagram for describing a shared resource configured in relation to a semi-persistent scheduling operation according to an embodiment of the present disclosure.

FIG. 13 is a flowchart for describing a method for transmitting, by a UE, uplink data in a wireless communication system supporting a narrowband Internet of things system according to an embodiment of the present disclosure.

FIG. 14 is a diagram for specifically describing an operation related to skip of uplink data transmission according to an embodiment of the present disclosure.

FIG. 15 is a flowchart for describing a method for receiving, by a base station, uplink data in a wireless communication system supporting a narrowband Internet of things system according to another embodiment of the present disclosure.

FIG. 16 illustrates a wireless communication device to which methods proposed by the present disclosure are applicable according to another embodiment of the present disclosure.

FIG. 17 illustrates another example of a block diagram of a wireless communication device to which methods proposed by the present disclosure are applicable.

MODE FOR INVENTION

Reference will now be made in detail to embodiments of the disclosure, examples of which are illustrated in the accompanying drawings. Wherever possible, the same reference numbers will be used throughout the drawings to refer to the same or like parts. In general, a suffix such as "module" and "unit" may be used to refer to elements or components. Use of such a suffix herein is merely intended to facilitate description of the disclosure, and the suffix itself is not intended to give any special meaning or function. It will be noted that a detailed description of known arts will be omitted if it is determined that the detailed description of the known arts can obscure the embodiments of the disclosure. The accompanying drawings are used to help easily understand various technical features and it should be understood that embodiments presented herein are not limited by the accompanying drawings. As such, the disclosure should be construed to extend to any alterations, equivalents and substitutes in addition to those which are particularly set out in the accompanying drawings.

In the present disclosure, a base station means a terminal node of a network directly performing communication with a terminal. In the present document, specific operations described to be performed by the base station may be performed by an upper node of the base station in some cases. That is, it is apparent that in the network constituted by multiple network nodes including the base station, various operations performed for communication with the terminal may be performed by the base station or other network nodes other than the base station. A base station (BS) may be generally substituted with terms such as a fixed station, Node B, evolved-NodeB (eNB), a base transceiver system (BTS), an access point (AP), and the like. Further, a 'terminal' may be fixed or movable and be substituted with terms such as user equipment (UE), a mobile station (MS), a user terminal (UT), a mobile subscriber station (MSS), a subscriber station (SS), an advanced mobile station (AMS), a wireless terminal (WT), a Machine-Type Communication (MTC) device, a Machine-to-Machine (M2M) device, a Device-to-Device (D2D) device, and the like.

Hereinafter, a downlink means communication from the base station to the terminal and an uplink means communication from the terminal to the base station. In the downlink, a transmitter may be a part of the base station and a receiver may be a part of the terminal. In the uplink, the transmitter may be a part of the terminal and the receiver may be a part of the base station.

Specific terms used in the following description are provided to help appreciating the disclosure and the use of the specific terms may be modified into other forms within the scope without departing from the technical spirit of the disclosure.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as Global System for Mobile communications (GSM)/General Packet Radio Service (GPRS)/Enhanced Data Rates for GSM Evolution (EDGE). The OFDMA may be implemented as radio technology such as IEEE 802.11 (Wi-Fi), IEEE 802.16 (WiMAX), IEEE 802-20, E-UTRA (Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

The embodiments of the disclosure may be based on standard documents disclosed in at least one of IEEE 802, 3GPP, and 3GPP2 which are the wireless access systems. That is, steps or parts which are not described to definitely show the technical spirit of the disclosure among the embodiments of the disclosure may be based on the documents. Further, all terms disclosed in the document may be described by the standard document.

3GPP LTE/LTE-A/NR is primarily described for clear description, but technical features of the disclosure are not limited thereto.

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link having ultra-reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver can drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system can support remote treatment providing clinical treatment at a distant place. This helps to reduce a barrier for the distance and can improve access to medical services which are not continuously used at remote farming areas. Furthermore, this is used to save life in important treatment and an emergency condition. A radio sensor network based on mobile communication can provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

The disclosure described below can be implemented by combining or modifying respective embodiments to meet the above-described requirements of 5G.

The following describes in detail technical fields to which the disclosure described below is applicable.

Artificial Intelligence (AI)

Artificial intelligence means the field in which artificial intelligence or methodology capable of producing artificial intelligence is researched. Machine learning means the field in which various problems handled in the artificial intelligence field are defined and methodology for solving the problems are researched. Machine learning is also defined as an algorithm for improving performance of a task through continuous experiences for the task.

An artificial neural network (ANN) is a model used in machine learning, and is configured with artificial neurons (nodes) forming a network through a combination of synapses, and may mean the entire model having a problem-solving ability. The artificial neural network may be defined by a connection pattern between the neurons of different layers, a learning process of updating a model parameter, and an activation function for generating an output value.

The artificial neural network may include an input layer, an output layer, and optionally one or more hidden layers. Each layer includes one or more neurons. The artificial neural network may include a synapse connecting neurons.

In the artificial neural network, each neuron may output a function value of an activation function for input signals, weight, and a bias input through a synapse.

A model parameter means a parameter determined through learning, and includes the weight of a synapse connection and the bias of a neuron. Furthermore, a hyper parameter means a parameter that needs to be configured prior to learning in the machine learning algorithm, and includes a learning rate, the number of times of repetitions, a mini-deployment size, and an initialization function.

An object of learning of the artificial neural network may be considered to determine a model parameter that minimizes a loss function. The loss function may be used as an index for determining an optimal model parameter in the learning process of an artificial neural network.

Machine learning may be classified into supervised learning, unsupervised learning, and reinforcement learning based on a learning method.

Supervised learning means a method of training an artificial neural network in the state in which a label for learning data has been given. The label may mean an answer (or a result value) that must be deduced by an artificial neural network when learning data is input to the artificial neural network. Unsupervised learning may mean a method of training an artificial neural network in the state in which a label for learning data has not been given. Reinforcement learning may mean a learning method in which an agent defined within an environment is trained to select a behavior or behavior sequence that maximizes accumulated compensation in each state.

Machine learning implemented as a deep neural network (DNN) including a plurality of hidden layers, among artificial neural networks, is also called deep learning. Deep learning is part of machine learning. Hereinafter, machine learning is used as a meaning including deep learning.

Robot

A robot may mean a machine that automatically processes a given task or operates based on an autonomously owned ability. Particularly, a robot having a function for recognizing an environment and autonomously determining and performing an operation may be called an intelligence type robot.

A robot may be classified for industry, medical treatment, home, and military based on its use purpose or field.

A robot includes a driving unit including an actuator or motor, and may perform various physical operations, such as moving a robot joint. Furthermore, a movable robot includes a wheel, a brake, a propeller, etc. in a driving unit, and may run on the ground or fly in the air through the driving unit.

Self-Driving (Autonomous-Driving)

Self-driving means a technology for autonomous driving. A self-driving vehicle means a vehicle that runs without a user manipulation or by a user's minimum manipulation.

For example, self-driving may include all of a technology for maintaining a driving lane, a technology for automatically controlling speed, such as adaptive cruise control, a technology for automatic driving along a predetermined path, a technology for automatically configuring a path when a destination is set and driving.

A vehicle includes all of a vehicle having only an internal combustion engine, a hybrid vehicle including both an internal combustion engine and an electric motor, and an electric vehicle having only an electric motor, and may include a train, a motorcycle, etc. in addition to the vehicles.

In this case, the self-driving vehicle may be considered to be a robot having a self-driving function.

Extended Reality (XR)

Extended reality collectively refers to virtual reality (VR), augmented reality (AR), and mixed reality (MR). The VR technology provides an object or background of the real world as a CG image only. The AR technology provides a virtually produced CG image on an actual thing image. The MR technology is a computer graphics technology for mixing and combining virtual objects with the real world and providing them.

The MR technology is similar to the AR technology in that it shows a real object and a virtual object. However, in the AR technology, a virtual object is used in a form to supplement a real object. In contrast, unlike in the AR technology, in the MR technology, a virtual object and a real object are used as the same character.

The XR technology may be applied to a head-mount display (HMD), a head-up display (HUD), a mobile phone, a tablet PC, a laptop, a desktop, TV, and a digital signage. A device to which the XR technology has been applied may be called an XR device.

FIG. 1 illustrates an AI device 100 according to an embodiment of the present disclosure.

The AI device 100 may be implemented as a fixed device or mobile device, such as TV, a projector, a mobile phone, a smartphone, a desktop computer, a notebook, a terminal for digital broadcasting, a personal digital assistants (PDA), a portable multimedia player (PMP), a navigator, a tablet PC, a wearable device, a set-top box (STB), a DMB receiver, a radio, a washing machine, a refrigerator, a desktop computer, a digital signage, a robot, and a vehicle.

Referring to FIG. 1, the terminal 100 may include a communication unit 110, an input unit 120, a learning processor 130, a sensing unit 140, an output unit 150, a memory 170, and a processor 180.

The communication unit 110 may transmit and receive data to and from external devices, such as other AI devices 100a to 100er or an AI server 200, using wired and wireless communication technologies. For example, the communication unit 110 may transmit and receive sensor information, a user input, a learning model, and a control signal to and from external devices.

In this case, communication technologies used by the communication unit 110 include a global system for mobile communication (GSM), code division multi access (CDMA), long term evolution (LTE), 5G, a wireless LAN (WLAN), wireless-fidelity (Wi-Fi), Bluetooth™, radio frequency identification (RFID), infrared data association (IrDA), ZigBee, near field communication (NFC), etc.

The input unit 120 may obtain various types of data.

In this case, the input unit 120 may include a camera for an image signal input, a microphone for receiving an audio signal, a user input unit for receiving information from a user, etc. In this case, the camera or the microphone is treated as a sensor, and a signal obtained from the camera or the microphone may be called sensing data or sensor information.

The input unit 120 may obtain learning data for model learning and input data to be used when an output is obtained using a learning model. The input unit 120 may obtain not-processed input data. In this case, the processor 180 or the learning processor 130 may extract an input feature by performing pre-processing on the input data.

The learning processor 130 may be trained by a model configured with an artificial neural network using learning data. In this case, the trained artificial neural network may be called a learning model. The learning model is used to deduce a result value of new input data not learning data. The deduced value may be used as a base for performing a given operation.

In this case, the learning processor 130 may perform AI processing along with the learning processor 240 of the AI server 200.

In this case, the learning processor 130 may include memory integrated or implemented in the AI device 100. Alternatively, the learning processor 130 may be implemented using the memory 170, external memory directly coupled to the AI device 100 or memory maintained in an external device.

The sensing unit 140 may obtain at least one of internal information of the AI device 100, surrounding environment information of the AI device 100, or user information using various sensors.

In this case, sensors included in the sensing unit 140 include a proximity sensor, an illumination sensor, an acceleration sensor, a magnetic sensor, a gyro sensor, an inertia sensor, an RGB sensor, an IR sensor, a fingerprint recognition sensor, an ultrasonic sensor, a photo sensor, a microphone, LIDAR, and a radar.

The output unit 150 may generate an output related to a visual sense, an auditory sense or a tactile sense.

In this case, the output unit 150 may include a display unit for outputting visual information, a speaker for outputting auditory information, and a haptic module for outputting tactile information.

The memory 170 may store data supporting various functions of the AI device 100. For example, the memory 170 may store input data obtained by the input unit 120, learning data, a learning model, a learning history, etc.

The processor 180 may determine at least one executable operation of the AI device 100 based on information, determined or generated using a data analysis algorithm or a machine learning algorithm. Furthermore, the processor 180 may perform the determined operation by controlling elements of the AI device 100.

To this end, the processor 180 may request, search, receive, and use the data of the learning processor 130 or the memory 170, and may control elements of the AI device 100 to execute a predicted operation or an operation determined to be preferred, among the at least one executable operation.

In this case, if association with an external device is necessary to perform the determined operation, the processor 180 may generate a control signal for controlling the corresponding external device and transmit the generated control signal to the corresponding external device.

The processor 180 may obtain intention information for a user input and transmit user requirements based on the obtained intention information.

In this case, the processor 180 may obtain the intention information, corresponding to the user input, using at least one of a speech to text (STT) engine for converting a voice input into a text string or a natural language processing (NLP) engine for obtaining intention information of a natural language.

In this case, at least some of at least one of the STT engine or the NLP engine may be configured as an artificial neural network trained based on a machine learning algorithm. Furthermore, at least one of the STT engine or the NLP engine may have been trained by the learning processor 130, may have been trained by the learning processor 240 of the AI server 200 or may have been trained by distributed processing thereof.

The processor 180 may collect history information including the operation contents of the AI device 100 or the feedback of a user for an operation, may store the history information in the memory 170 or the learning processor 130, or may transmit the history information to an external device, such as the AI server 200. The collected history information may be used to update a learning model.

The processor 18 may control at least some of the elements of the AI device 100 in order to execute an application program stored in the memory 170. Moreover, the processor 180 may combine and drive two or more of the elements included in the AI device 100 in order to execute the application program.

FIG. 2 illustrates an AI server 200 according to an embodiment of the disclosure.

Referring to FIG. 2, the AI server 200 may mean a device which is trained by an artificial neural network using a machine learning algorithm or which uses a trained artificial neural network. In this case, the AI server 200 is configured with a plurality of servers and may perform distributed processing and may be defined as a 5G network. In this case, the AI server 200 may be included as a partial configuration of the AI device 100, and may perform at least some of AI processing.

The AI server 200 may include a communication unit 210, a memory 230, a learning processor 240 and a processor 260.

The communication unit 210 may transmit and receive data to and from an external device, such as the AI device 100.

The memory 230 may include a model storage unit 231. The model storage unit 231 may store a model (or artificial neural network 231*a*) which is being trained or has been trained through the learning processor 240.

The learning processor 240 may train the artificial neural network 231*a* using learning data. The learning model may be used in the state in which it has been mounted on the AI server 200 of the artificial neural network or may be mounted on an external device, such as the AI device 100, and used.

The learning model may be implemented as hardware, software or a combination of hardware and software. If some of or the entire learning model is implemented as software, one or more instructions configuring the learning model may be stored in the memory 230.

The processor 260 may deduce a result value of new input data using the learning model, and may generate a response or control command based on the deduced result value.

FIG. 3 illustrates an AI system 1 according to an embodiment of the present disclosure.

Referring to FIG. 3, the AI system 1 is connected to at least one of the AI server 200, a robot 100*a*, a self-driving vehicle 100*b*, an XR device 100*c*, a smartphone 100*d* or home appliances 100*e* over a cloud network 10. In this case, the robot 100*a*, the self-driving vehicle 100*b*, the XR device 100*c*, the smartphone 100*d* or the home appliances 100*e* to which the AI technology has been applied may be called AI devices 100*a* to 100*e*.

The cloud network 10 may configure part of cloud computing infra or may mean a network present within cloud computing infra. In this case, the cloud network 10 may be configured using the 3G network, the 4G or long term evolution (LTE) network or the 5G network.

That is, the devices 100*a* to 100*e* (200) configuring the AI system 1 may be interconnected over the cloud network 10. Particularly, the devices 100*a* to 100*e* and 200 may communicate with each other through a base station, but may directly communicate with each other without the intervention of a base station.

The AI server 200 may include a server for performing AI processing and a server for performing calculation on big data.

The AI server 200 is connected to at least one of the robot 100a, the self-driving vehicle 100b, the XR device 100c, the smartphone 100d or the home appliances 100e, that is, AI devices configuring the AI system 1, over the cloud network 10, and may help at least some of the AI processing of the connected AI devices 100a to 100e.

In this case, the AI server 200 may train an artificial neural network based on a machine learning algorithm in place of the AI devices 100a to 100e, may directly store a learning model or may transmit the learning model to the AI devices 100a to 100e.

In this case, the AI server 200 may receive input data from the AI devices 100a to 100e, may deduce a result value of the received input data using the learning model, may generate a response or control command based on the deduced result value, and may transmit the response or control command to the AI devices 100a to 100e.

Alternatively, the AI devices 100a to 100e may directly deduce a result value of input data using a learning model, and may generate a response or control command based on the deduced result value.

Hereinafter, various embodiments of the AI devices 100a to 100e to which the above-described technology is applied are described. In this case, the AI devices 100a to 100e shown in FIG. 4 may be considered to be detailed embodiments of the AI device 100 shown in FIG. 2.

AI+Robot to which the Disclosure can be Applied

An AI technology is applied to the robot 100a, and the robot 100a may be implemented as a guidance robot, a transport robot, a cleaning robot, a wearable robot, an entertainment robot, a pet robot, an unmanned flight robot, etc.

The robot 100a may include a robot control module for controlling an operation. The robot control module may mean a software module or a chip in which a software module has been implemented using hardware.

The robot 100a may obtain state information of the robot 100a, may detect (recognize) a surrounding environment and object, may generate map data, may determine a moving path and a running plan, may determine a response to a user interaction, or may determine an operation using sensor information obtained from various types of sensors.

In this case, the robot 100a may use sensor information obtained by at least one sensor among LIDAR, a radar, and a camera in order to determine the moving path and running plan.

The robot 100a may perform the above operations using a learning model configured with at least one artificial neural network. For example, the robot 100a may recognize a surrounding environment and object using a learning model, and may determine an operation using recognized surrounding environment information or object information. In this case, the learning model may have been directly trained in the robot 100a or may have been trained in an external device, such as the AI server 200.

In this case, the robot 100a may directly generate results using the learning model and perform an operation, but may perform an operation by transmitting sensor information to an external device, such as the AI server 200, and receiving results generated in response thereto.

The robot 100a may determine a moving path and running plan using at least one of map data, object information detected from sensor information, or object information obtained from an external device. The robot 100a may run along the determined moving path and running plan by controlling the driving unit.

The map data may include object identification information for various objects disposed in the space in which the robot 100a moves. For example, the map data may include object identification information for fixed objects, such as a wall and a door, and movable objects, such as a flowport and a desk. Furthermore, the object identification information may include a name, a type, a distance, a location, etc.

Furthermore, the robot 100a may perform an operation or run by controlling the driving unit based on a user's control/interaction. In this case, the robot 100a may obtain intention information of an interaction according to a user's behavior or voice speaking, may determine a response based on the obtained intention information, and may perform an operation.

AI+Self-Driving to which the Disclosure can be Applied

An AI technology is applied to the self-driving vehicle 100b, and the self-driving vehicle 100b may be implemented as a movable type robot, a vehicle, an unmanned flight body, etc.

The self-driving vehicle 100b may include a self-driving control module for controlling a self-driving function. The self-driving control module may mean a software module or a chip in which a software module has been implemented using hardware. The self-driving control module may be included in the self-driving vehicle 100b as an element of the self-driving vehicle 100b, but may be configured as separate hardware outside the self-driving vehicle 100b and connected to the self-driving vehicle 100b.

The self-driving vehicle 100b may obtain state information of the self-driving vehicle 100b, may detect (recognize) a surrounding environment and object, may generate map data, may determine a moving path and running plan, or may determine an operation using sensor information obtained from various types of sensors.

In this case, in order to determine the moving path and running plan, like the robot 100a, the self-driving vehicle 100b may use sensor information obtained from at least one sensor among LIDAR, a radar and a camera.

Particularly, the self-driving vehicle 100b may recognize an environment or object in an area whose view is blocked or an area of a given distance or more by receiving sensor information for the environment or object from external devices, or may directly receive recognized information for the environment or object from external devices.

The self-driving vehicle 100b may perform the above operations using a learning model configured with at least one artificial neural network. For example, the self-driving vehicle 100b may recognize a surrounding environment and object using a learning model, and may determine the flow of running using recognized surrounding environment information or object information. In this case, the learning model may have been directly trained in the self-driving vehicle 100b or may have been trained in an external device, such as the AI server 200.

In this case, the self-driving vehicle 100b may directly generate results using the learning model and perform an operation, but may perform an operation by transmitting sensor information to an external device, such as the AI server 200, and receiving results generated in response thereto.

The self-driving vehicle 100b may determine a moving path and running plan using at least one of map data, object information detected from sensor information or object information obtained from an external device. The self-driving vehicle 100b may run based on the determined moving path and running plan by controlling the driving unit.

The map data may include object identification information for various objects disposed in the space (e.g., road) in which the self-driving vehicle 100b runs. For example, the map data may include object identification information for fixed objects, such as a streetlight, a rock, and a building, etc., and movable objects, such as a vehicle and a pedestrian. Furthermore, the object identification information may include a name, a type, a distance, a location, etc.

Furthermore, the self-driving vehicle 100b may perform an operation or may run by controlling the driving unit based on a user's control/interaction. In this case, the self-driving vehicle 100b may obtain intention information of an interaction according to a user' behavior or voice speaking, may determine a response based on the obtained intention information, and may perform an operation.

AI+XR to which the Disclosure can be Applied

An AI technology is applied to the XR device 100c, and the XR device 100c may be implemented as a head-mount display, a head-up display provided in a vehicle, television, a mobile phone, a smartphone, a computer, a wearable device, home appliances, a digital signage, a vehicle, a fixed type robot or a movable type robot.

The XR device 100c may generate location data and attributes data for three-dimensional points by analyzing three-dimensional point cloud data or image data obtained through various sensors or from an external device, may obtain information on a surrounding space or real object based on the generated location data and attributes data, and may output an XR object by rendering the XR object. For example, the XR device 100c may output an XR object, including additional information for a recognized object, by making the XR object correspond to the corresponding recognized object.

The XR device 100c may perform the above operations using a learning model configured with at least one artificial neural network. For example, the XR device 100c may recognize a real object in three-dimensional point cloud data or image data using a learning model, and may provide information corresponding to the recognized real object. In this case, the learning model may have been directly trained in the XR device 100c or may have been trained in an external device, such as the AI server 200.

In this case, the XR device 100c may directly generate results using a learning model and perform an operation, but may perform an operation by transmitting sensor information to an external device, such as the AI server 200, and receiving results generated in response thereto.

AI+Robot+Self-Driving to which the Disclosure can be Applied

An AI technology and a self-driving technology are applied to the robot 100a, and the robot 100a may be implemented as a guidance robot, a transport robot, a cleaning robot, a wearable robot, an entertainment robot, a pet robot, an unmanned flight robot, etc.

The robot 100a to which the AI technology and the self-driving technology have been applied may mean a robot itself having a self-driving function or may mean the robot 100a interacting with the self-driving vehicle 100b.

The robot 100a having the self-driving function may collectively refer to devices that autonomously move along a given flow without control of a user or autonomously determine a flow and move.

The robot 100a and the self-driving vehicle 100b having the self-driving function may use a common sensing method in order to determine one or more of a moving path or a running plan. For example, the robot 100a and the self-driving vehicle 100b having the self-driving function may determine one or more of a moving path or a running plan using information sensed through LIDAR, a radar, a camera, etc.

The robot 100a interacting with the self-driving vehicle 100b is present separately from the self-driving vehicle 100b, and may perform an operation associated with a self-driving function inside or outside the self-driving vehicle 100b or associated with a user got in the self-driving vehicle 100b.

In this case, the robot 100a interacting with the self-driving vehicle 100b may control or assist the self-driving function of the self-driving vehicle 100b by obtaining sensor information in place of the self-driving vehicle 100b and providing the sensor information to the self-driving vehicle 100b, or by obtaining sensor information, generating surrounding environment information or object information, and providing the surrounding environment information or object information to the self-driving vehicle 100b.

Alternatively, the robot 100a interacting with the self-driving vehicle 100b may control the function of the self-driving vehicle 100b by monitoring a user got in the self-driving vehicle 100b or through an interaction with a user. For example, if a driver is determined to be a drowsiness state, the robot 100a may activate the self-driving function of the self-driving vehicle 100b or assist control of the driving unit of the self-driving vehicle 100b. In this case, the function of the self-driving vehicle 100b controlled by the robot 100a may include a function provided by a navigation system or audio system provided within the self-driving vehicle 100b, in addition to a self-driving function simply.

Alternatively, the robot 100a interacting with the self-driving vehicle 100b may provide information to the self-driving vehicle 100b or may assist a function outside the self-driving vehicle 100b. For example, the robot 100a may provide the self-driving vehicle 100b with traffic information, including signal information, as in a smart traffic light, and may automatically connect an electric charger to a filling inlet through an interaction with the self-driving vehicle 100b as in the automatic electric charger of an electric vehicle.

AI+Robot+XR to which the Disclosure can be Applied

An AI technology and an XR technology are applied to the robot 100a, and the robot 100a may be implemented as a guidance robot, a transport robot, a cleaning robot, a wearable robot, an entertainment robot, a pet robot, an unmanned flight robot, a drone, etc.

The robot 100a to which the XR technology has been applied may mean a robot, that is, a target of control/interaction within an XR image. In this case, the robot 100a is different from the XR device 100c, and they may operate in conjunction with each other.

When the robot 100a, that is, a target of control/interaction within an XR image, obtains sensor information from sensors including a camera, the robot 100a or the XR device 100c may generate an XR image based on the sensor information, and the XR device 100c may output the generated XR image. Furthermore, the robot 100a may operate based on a control signal received through the XR device 100c or a user's interaction.

For example, a user may identify a corresponding XR image at timing of the robot 100a, remotely operating in conjunction through an external device, such as the XR device 100c, may adjust the self-driving path of the robot 100a through an interaction, may control an operation or driving, or may identify information of a surrounding object.

AI+Self-Driving+XR to which the Disclosure can be Applied

An AI technology and an XR technology are applied to the self-driving vehicle 100b, and the self-driving vehicle 100b may be implemented as a movable type robot, a vehicle, an unmanned flight body, etc.

The self-driving vehicle 100b to which the XR technology has been applied may mean a self-driving vehicle equipped with means for providing an XR image or a self-driving vehicle, that is, a target of control/interaction within an XR image. Particularly, the self-driving vehicle 100b, that is, a target of control/interaction within an XR image, is different from the XR device 100c, and they may operate in conjunction with each other.

The self-driving vehicle 100b equipped with the means for providing an XR image may obtain sensor information from sensors including a camera, and may output an XR image generated based on the obtained sensor information. For example, the self-driving vehicle 100b includes an HUD, and may provide a passenger with an XR object corresponding to a real object or an object within a screen by outputting an XR image.

In this case, when the XR object is output to the HUD, at least some of the XR object may be output with it overlapping a real object toward which a passenger's view is directed. In contrast, when the XR object is displayed on a display included within the self-driving vehicle 100b, at least some of the XR object may be output so that it overlaps an object within a screen. For example, the self-driving vehicle 100b may output XR objects corresponding to objects, such as a carriageway, another vehicle, a traffic light, a signpost, a two-wheeled vehicle, a pedestrian, and a building.

When the self-driving vehicle 100b, that is, a target of control/interaction within an XR image, obtains sensor information from sensors including a camera, the self-driving vehicle 100b or the XR device 100c may generate an XR image based on the sensor information. The XR device 100c may output the generated XR image. Furthermore, the self-driving vehicle 100b may operate based on a control signal received through an external device, such as the XR device 100c, or a user's interaction.

FIG. 4 illustrates a structure of a radio frame in a wireless communication system to which the disclosure is applicable.

3GPP LTE/LTE-A support a radio frame structure type 1 which may be applicable to Frequency Division Duplex (FDD) and a radio frame structure which may be applicable to Time Division Duplex (TDD).

In FIG. 4, the size of the radio frame in the time domain is represented by a multiple of a time unit of $T\_s=1/(15000*2048)$. A UL and DL transmission includes the radio frame having a duration of $T\_F=307200*T\_s=10$ ms.

FIG. 4(a) illustrates frame structure type 1. The type 1 radio frame may be applied to both of full duplex FDD and half duplex FDD.

A radio frame includes 10 subframes. A radio frame includes 20 slots of $T\_slot=15360*T\_s=0.5$ ms length, and 0 to 19 indexes are given to each of the slots. One subframe includes consecutive two slots in the time domain, and subframe i includes slot 2i and slot 2i+1. The time required for transmitting a subframe is referred to as a transmission time interval (TTI). For example, the length of the subframe i may be 1 ms and the length of a slot may be 0.5 ms.

A UL transmission and a DL transmission in the FDD are distinguished in the frequency domain. Whereas there is no restriction in the full duplex FDD, a UE may not transmit and receive simultaneously in the half duplex FDD operation.

One slot includes a plurality of Orthogonal Frequency Division Multiplexing (OFDM) symbols in the time domain and includes a plurality of Resource Blocks (RBs) in a frequency domain. In 3GPP LTE, OFDM symbols are used to represent one symbol period because OFDMA is used in downlink. An OFDM symbol may be called one SC-FDMA symbol or symbol period. An RB is a resource allocation unit and includes a plurality of contiguous subcarriers in one slot.

FIG. 4(b) illustrates frame structure type 2.

A type 2 radio frame includes two half frame of $153600*T\_s=5$ ms length each. Each half frame includes 5 subframes of $30720*T\_s=1$ ms length.

In the frame structure type 2 of a TDD system, an uplink-downlink configuration is a rule indicating whether uplink and downlink are allocated (or reserved) to all subframes.

Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, in each subframe of the radio frame, 'D' represents a subframe for a DL transmission, 'U' represents a subframe for UL transmission, and 'S' represents a special subframe including three types of fields including a Downlink Pilot Time Slot (DwPTS), a Guard Period (GP), and a Uplink Pilot Time Slot (UpPTS).

A DwPTS is used for an initial cell search, synchronization or channel estimation in a UE. A UpPTS is used for channel estimation in an eNB and for synchronizing a UL transmission synchronization of a UE. A GP is duration for removing interference occurred in a UL owing to multi-path delay of a DL signal between a UL and a DL.

Each subframe i includes slot 2i and slot 2i+1 of $T\_slot=15360*T\_s=0.5$ ms.

The UL-DL configuration may be classified into 7 types, and the position and/or the number of a DL subframe, a special subframe and a UL subframe are different for each configuration.

A point when the downlink is changed to the uplink or a point when the uplink is switched to the downlink is referred to as a switching point. Switch-point periodicity means a period in which an aspect in which the uplink subframe and the downlink subframe are switched is similarly repeated and both 5 ms and 10 ms are supported. When the downlink-downlink switch-point periodicity is 5 ms, the special subframe S exists for each half-frame and when the downlink-uplink switch-point periodicity is 5 ms, the special subframe S exists only in a first half-frame.

In all configurations, subframes #0 and #5 and the DwPTS are periods only for the downlink transmission. The UpPTS and the subframe and a subframe immediately following the subframe are always periods for the uplink transmission.

The uplink-downlink configuration as system information may be known by both the base station and the UE. The base station transmits only an index of configuration information whenever the configuration information is changed to notify the UE of a change of an uplink-downlink assignment state of the radio frame. Further, the configuration information as a kind of downlink control information may be transmitted through a physical downlink control channel (PDCCH) similar to another scheduling information and as broadcast information may be commonly transmitted to all UEs in a cell through a broadcast channel.

Table 2 represents configuration (length of DwPTS/GP/UpPTS) of a special subframe.

Table 3 shows an example of NB-IoT parameters.

TABLE 3

| Subcarrier spacing | $N_{sc}^{UL}$ | $T_{slot}$ |
| --- | --- | --- |
| $\Delta f = 3.75$ kHz | 48 | $61440 \cdot T_s$ |
| $\Delta f = 15$ kHz | 12 | $15360 \cdot T_s$ |

Resource Unit

Resource units are used to describe the mapping of the NPUSCH to resource elements. A resource unit is defined as $N_{symb}^{UL} N_{slots}^{UL}$ consecutive SC-FDMA symbols in the time domain and $N_{sc}^{RU}$ consecutive subcarriers in the frequency domain, where $N_{sc}^{RU}$ and $N_{symb}^{UL}$ are given by Table 4.

Table 4 shows an example of supported combinations of $N_{sc}^{RU}$, $N_{slots}^{UL}$, and $N_{symb}^{UL}$.

TABLE 2

| | Normal cyclic prefix in downlink | | | Extended cyclic prefix in downlink | | |
| --- | --- | --- | --- | --- | --- | --- |
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_S$ | $2192 \cdot T_S$ | $2560 \cdot T_S$ | $7680 \cdot T_S$ | $2192 \cdot T_S$ | $2560 \cdot T_S$ |
| 1 | $19760 \cdot T_S$ | | | $20480 \cdot T_S$ | | |
| 2 | $21952 \cdot T_S$ | | | $23040 \cdot T_S$ | | |
| 3 | $24144 \cdot T_S$ | | | $25600 \cdot T_S$ | | |
| 4 | $26336 \cdot T_S$ | | | $7680 \cdot T_S$ | $4384 \cdot T_S$ | $5120 \cdot T_S$ |
| 5 | $6592 \cdot T_S$ | $4384 \cdot T_S$ | $5120 \cdot T_S$ | $20480 \cdot T_S$ | | |
| 6 | $19760 \cdot T_S$ | | | $23040 \cdot T_S$ | | |
| 7 | $21952 \cdot T_S$ | | | — | — | — |
| 8 | $24144 \cdot T_S$ | | | — | — | — |

The structure of a radio subframe according to the example of FIG. 4 is just an example, and the number of subcarriers included in a radio frame, the number of slots included in a subframe and the number of OFDM symbols included in a slot may be changed in various manners.

Narrowband Internet of Things (NB-IoT)

Narrowband Internet of things (NB-IoT) as a standard for supporting low complexity and low cost devices is defined to perform only relatively simple operations compared to legacy LTE devices. The NB-IoT follows a basic structure of LTE, but operates based on contents defined below. If the NB-IoT reuses a channel or signal of the LTE, the NB-IoT may follow the standard defined in the legacy LTE.

Uplink

The following narrowband physical channels are defined:

Narrowband Physical Uplink Shared Channel, NPUSCH

Narrowband Physical Random Access Channel, NPRACH

The following uplink narrowband physical signals are defined:

Narrowband demodulation reference signal

In terms of N_sc^UL, an uplink bandwidth and slot duration T_slot are given by Table 3 below.

TABLE 4

| NPUSCH format | $\Delta f$ | $N_{sc}^{RU}$ | $N_{slots}^{UL}$ | $N_{symb}^{UL}$ |
| --- | --- | --- | --- | --- |
| 1 | 3.75 kHz | 1 | 16 | 7 |
| | 15 kHz | 1 | 16 | |
| | | 3 | 8 | |
| | | 6 | 4 | |
| | | 12 | 2 | |
| 2 | 3.75 kHz | 1 | 4 | |
| | 15 kHz | 1 | 4 | |

Narrowband Uplink Shared Channel (NPUSCH)

The narrowband physical uplink shared channel supports two formats:

NPUSCH format 1, used to carry the UL-SCH

NPUSCH format 2, used to carry uplink control information

Scrambling shall be done according to clause 5.3.1 of TS36.211. The scrambling sequence generator shall be initialized with $c_{ini} = n_{RNTI} \cdot 2^{14} + n_f \mod 2 \cdot 2^{13} + \lfloor n_s/2 \rfloor + N_{ID}^{Ncell}$ where $n_s$ is the first slot of the transmission of the codeword. In case of NPUSCH repetitions, the scrambling sequence shall be reinitialized according to the above formula after every $M_{identical}^{NPUSCH}$ transmission of the codeword with $n_s$ and $n_f$ set to the first slot and the frame, respectively, used for the transmission of the repetition. The quantity $M_{identical}^{NPUSCH}$ is given by clause 10.1.3.6 in TS36.211.

Table 5 specifies the modulation mappings applicable for the narrowband physical uplink shared channel.

TABLE 5

| NPUSCH format | $N_{sc}^{RU}$ | Modulation scheme |
|---|---|---|
| 1 | 1 | BPSK, QPSK |
|  | >1 | QPSK |
| 2 | 1 | BPSK |

Narrowband Physical Downlink Control Channel (NPDCCH)

A narrowband physical downlink control channel transports control information. The narrowband physical downlink control channel is transmitted through aggregation of one or two consecutive narrowband control channel elements (NCCEs), here, the narrowband control channel elements correspond to 6 consecutive subcarriers in the subframe, and here, NCCE 0 occupies subcarriers 0 to 5 and NCCE 1 occupies subcarriers 6 to 11. The NPDCCH supports various formats listed in Table 1-26. In the case of NPDCCH format 1, all NCCEs belong to the same subframe. One or two NPDCCHs may be transmitted in the subframe.

Table 6 shows an example of supported NPDCCH formats.

TABLE 6

| NPDCCH format | Number of NCCEs |
|---|---|
| 0 | 1 |
| 1 | 2 |

Scrambling should be performed according to Section 6.8.2 of TS36.211. A scrambling sequence should be initialized at a beginning of subframe $k_0$ according to Section 16.6 of TS36.213 after every fourth NPDCCH subframe having $c_{init} = \lfloor n_s/2 \rfloor 2^9 + N_{ID}^{Ncell}$, and here, $n_s$ represents a first slot of an NPDCCH subframe in which scrambling is (re-)initialized.

Modulation is performed by using a QPSK modulation scheme according to Section 6.8.3 of TS36.211.

Layer mapping and precoding are performed according to Section 6.6.3 of TS36.211 by using the same antenna port.

A block $y(0), \ldots y(M_{symb}-1)$ of complex-value symbols is mapped to resource elements (k,l) in a sequence starting as y(0) through an associated antenna port satisfying all of the following criteria.

They are parts of NCCE(s) allocated for NPDCCH transmission, and it is assumed that they are not sued for transmission of NPBCH, NPSS, or NSSS, and it is assumed that they are not used by the UE for an NRS, and they (if exists) do not overlap with resource elements used for PBCH, PSS, SSS, or CRS as defined in Section 6 of TS36.211, and an index l of the first slot of the subframe satisfies $l \geq l_{NPDCCHStart}$ and here, $l_{NPDCCHStart}$ is provided by Section 16.6.1 of 3GPP TS 36.213.

Mapping to resource elements (k,l) through an antenna port p satisfying the aforementioned criteria is an increase order of an index l after a first index k, which starts from the first slot of the subframe and ends with the second slot.

The NPDCCH transmission may be configured by higher layers having transmission gaps in which the NPDCCH transmission is delayed. The configuration is the same as that described for the NPDSCH in Section 10.2.3.4 of TS36.211.

In the case where a subframe other than the NB-IoT downlink subframe, the UE does not expect the NPDCCH in the subframe i. In the case of NPDCCH transmission, in subframes other than the NB-IoT downlink subframes, the NPDCCH transmissions are delayed up to a next NB-IoT downlink subframe.

FIG. 5 is a diagram illustrating a resource grid for one downlink slot in a wireless communication system to which the present disclosure is applicable.

FIG. 5 is a diagram illustrating a resource grid for one downlink slot in a wireless communication system to which the present disclosure is applicable.

Referring to FIG. 5, one downlink slot includes the plurality of OFDM symbols in the time domain. It is described herein that one downlink slot includes 7 OFDMA symbols and one resource block includes 12 subcarriers for exemplary purposes only, and the present disclosure is not limited thereto.

Each element on the resource grid is referred to as a resource element, and one resource block (RB) includes 12×7 resource elements. The number of RBs NADL included in a downlink slot depends on a downlink transmission bandwidth.

The structure of an uplink slot may be the same as that of a downlink slot.

FIG. 6 illustrates a structure of a downlink subframe in a wireless communication system to which the present disclosure is applicable.

Referring to FIG. 6, a maximum of first three OFDM symbols in a first slot in the subframe are control regions in which control channels are allocated and the remaining OFDM symbols are data regions in which Physical Downlink Shared Channels (PDSCHs) are allocated. Downlink control channels used in 3GPP LTE include, for example, a physical control format indicator channel (PCFICH), a physical downlink control channel (PDCCH), and a physical hybrid-ARQ indicator channel (PHICH).

A PCFICH is transmitted in the first OFDM symbol of a subframe and carries information about the number of OFDM symbols (i.e., the size of a control region) which is used to transmit control channels within the subframe. A PHICH is a response channel for uplink and carries an acknowledgement (ACK)/not-acknowledgement (NACK) signal for a Hybrid Automatic Repeat Request (HARQ). Control information transmitted in a PDCCH is called Downlink Control Information (DCI). DCI includes uplink resource allocation information, downlink resource allocation information, or an uplink transmission (Tx) power control command for a specific UE group.

The PDCCH may carry resource allocation and a transmission format (also referred to as a downlink (DL) grant) of a downlink-shared channel (DL-SCH), resource allocation information (also referred to as an uplink (UL) grant) of an uplink shared channel (UL-SCH), paging information on a paging channel (PCH), system information on the DL-SCH, resource allocation of an upper layer control message such as a random access response transmitted on a PDSCH, activation of a set of transmission power control (TPC) commands for individual UEs in a predetermined UE group and a voice over Internet protocol (VoIP), and the like. A plurality of PDCCHs may be transmitted in the control region and the UE may monitor the plurality of PDCCHs.

The PDCCH is configured by one control channel element or a set of a plurality of consecutive control channel elements (CCEs). The CCE is a logical allocation unit used for providing a coding rate depending on a state of a radio channel to the PDCCH. The CCE corresponds to a plurality of resource element groups. A format of the PDCCH and the number of bits of the PDCCH available are determined according to an association relationship between the number of CCEs and the coding rate provided by the CCEs.

The eNB decides a PDCCH format according to the DCI to be sent to the UE and attaches cyclic redundancy check (CRC) to the control information. The CRC is masked with a radio network temporary identifier (RNTI) according to an owner or a purpose of the PDCCH. The CRC may be masked with a unique identifier (e.g., cell-RNTI (C-RNTI)) of the UE in the case of the PDCCH fora specific UE. Alternatively, in the case of the PDCCH for the paging message, the CRC may be masked with a paging indication identifier (e.g., paging-RNTI (P-RNTI)). In the case of the PDCCH for system information, more specifically, a system information block (SIB), the CRC may be masked with a system information-RNTI (SI-RNTI). The CRC may be masked with a random access-RNTI (RA-RNTI) in order to indicate a random access response which is a response to transmission of a random access preamble of the UE.

FIG. 7 illustrates a structure of an uplink subframe in a wireless communication system to which the present disclosure is applicable.

Referring to FIG. 7, the uplink subframe may be divided into the control region and the data region in the frequency domain. A physical uplink control channel (PUCCH) carrying uplink control information is allocated to the control region. A physical uplink shared channel (PUSCH) carrying user data is allocated to the data region. In order to maintain single carrier characteristic, one UE does not send a PUCCH and a PUSCH at the same time.

A Resource Block (RB) pair is allocated to a PUCCH for one UE within a subframe. RBs belonging to an RB pair occupy different subcarriers in each of 2 slots. This is called that an RB pair allocated to a PUCCH is frequency-hopped in a slot boundary.

Semi-Persistent Scheduling (SPS)

Semi-Persistent Scheduling (SPS) is a scheduling scheme in which resources are allocated to a specific UE so as to be continuously maintained for a specific time interval.

When a predetermined amount of data is transmitted for a specific time like Voice over Internet Protocol (VoIP), it is not necessary to transmit control information every data transmission interval for resource allocation, so the waste of the control information may be reduced by using the SPS scheme. In the so-called SPS method, a time resource region in which the resources may be allocated to the UE is first allocated.

In this case, in the semi-persistent allocation method, the time resource region allocated to the specific UE may be configured to have periodicity. Then, the allocation of time-frequency resources is completed by allocating a frequency resource region as necessary. The allocation of the frequency resource region may be referred to as so-called activation. When the semi-persistent allocation method is used, the resource allocation is maintained during a predetermined period by one signaling, repeated resource allocation need not be performed, thereby reducing signaling overhead.

Thereafter, when resource allocation for the UE is no longer needed, signaling for releasing frequency resource allocation may be transmitted from the eNB to the UE. Releasing the allocation of the frequency resource region may be referred to as deactivation.

In the current LTE, for the SPS for uplink and/or downlink, in which subframes the SPS is to be transmitted/received is first notified to the UE through Radio Resource Control (RRC) signaling. That is, the time resource is first allocated among the time-frequency resources allocated to the SPS through the RRC signaling. In order to notify the subframe which may be used, for example, a periodicity and an offset of the subframe may be notified. However, since the UE receives only the time resource region through RRC signaling, even if the UE receives the RRC signaling, the UE does not immediately perform transmission/reception by the SPS, and completes the time-frequency resource allocation by allocating the frequency resource region as necessary. The allocation of the frequency resource region may be referred to as activation and releasing the allocation of the frequency resource region may be referred to as deactivation.

Therefore, after receiving the PDCCH indicating activation, the UE allocates the frequency resource according to the RB allocation information included in the received PDCCH, and applies modulation and code rate depending on Modulation and Coding Scheme (MCS) information to start transmission/reception according to the subframe periodicity and offset allocated through the RRC signaling.

Then, the UE stops transmission/reception when receiving the PDCCH indicating the deactivation from the eNB. If a PDCCH indicating activation or reactivation is received after stopping transmission and reception, transmission and reception are resumed again with the subframe period and offset allocated by RRC signaling using an RB allocation or an MCS designated by the PDCCH. That is, the allocation of time resources is performed through RRC signaling, but the transmission and reception of the actual signal may be performed after receiving the PDCCH indicating the activation and reactivation of the SPS, and the interruption of the transmission and reception of the signal is performed by the PDCCH indicating the deactivation of the SPS.

Specifically, when the SPS is activated by the RRC, the following information may be provided.

SPS C-RNTI

When SPS for uplink is activated, uplink SPS interval (semiPersistSchedIntervalUL) and the number of empty transmission before implicit release In case of TDD, whether twoIntervalsConfig is activated or deactivated for uplink When SPS for downlink is activated, downlink SPS interval (semiPersistSchedIntervalDL) and the number of HARQ processes configured for SPS Unlike this, when the SPS is deactivated by the RRC, a configured grant or a configured assignment should be discarded.

Further, the SPS is supported only in SpCell and is not supported for RN communication with E-UTRAN together with an RN subframe configuration.

In relation to the downlink SPS, after the semi-persistent downlink assignment is configured, the MAC entity needs to consider sequentially that the N-th assignment occurs in a subframe, as shown in Equation 1 below.

$$(10*SFN + \text{subframe}) = [(10*SFN_{\text{start time}} + \text{subframe}_{\text{start time}}) + N*\text{semiPersistSchedIntervalDL}] \bmod 10240 \quad \text{[Equation 1]}$$

In Equation 1, $SFN_{\text{start time}}$ and $\text{subframe}_{\text{start time}}$ mean SFN and subframe in which the configured downlink assignment is (re)initialized, respectively. For BL UEs or UEs of enhanced coverage, the $SFN_{start\ time}$ and $subframe_{start\ time}$ may refer to the SFN and subframe of the first PDSCH transmission in which the configured downlink assignment is (re)initialized.

In contrast, in relation to the uplink SPS, after the semi-persistent uplink assignment is configured, the MAC entity needs to consider sequentially that the N-th grant occurs in the subframe, as shown in Equation 2 below.

$$(10*SFN+\text{subframe}) = [(10*SFN\text{start time}+\text{subframe-start time})+N*\text{semiPersistSchedIntervalUL}+\text{Subframe\_Offset}*(N\text{ modulo }2)]\text{ modulo }10240 \quad [\text{Equation 2}]$$

In Equation 2, $SFN_{start\ time}$ and $subframe_{start\ time}$ mean SFN and subframe in which the configured uplink grant is (re)initialized, respectively. For the BL UEs or the UEs of enhanced coverage, the $SFN_{start\ time}$ and $subframe_{start\ time}$ may refer to the SFN and subframe of the first PDSCH transmission in which the configured uplink grant is (re) initialized.

Table 7 below is an example of an RRC message (SPS-Config) for specifying the above-described SPS configuration.

TABLE 7

```
-- ASN1START
SPS-Config ::=    SEQUENCE {
    semiPersistSchedC-RNTI          C-RNTI
OPTIONAL, -- Need OR
    sps-ConfigDL                    SPS-ConfigDL
OPTIONAL, -- Need ON
    sps-ConfigUL                    SPS-ConfigUL
OPTIONAL, -- Need ON
}
SPS-ConfigDL ::=     CHOICE{
    release                         NULL,
    setup                           SEQUENCE {
        semiPersistSchedIntervalDL   ENUMERATED {
                                       sf10,
sf20, sf32, sf40, sf64, sf80,
                                       sf128,
sf160, sf320, sf640, spare6,
                                       spare5, spare4,
spare3, spare2, spare1},
        numberOfConfSPS-Processes    INTEGER (1..8),
        n1PUCCH-AN-PersistentList    N1PUCCH-AN-
PersistentList,
        ...,
        [[ twoAntennaPortActivated-r10
CHOICE {
            release                 NULL,
            setup                   SEQUENCE {
              n1PUCCH-AN-PersistentListP1-r10
                N1PUCCH-AN-PersistentList
            }
        }
OPTIONAL -- Need ON
        ]]
    }
}
SPS-ConfigUL ::=     CHOICE {
    release                         NULL,
    setup                           SEQUENCE {
        semiPersistSchedIntervalUL  ENUMERATED {
                                       sf10,
sf20, sf32, sf40, sf64, sf80,
sf160, sf320, sf640, spare6,  sf128,
                                       spare5,
spare4, spare3, spare2, spare1},
        implicitReleaseAfter        ENUMERATED
{e2, e3, e4, e8},
        p0-Persistent               SEQUENCE {
            p0-NominalPUSCH-Persistent
INTEGER (-126..24),
            p0-UE-PUSCH-Persistent   INTEGER (-8..7)
        }  OPTIONAL, -- Need OP
        twoIntervalsConfig          ENUMERATED {true}
```

TABLE 7-continued

```
OPTIONAL, --
Cond TDD
        ...,
        [[ p0-PersistentSubframeSet2-r12
CHOICE {
            release                 NULL,
            setup                   SEQUENCE {
              p0-NominalPUSCH-PersistentSubframeSet2-r12
INTEGER (-126..24),
              p0-UE-PUSCH-PersistentSubframeSet2-r12
INTEGER (-8..7)
            }
        }
OPTIONAL -- Need ON
        ]],
        [[ numberOfConfUlSPS-Processes-r13
            INTEGER (1..8)
OPTIONAL -- Need OR
        ]]
    }
}
N1PUCCH-AN-PersistentList ::=       SEQUENCE (SIZE (1..4) )
                                    OF INTEGER (0..2047)
-- ASN1STOP
```

PDCCH/EPDCCH/MPDCCH Validation for Semi-Persistent Scheduling

The UE may validate the PDCCH including the SPS indication when all of the following conditions are satisfied. First, the CRC parity bit added for the PDCCH payload should be scrambled with the SPS C-RNTI, and second, a New Data Indicator (NDI) field should be set to zero. Here, in the case of DCI formats 2, 2A, 2B, 2C, and 2D, the new data indicator field indicates one of the activated transport blocks.

Furthermore, the UE may validate the EPDCCH including the SPS indication when all of the following conditions are satisfied. First, the CRC parity bit added for the EPDCCH payload should be scrambled with the SPS C-RNTI, and second, the New Data Indicator (NDI) field should be set to zero. Here, in the case of DCI formats 2, 2A, 2B, 2C, and 2D, the new data indicator field indicates one of the activated transport blocks.

Further, the UE may validate the MPDCCH including the SPS indication when all of the following conditions are satisfied. First, the CRC parity bit added for the MPDCCH payload should be scrambled with the SPS C-RNTI, and second, the New Data Indicator (NDI) field should be set to zero.

When each field used for the DCI format is configured according to Table 4 or Table 5, Table 6, and Table 7 below, the validation is completed. When the validation is completed, the UE recognizes the received DCI information as valid SPS activation or deactivation (or release). On the other hand, when the validation is not completed, the UE recognizes that the non-matching CRC is included in the received DCI format.

Table 8 shows fields for PDCCH/EPDCCH validation indicating SPS activation.

TABLE 8

| | DCI format 0 | DCI format 1/1A | DCI format 2/2A/2B/2C/2D |
|---|---|---|---|
| TPC command for scheduled PUSCH | set to '00' | N/A | N/A |
| Cyclic shift DM RS | set to '000' | N/A | N/A |

TABLE 8-continued

|  | DCI format 0 | DCI format 1/1A | DCI format 2/2A/2B/2C/2D |
|---|---|---|---|
| Modulation and coding scheme and redundancy version | MSB is set to '0' | N/A | N/A |
| HARQ process number | N/A | FDD: set to '000' TDD: set to '0000' | FDD: set to '000' TDD: set to '0000' |
| Modulation and coding scheme | N/A | MSB is set to '0' | For the enabled transport block: MSB is set to '0' |
| Redundancy version | N/A | set to '00' | For the enabled transport block: set to '00' |

Table 9 shows fields for PDCCH/EPDCCH validation indicating SPS deactivation (or release).

TABLE 9

|  | DCI format 0 | DCI format 1/1A |
|---|---|---|
| TPC command for scheduled PUSCH | set to '00' | N/A |
| Cyclic shift DM RS | set to '000' | N/A |
| Modulation and coding scheme and redundancy version | set to '11111' | N/A |
| Resource block assignment and hopping resource allocation | Set to all '1's | N/A |
| HARQ process number | N/A | FDD: set to '000' TDD: set to '0000' |
| Modulation and coding scheme | N/A | set to '11111' |
| Redundancy version | N/A | set to '00' |
| Resource block assignment | N/A | Set to all '1's |

Table 10 shows fields for MPDCCH validation indicating SPS activation.

TABLE 10

|  | DCI format 6-0A | DCI format 6-1A |
|---|---|---|
| HARQ process number | set to '000' | FDD: set to '000' TDD: set to '0000' |
| Redundancy version | set to '00' | set to '00' |
| TPC command for scheduled PUSCH | set to '00' | N/A |
| TPC command for scheduled PUCCH | N/A | set to '00' |

Table 11 shows fields for MPDCCH validation indicating SPS deactivation (or release).

TABLE 11

|  | DCI format 6-0A | DCI format 6-1A |
|---|---|---|
| HARQ process number | set to '000' | FDD: set to '000' TDD: set to '0000' |
| Redundancy version | set to '00' | set to '00' |
| Repetition number | set to '00' | set to '00' |
| Modulation and coding scheme | set to '1111' | set to '1111' |
| TPC command for scheduled PUSCH | set to '00' | N/A |
| Resource block assignment | Set to all '1's | Set to all '1's |

When the DCI format indicates SPS downlink scheduling activation, the TPC command value for the PUCCH field may be used as an index indicating four PUCCH resource values set by a higher layer.

Table 12 shows PUCCH resource values for downlink SPS.

TABLE 12

| Value of 'TPC command for PUCCH' | $n_{PUCCH}^{(1,p)}$ |
|---|---|
| '00' | The first PUCCH resource value configured by the higher layers |
| '01' | The second PUCCH resource value configured by the higher layers |
| '10' | The third PUCCH resource value configured by the higher layers |
| '11' | The fourth PUCCH resource value configured by the higher layers |

Procedure Related to Downlink Control Channel in NB-IoT

A procedure related to a Narrowband Physical Downlink Control Channel (NPDCCH) used in an NB-IoT will be described.

The UE needs to monitor NPDCCH candidates (i.e., a set of NPDCCH candidates) according to a configuration by a higher layer signaling for control information. Here, the monitoring may imply attempting to decode each of the MPDCCHs in the set according to all monitored DCI formats. The set of the NPDCCH candidates to be monitored may be defined as an NPDCCH search space. In this case, the UE may perform monitoring by using an identifier (e.g., C-RNTI, P-RNTI, SC-RNTI, or G-RNTI) corresponding to the corresponding NPDCCH search space.

In this case, the UE needs to monitor one or more a) a Type1-NPDCCH common search space, b) a Type2-NPDCCH common search space, and c) an NPDCCH UE-specific search space. In this case, the UE need not simultaneously monitor the NPDCCH UE-specific search space and the Type1-NPDCCH common search space. Furthermore, the UE need not simultaneously monitor the NPDCCH UE-specific search space and the Type2-NPDCCH common search space. Furthermore, the UE need not simultaneously monitor the Type1-NPDCCH common search space and the Type2-NPDCCH common search space.

The NPDCCH search space in an aggregation level and a repetition level is defined by the set of the NPDCCH candidates. Here, each NPDCCH candidate is repeated in R consecutive NB-IoT downlink subframes other than a subframe used for transmission of a system information (SI) message that starts in subframe k.

In the case of the NPDCCH UE-specific search, the aggregation and repetition levels defining the corresponding search space and the corresponding monitored NPDCCH candidates are listed as shown in Table 13 as a value of $R_{MAX}$ is substituted with a parameter al-Repetition-USS configured by the higher layer.

TABLE 13

| $R_{max}$ | R | NCCE indices of monitored NPDCCH candidates | |
|---|---|---|---|
| | | L' = 1 | L' = 2 |
| 1 | 1 | {0}, {1} | {0, 1} |
| 2 | 1 | {0}, {1} | {0, 1} |
|   | 2 | — | {0, 1} |
| 4 | 1 | — | {0, 1} |
|   | 2 | — | {0, 1} |
|   | 4 | — | {0, 1} |
| >=8 | $R_{max}/8$ | — | {0, 1} |
|   | $R_{max}/4$ | — | {0, 1} |
|   | $R_{max}/2$ | — | {0, 1} |
|   | $R_{max}$ | — | {0, 1} |

Note 1: {x} and {y} mean an NPDCCH format 0 candidate of an NCCE index 'x' and an NPDCCH format 0 candidate of an NCCE index 'y'.
Note 2:
{x, y} means NPDCCH format 1 candidates corresponding to the NCCE indexes 'x' and 'y'.

In the case of the Type1-NPDCCH common search space, the aggregation and repetition levels defining the corresponding search space and the corresponding monitored NPDCCH candidates may be listed as shown in Table 14 as a value of $R_{MAX}$ is substituted with a parameter al-Repetition-CSS-Paging configured by the higher layer.

TABLE 14

| $R_{max}$ | R | NCCE indices of monitored NPDCCH candidates | |
|---|---|---|---|
| | | L' = 1 | L' = 2 |
| 1 | 1 | — | {0, 1} |
| 2 | 1, 2 | — | {0, 1} |
| 4 | 1, 2, 4 | — | {0, 1} |
| 8 | 1, 2, 4, 8 | — | {0, 1} |
| 16 | 1, 2, 4, 8, 16 | — | {0, 1} |
| 32 | 1, 2, 4, 8, 16, 32 | — | {0, 1} |
| 64 | 1, 2, 4, 8, 16, 32, 64 | — | {0, 1} |
| 128 | 1, 2, 4, 8, 16, 32, 64, 128 | — | {0, 1} |
| 256 | 1, 4, 8, 16, 32, 64, 128, 256 | — | {0, 1} |
| 512 | 1, 4, 16, 32, 64, 128, 256, 512 | — | {0, 1} |
| 1024 | 1, 8, 32, 64, 128, 256, 512, 1024 | — | {0, 1} |
| 2048 | 1, 8, 64, 128, 256, 512, 1024, 2048 | — | {0, 1} |

Note 1: {x} and {y} mean the NPDCCH format 0 candidate of the NCCE index 'x' and the NPDCCH format 0 candidate of the NCCE index 'y'.
Note 2:
{x, y} means the NPDCCH format 1 candidates corresponding to the NCCE indexes 'x' and 'y'.

In the case of the Type2-NPDCCH common search space, the aggregation and repetition levels defining the corresponding search space and the corresponding monitored NPDCCH candidates may be listed as shown in Table 15 as a value of $R_{MAX}$ is substituted with a parameter npdcch-MaxNumRepetitions-RA configured by the higher layer.

TABLE 15

| $R_{max}$ | R | NCCE indices of monitored NPDCCH candidates | |
|---|---|---|---|
| | | L' = 1 | L' = 2 |
| 1 | 1 | — | {0, 1} |
| 2 | 1 | — | {0, 1} |
|   | 2 | — | {0, 1} |
| 4 | 1 | — | {0, 1} |
|   | 2 | — | {0, 1} |
|   | 4 | — | {0, 1} |
| >=8 | $R_{max}/8$ | — | {0, 1} |
|   | $R_{max}/4$ | — | {0, 1} |
|   | $R_{max}/2$ | — | {0, 1} |
|   | $R_{max}$ | — | {0, 1} |

Note 1: {x} and {y} mean the NPDCCH format 0 candidate of the NCCE index 'x' and the NPDCCH format 0 candidate of the NCCE index 'y'.
Note 2:
{x, y} means the NPDCCH format 1 candidates corresponding to the NCCE indexes 'x' and 'y'.

In this case, the position of the starting subframe k is given by $k=k_b$. Here, $k_b$ represents a b-th consecutive NB-IoT downlink subframe from the subframe k0 except for a subframe used for transmitting an SI message, the b is u×R, and the u represents 0, 1, ... ($R_{MAX}/R$)−1. Further, the subframe k0 represents a subframe satisfying Equation 3.

$$(10n_f + \lfloor n_s/2 \rfloor) \bmod T = \alpha_{offset} T, \text{ where } T = R_{max} \cdot G \quad \text{[Equation 3]}$$

In the case of the NPDCCH UE-specific search space, G shown in Equation 3 is given by a higher layer parameter nPDCCH-startSF-UESS and $\alpha_{offset}$ is given by a higher layer parameter nPDCCH-startSFoffset-UESS. Furthermore, in the case of the NPDCCH Type2-NPDCCH common search space, G shown in Equation 3 is given by a higher layer parameter nPDCCH-startSF-Type2CSS and $\alpha_{offset}$ is given by a higher layer parameter nPDCCH-startSFoffset-Type2CSS. Furthermore, in the case of the Type1-NPDCCH common search space, k is k0 and is determined from a position of an NB-IoT paging opportunity subframe.

When the UE is configured by the higher layer as a PRB for monitoring an NPDCCH UE-specific search area, the UE should monitor the NPDCCH UE-specific search space in the PRB configured by the higher layer. In this case, the UE does not expect that an NPSS, an NSSS, and an NPBCH are received in the corresponding PRB. On the contrary, when the PRB is not configured by the higher layer, the UE should monitor the NPDCCH UE-specific search space on the same PRB as detecting the NPSS/NSSS/NPBCH.

When the NB-IoT UE detects the NPDCCH having DCI format N0 which is terminated in subframe n and when transmission of the corresponding NPUSCH format 1 starts in subframe n+k, the UE need not monitor the NPDCCH of the random subframe which starts within the range from subframe n+1 up to subframe n+k−1.

When the NB-IoT UE detects the NPDCCH having DCI format N1 or DCI format N2 which ends in subframe n and when transmission of the corresponding NPDSCH starts in subframe n+k, the UE need not monitor the NPDCCH of the random subframe which starts within the range from subframe n+1 up to subframe n+k−1.

Furthermore, when the NB-IoT UE detects the NPDCCH having the DCI format N1 which ends in subframe n and when transmission of the corresponding NPUSCH format starts in subframe n+k, the UE need not monitor the NPDCCH of the random subframe which starts within the range from subframe n+1 up to subframe n+k−1.

Furthermore, when the NB-IoT UE detects the NPDCCH having DCI format N1 for "PUCCH order" which is terminated in subframe n and when transmission of the corresponding NPRACH starts in subframe n+k, the UE need not monitor the NPDCCH of the random subframe which starts within the range from subframe n+1 up to subframe n+k−1.

Furthermore, when the NB-IoT UE has NPUSCH transmission which ends in subframe n, the UE need not monitor the NPDCCH of a random subframe which starts within a range from subframe n+1 up to subframe n+3.

Furthermore, when the NPDCCH candidate of the NPDCCH search space ends in subframe n and when the UE is configured to monitor the NPDCCH candidate of another NPDCCH search space which starts before subframe n+5, the NB-IoT UE need not monitor the NPDCCH candidate of the NPDCCH search space.

In connection with an NPDCCH starting position, a starting OFDM symbol for the NPDCCH is given by an index INPDCCHStart in a first slot of subframe k. In this case, when the higher layer parameter operationModeInfo indicates '00' or '01', the index INPDCCHStart is given by the higher layer parameter eutaControlRegionSize. Unlike this, when the higher layer parameter operarionModeInfo indicates '10' or '11'm, the index INPDCCHStart is 0.

NPDCCH Validation for Semi-Persistent Scheduling (SPS)

Only when all of the following conditions are satisfied, the UE may determine that the NPDCCh allocating semi-persistent scheduling is valid.

A CRC parity bit obtained for the NPDCCH payload should be scrambled with semi-persistent scheduling C-RNTI.

A new data indicator should be set to '0'.

When all fields for the used DCI format N0 are configured are configured according to Table 16 or 17 below, the validity of the NPDCCH may be confirmed.

TABLE 16

| | DCI format N0 |
|---|---|
| HARQ process number (present if UE is configured with 2 uplink HARQ processes) | set to '0' |
| Redundancy version | set to '0' |
| Modulation and coding scheme | set to '0000' |
| Resource assignment | set to '000' |

TABLE 17

| | DCI format N0 |
|---|---|
| HARQ process number (present if UE is configured with 2 uplink HARQ processes) | set to '0' |
| Redundancy version | set to '0' |
| Repetition number | set to '000' |
| Modulation and coding scheme | set to '1111' |
| Subcarrier indication | Set to all '1's |

When the validity of the NPDCCH is confirmed, the UE should regard the NPDCCH as valid semi-persistent scheduling activation or release according to received DCI information.

When the validity of the NPDCCH is not confirmed, the UE should regard that the received DCI information is received together with a CRC which is not matched.

Downlink Control Information (DCI) Format

DCI transmits downlink or uplink scheduling information for one cell and one RNTI. Here, the RNTI is implicitly encoded with CRC.

As the DCI format related to the NB-IoT, the DCI format N0, the DCI format N1, and the DCI format N2 may be considered.

First, the DCI format N0 may be used for scheduling of the NPUSCH in one uplink (UL) cell and may transmit the following information.

Flag for distinguishing format N0 and format N1 (e.g., 1 bit), here, a value of 0 may indicate the format N0 and a value of 1 may indicate the format N1.

Subcarrier indication (e.g., 6 bits)
Resource assignment (e.g., 3 bits)
Scheduling delay (e.g., 2 bits)
Modulation and coding scheme (e.g., 4 bits)
Redundancy version (e.g., 1 bit)
Repetition number (e.g., 3 bits)
New data indicator (e.g., 1 bit)
DCI subframe repetition number (e.g., 2 bits)

Next, DCI format N1 is used for scheduling of one NPDSCH codeword in one cell and a random access procedure initiated by an NPDCCH order. In this case, DCI corresponding to the NPDCCH order may be carried by the NPDCCH.

The DCI format N1 may transmit the following information.

Flag for distinguishing format N0 and format N1 (e.g., 1 bit), here, a value of 0 may indicate the format N0 and a value of 1 may indicate the format N1.

Only when the NPDCCH order indicator is set to '1', a cyclic redundancy check (CRC) of the format N1 is scrambled with C-RNTI, and all remaining fields are configured as follows, the format N1 is used for the random access process initiated by the NPDCCH order.

Starting number of NPRACH repetitions (e.g., 2 bits)
Subcarrier indication of NPRACH (e.g., 6 bits)
All remaining bits of the format N1 are set to '1'.
Otherwise, the following remaining information is transmitted.

Scheduling delay (e.g., 3 bits)
Resource assignment (e.g., 3 bits)
Modulation and coding scheme (e.g., 4 bits)
Repetition number (e.g., 4 bits)
New data indicator (e.g., 1 bit)
HARQ-ACK resource (e.g., 4 bits)
DCI subframe repetition number (e.g., 2 bits)

When the CRC of the format N1 is scrambled with RA-RNTI, the following information (i.e., field) among the information (i.e., fields) is reserved.

New data indicator:
HARQ-ACK resource

In this case, the number of information bits of the format N1 is smaller than the number of information bits of the format N0, '0' should be appended until a payload size of the format N1 is equal to the payload size of the format N0.

Next, the DCI format N2 may be used for paging and direct indication and may transmit the following information.

Flag for distinguishing the paging and the direct indication (e.g., 1 bit), here, the value of 0 ma indicate the direct indication and the value of 1 may indicate the paging.

When the value of the flag is 0, the DCI format N2 includes (or transmits) direct indication information (e.g., 8 bits) and reserved information bits for configuring the same size as the format N2 in which the value of the flag is 1.

On the contrary, when the value of the flag is 1, the DCI format N2 includes (or transmits) the resource assignment (e.g., 3 bits), the modulation and coding scheme (e.g., 4 bits), the repetition number (e.g., 4 bits), and the DCI subframe repetition number (e.g., 3 bits).

Resource Allocation for Uplink Transmission with Configured Grant

When PUSCH resource allocation is semi-persistently configured by a higher layer parameter ConfiguredGrantConfig of the bandwidth (BWP) information element and PUSCH transmission corresponding to the configured grant is triggered, the next higher layer parameter is applied to the PUSCH transmission:

In the case of type 1 PUSCH transmission by the configured grant, the following parameters are provided to ConfiguredGrantConfig.

The upper layer parameter timeDomainAllocation value m provides a row index m+1 indicating an allocated table, and the allocated table indicates a combination of a start symbol, a length, and a PUSCH mapping type. Here, table selection follows a rule for the UE specific search space defined in Section 6.1.2.1.1 of TS38.214.

The frequency domain resource allocation is determined by a higher layer parameter frequencyDomainAllocation according to the procedure of Section 6.1.2.2 of TS38.214 for a given resource allocation type indicated by resourceAllocation.

$I_{MCS}$ is provided by a higher layer parameter mcsAndTBS.

As in section 7.3.1.1 of TS 38.212, a DM-RS CDM group, a DM-RS port, an SRS resource indication, and a DM-RS sequence initialization number are determined. An antenna port value, a bit value for DM-RS sequence initialization, precoding information and the number of layers, and an SRS resource indicator are provided by antennaPort, dmrs-SeqInitialization, precodingAndNumberOfLayers, and srs-ResourceIndicator, respectively.

When frequency hopping is enabled, the frequency offset between two frequency hops may be configured by frequencyHoppingOffset which is the higher layer parameter.

In the case of type 2 PUSCH transmission by the configured grant: The resource assignment follows the higher layer configuration according to and an uplink (UL) grant received in downlink control information (DCI).

When the higher layer does not deliver a transport block to be transmitted in a resource allocated for uplink transmission without a grant, the UE does not transmit anything in the resource configured by ConfiguredGrantConfig.

A set of permitted periods P is defined in [12, TS 38.331].

Transport Block Repetition for Uplink Transmission with a Configured Grant

Higher layer configuration parameters repK and repK-RV define K repetition to be applied to the transmitted transport block and a redundancy version (RV) pattern to be applied to repetition. Among K repetitions, for a case of n-th transmission (n=1, 2, ..., K), the corresponding transmission is associated with a (mod(n−1,4)+1)-th value in a configured RV sequence. Initial transmission of the transport block may start in the following cases.

When the configured RV sequence is {0, 2, 3, 1}, the first transmission occasion of K repetitions When the configured RV sequence is {0, 3, 0, 3}, any one of transmission occasions of K repetitions When the configured RV sequence is {0, 0, 0, 0}, any one of the transmission occasions of K repetitions (excluding a last transmission occasion when K=8)

For a random RV sequence, the repetition should end at a first reach timing among a case of transmission repeated at K times, a case of the last transmission occasion among K repetitions with a period P, or a case of receiving a UL grant for scheduling the same TB within the period P.

In regard to a time duration for transmission of K repetitions, the UE does not expect to set a time duration longer than a time duration derived by the period P.

For both type 1 and type 2 PUSCH transmissions, when repK>1 is configured in the UE, the UE should repeat the TB through repK consecutive slots by applying the same symbol allocation in each slot. When a symbol of a slot allocated for the PUSCH is determined as a downlink symbol in a UE procedure for determining a slot configuration defined in Section 11.1 of TS 38.213, transmission in the corresponding slot is skipped for multi-slot PUSCH transmission.

The contents (3GPP system, frame structure, NB-IoT system, etc.) described above may be applied in combination with methods proposed in the present disclosure to be described below or may be supplemented to clarify technical features of the methods proposed in the present disclosure.

Narrowband (NB)-LTE refers to a system for supporting low complexity and low power consumption with a system bandwidth (system BW) corresponding to 1 Physical Resource Block (PRB) of LTE system. The NB-IoT system may be primarily used as a communication mode for implementing the internet of things (IoT) by supporting a device such as machine-type communication (MTC) in a cellular system.

Narrowband LTE uses orthogonal frequency division multiplexing (OFDM) parameters such as the subcarrier spacing similarly as in the conventional LTE system. In the narrowband LTE, 1 PRB may be allocated for the narrowband LTE in a legacy LTE band without additional band allocation, so there is an advantage in that the frequency may be efficiently used. The downlink physical channel of the narrowband LTE is defined as NPSS/NSSS, NPBCH, NPDCCH/NEPDCCH, NPDSCH, etc. in the case of downlink and is named by adding N in order to distinguish the NB-LTE from the LTE.

For legacy LTE and LTE eMTC, Semi-Persistent Scheduling (SPS) is introduced and used. An initial UE receives SPS configuration setup information through RRC signaling.

When the UE receives SPS activation DCI with SPS-C-RNTI, the UE operates according to the SPS configuration by using information previously received through RRC signaling. Specifically, in the SPS operation of the UE, semi-persistent scheduling configuration information received through the RRC signaling, resource scheduling information included in the corresponding downlink control information (DCI), MCS information, and the like are used.

When the UE receives SPS release DCI with SPS-C-RNTI, the SPS configuration is released. When the UE receives the SPS release DCI with SPS-C-RNTI again, the UE performs the SPS operation similarly as described above.

When the UE receives SPS configuration release information through the RRC signaling after receiving the SPS release DCI with SPS-C-RNTI, the corresponding UE may not detect the downlink control information until receiving the SPS configuration setup information indicating the SPS activation again. The reason is that the corresponding UE does not know an RNTI value related to the SPS configuration (SPS-C-RNTI value).

The SPS basically has the advantage of reducing the DCI overhead of the base station. However, in the narrowband Internet of things (NB-IoT) system, in addition to reducing the downlink control information overhead of the base station, the semi-persistent scheduling (SPS) may be additionally introduced by a method for battery saving and latency reduction of the NB-IoT UE.

Accordingly, the present disclosure proposes a method for maintaining the legacy complexity with a higher layer signal, a signal to be included in the downlink control information, etc., when the semi-persistent scheduling information is introduced in the narrowband Internet of things (NB-IoT) system. An operation required for SPS in each of an idle mode and a connected mode will also be proposed.

In the present disclosure, an expression 'monitoring the search space' means a series of processes of decoding the narrowband physical downlink control channel (NPDCCH) as large as a specific region according to the downlink control information (DCI) format to be received through he corresponding search space and then scrambling the corresponding cyclic redundancy check (CRC) with a predetermined specific RNTI value to check whether the corresponding value matches a desired value.

Additionally, since each UE recognizes a single physical resource block (PRB) as each carrier in the narrowband LTE system, the PRB mentioned below in relation to the embodiment of the present disclosure has the same meaning as the carrier.

FIG. 8 is a flowchart for describing an example of signaling for applying a semi-persistent scheduling operation according to an embodiment of the present disclosure.

Referring to FIG. 8, in step S810, a base station transmits, to a UE, preconfigured uplink (UL) resource (PUR) information. The preconfigured uplink (UL) resource (PUR) information may include information related to a configuration of semi-persistent scheduling (SPS). The preconfigured UL resource information may be transmitted through RRC signaling.

The preconfigured UL resource (PUR) may be a dedicated resource configured to be UE-specific for a semi-persistent scheduling operation of a UE which is in an idle mode.

In S820, the UE in the idle mode transmits uplink data by using the preconfigured uplink resource (PUR).

The aforementioned signaling is just an example applied to the present disclosure and the technical spirit of the present disclosure is not limited to each step and description for each step. According to another embodiment, in step S820, the UE in the idle mode may transmit the uplink data again by checking to receive a retransmission instruction after transmitting the uplink data.

Hereinafter, an idle mode operation of a UE in which semi-persistent scheduling is configured will be reviewed.

In regard to a semi-persistent scheduling operation of the UE, the following may be considered. The UE in the idle mode should store an RRC configuration in order to perform the SPS operation.

The operation proposed by the present disclosure may be applied when a specific UE is instructed with suspension of RRC connection in an RRC_connected state and the specific UE moves to an RRC_Idle state. For convenience of description, a narrowband Internet of Things (NB-IoT)-based system is mainly described, but the present disclosure may be applied to other systems as well as an EMTC system. Among terms used in connection to the embodiment of the present disclosure, deactivation has an opposite meaning to activation.

Embodiment 1

A method may be considered in which the SPS configuration is performed through the RRC signaling, and (re)activation/deactivation/retransmission of the SPS operation is performed through signaling or downlink control information (DCI).

Specifically, similarly to the semi-persistent scheduling (SPS) which operates in the connected mode, the SPS configuration may be delivered to be UE-specific through the RRC signaling. Thereafter, the UE detects the DCI or detects a specific signal to be instructed with (re)activation, deactivation, or retransmission related to the SPS operation from the base station.

In this case, the following method may be considered as a detailed method for instructing (re)activation, deactivation, or retransmission by using the downlink control information (DCI).

Embodiment 1-1

A method for introducing a new search space for an idle mode SPS operation may be considered.

Specifically, a legacy search space may be maintained and the new search space may be introduced for transmission/reception according to the semi-persistent scheduling (SPS).

The new search space may become a UE specific search space or a common search space. In the case of the common search space, (re)activation, deactivation, or retransmission may be instructed to the UE group.

Hereinafter, the new search space is referred to as a Semi-Persistent Scheduling Search Space (SPS-SS). A search space period, a search space monitoring duration, etc., may be additionally required for a parameter (Rmax, G, alpha offset, etc.) for configuring the legacy search space (SS) as the parameter for the Semi-Persistent Scheduling Search Space (SPS-SS).

The search space period means a period in which the UE should wake up in order to monitor the search space. A start point of the search space period may be a timing at which the SPS configuration is received through the RRC signaling. As another example, the start point may be configured to be separately indicated through the RRC signaling, An example of a specific operation related to the search space period is as follows. When the search space period is set to 12 hours, the UE in the idle mode may wake up once every 12 hours and monitor the search space at a timing predetermined by Rmax, G, alpha offset, etc.

An example of a specific operation related to the search space monitoring duration is as follows. The UE in the idle mode wakes up every search space period and monitors the semi-persistent scheduling search space (SPS-SS). In this case, the UE may monitor the semi-persistent scheduling search space (SPS-SS) as long as the search space monitoring duration.

The search space monitoring duration may be defined in units of PDCCH period (pp), or defined in units of absolute time (e.g., ms).

As a specific example, when the search space period is set to 12 hours and the search space monitoring duration is set to 10 pp, the UE in the idle mode wakes up every 12 hours and monitors the semi-persistent scheduling search space (SPS-SS) as long as 10 pp and then sleeps again.

When the search space period for the new search space, the search space monitoring duration, etc., are configured, resources for SPS transmission/reception may be determined by configuring an SPS period, an SPS tx/rx duration, etc.

According to an embodiment, the SPS period, the SPS tx/rx duration, etc., may be set independently of the search space period or the search space monitoring duration.

According to another embodiment, there may be a case where any one of the parameter (SPS period and SPS transmission/reception duration) for the SPS transmission and the parameter (search space period and search space monitoring duration) for the new search space is not set. In this case, the remaining values may be set according to the set parameter value.

In addition, the tx/rx duration may be set in the following units. The SPS tx/rx duration may be defined in units of a total repeated transmission number related to how many times the signal should be repeatedly transmitted for transmission of the narrowband physical downlink shared channel (NPDSCH) or narrowband physical uplink shared channel (NPUSCH). As another example, the unit may be defined as an absolute time (e.g., ms).

When the corresponding SPS tx/rx duration is set to the absolute time, the SPS tx/rx operation may be performed as follows by considering an end point of the last subframe (SF). Specifically, the SPS tx/rx operation may be performed when the end point of the last subframe (SF) of the narrowband physical downlink shared channel (NPDSCH) or the narrowband physical uplink shared channel (NPUSCH) to be transmitted (or received) is set.

Embodiment 1-1 will be described below in detail with reference to FIG. 9.

FIG. 9 is a diagram for describing a search space in relation to a semi-persistent scheduling operation according to an embodiment of the present disclosure.

Referring to FIG. 9, the search space period is the longest. The UE performs monitoring during the search space monitoring duration within the range of the search space period.

In FIG. 9, the SPS period is the same as the search space period. That is, the period in which the UE wakes up and the period in which the monitoring of the search space starts are the same as each other. The SPS tx/rx duration is also illustrated to be the same as the search space monitoring duration. Since semi-persistent is activated in SS #1 (SPS activation), the UE may perform a Tx/Rx operation by using an SPS resource which is present later.

Unlike as illustrated in FIG. 9, when the semi-persistent scheduling is not deactivated in SPS #n (SPS deactivation), the UE performs the Tx/Rx operation using the semi-persistent scheduling resource (SPS resource) for the next search space monitoring duration.

In the case of Embodiment 1-1, the search space monitoring number increases as compared with the conventional scheme without the SPS operation, but the idle mode UE need not monitor all search spaces.

Embodiment 1-2

A method for adding a specific parameter to the conventional search space (e.g., monitoring window, monitoring period, etc.) may be considered.

Specifically, a method for not introducing the new search space, which is similar to Embodiment 1-1 may be additionally considered. That is, the search space period, the search space monitoring duration, etc., proposed in Embodiment 1-1 above may be additionally set in the legacy search space (e.g., UE specific search space or common search space).

As compared with Embodiment 1-1, since the new search space is not introduced, new search space information need not be provided through radio resource control (RRC). The remaining operation is similar to the operation in Embodiment 1-1.

The embodiment has an advantage in that the UE in the idle mode need not monitor all search spaces similarly to Embodiment 1-1, but the monitoring number of the search space increases as compared with the conventional scheme without the SPS operation.

Embodiment 1-3

A method for sharing the legacy search space may be considered. Specifically, the legacy search space which the legacy NB-IoT UE uses in the idle mode may be used for DCI detection related to the semi-persistent scheduling operation.

As a specific example, the legacy search space such as Type-1 CSS capable of detecting paging or type-1A CSS, type-2A CSS, etc., for Single Cell Point-to-Multipoint (SC-PTM) may be shared to indicate an SPS related operation. That is, the listed search spaces may be used to indicate SPS (re)activation, deactivation, or retransmission in addition to the legacy use.

In applying the embodiment, a DCI payload size may be considered in order to prevent a blind detection number of the UE from increasing. Specifically, the DCI payload size for the SPS operation may be set to be the same as the payload size of the DCI which may be transmitted in each (legacy) search space.

According to the embodiment, the search space monitoring number performed by the UE in the legacy idle mode is maintained. Accordingly, among SPS operation methods utilizing the downlink control information (DCI), this method may be most advantageous in terms of power saving of the UE. However, in the case of the embodiment, since the SPS operation is indicated through the common search space (CSS), there is a characteristic that the SPS operation is indicated not to be UE specific, but to be UE group specific.

Additionally, a method for indicating (re)activation/deactivation/retransmission through signal detection will be described below in detail with reference to FIG. 10.

FIG. 10 is a diagram for describing a wake up signal in relation to a semi-persistent scheduling operation according to an embodiment of the present disclosure.

Embodiment 1-4

A method of using a WUS like signal may be considered. A wake up signal for determining whether to monitor the legacy paging search space may be configured to be used as a signal indicating (re)activation, deactivation, or retransmission of the SPS.

Specifically, the type of the legacy wake up signal and parameters such as a root index, a scrambling sequence, etc., are changed and configured to be distinguished from the wake up signal. Furthermore, the corresponding parameters may be configured to be UE specific or UE group specific and configured to indicate the SPS related operation.

Hereinafter, a UE/base station operation related to the wake up signal (WUS) will be described with reference to FIG. 10.

The UE receives, from the base station, the configuration information related to the wake up signal (WUS) through the higher layer signaling. The UE receives the wake up signal from the base station for a configured maximum WUS duration 17A (17B corresponds to Gap).

The wake up signal (WUS) means a signal used for the UE to indicating whether the UE monitors the narrowband physical downlink control channel (NPDCCH) to receive the paging in a specific cell. The wake up signal is associated with one or more paging occasions (PO) according to whether to configure extended DRX.

FIG. 10 illustrates an example of a timing relationship between the paging occasions (PO) of the wake up signal (WUS). The UE receiving the wake up signal (WUS) may additionally perform a discontinuous reception (DRX) operation and/or a cell reselection operation.

Operations of the UE and the base station related to reception of a Narrowband wake up signal (NWUS) may be summarized as follows. The following operations may be described or applied in relation to the methods proposed in the present disclosure.

The operation of the base station related to the Narrowband wake up signal (NWUS) is as follows.

The base station generates a sequence for the wake up signal (or used for the wake up signal) in a specific subframe.

The base station maps the generated sequence to at least one resource element (RE). The base station transmits the wake up signal to the UE on the mapped resource element. The at least one resource element (RE) may mean at least one of a time resource, a frequency resource, or an antenna port.

The operation of the UE related to the Narrowband wake up signal (NWUS) is as follows.

The UE receives the wake up signal (WUS) from the base station. Alternatively, the UE may assume that the wake up signal (WUS) is transmitted from the base station on a specific resource element (RE).

The UE may check (or determine) whether to receive the paging based on the received wake up signal.

When the paging is transmitted, the UE receives the paging based on a paging reception related operation and performs a procedure of transitioning from the RRC idle mode to the RRC connected mode.

Embodiment 2

A method similar to an operation according to type 1 configured grant may be considered. That is, transmitting the SPS configuration to be UE specific through the RRC signaling is the same as in Embodiment 1, but (re)activation or (re)configuration is indicated through the RRC signaling.

The embodiment has a largest difference from Embodiment 1 in that since the SPS operation (activation, configuration, etc.) is indicated through the RRC signaling, the search space need not be monitored to indicate the SPS operation.

Information included in the SPS configuration (or SPS reconfiguration) may include at least one of the following information. Specifically, the information included in the SPS configuration may include at least one of an SPS interval, HARQ number for the SPS operation ((# of HARQ for SPS), a modulation coding scheme (MCS) to be included in DL/UL grant (i.e., DCI formats N0 and N1 with C-RNTI), a resource unit (RU), resource assignment, the repetition number, and the like.

According to an embodiment, when the UE is instructed with the SPS configuration (or SPS reconfiguration) through the RRC signaling, the corresponding operation may be configured to immediately indicate activation (or reactivation). According to another embodiment, when the UE may be instructed with the SPS configuration (or SPS reconfiguration) through the RRC signaling and then the corresponding UE may configure the corresponding semi-persistent scheduling (SPS) to be activated (or reactivated) at the moment of moving to the RRC idle state.

A UE in which the SPS configuration is activated may return to the RRC connected state and perform the SPS tx/rx operation until receiving a release instruction from the base station. Specifically, until receiving the release of the SPS configuration from the base station through the RRC signaling, the UE may assume that the configured grant is valid and perform the SPS tx/rx operation.

In order for the UE to assume that the configured grant is valid, the following may be premised. Specifically, it may be premised that the timing advance (TA) is valid at the time of transmission/reception in order for the configured grant to be valid. As a result, the UE may determine whether the timing advance (TA) is valid at the time of transmission/reception is valid in order to determine the validity of the configured grant.

According to the embodiment, since the downlink control information (DCI) need not be monitored for the SPS operation, battery saving of the UE may be achieved.

However, once the semi-persistent scheduling (SPS) is configured in the connected mode, the UE is continuously in an activation state in the idle mode. Therefore, in order for the base station to reconfigure, deactivate, or release the corresponding semi-persistent scheduling (SPS), the UE needs to be switched to the connected mode state again.

Additionally, the retransmission operation when using this method can be divided into detailed proposal methods as follows.

Hereinafter, embodiments related to the retransmission operation will be described.

Embodiment 2-1

A method for configuring SPS retransmission not to be performed in the RRC idle state may be considered.

Specifically, a reception success probability of communication using the resource configured through the RRC signaling may be configured to be high. The UE may be configured to perform transmission/reception through the corresponding resource and not perform the retransmission operation.

In order to increase the reception success probability, a repetition scheme introduced in NR may be applied in addition to the repetition used previously.

Specifically, for a repetition number R indicating the number of repeated transmissions of the narrowband physical downlink/uplink shared channel (NPDSCH/NPUSCH), the UE performs repeated transmission using a fixed Redundancy Version (RV) value. Here, by using RV values and R2 additionally indicated through the RRC signaling, the UE may be configured to perform transmission/reception repeatedly. R2 represents a value indicating how many times the RV value is changed and additionally transmitted.

For example, it is assumed that R set through the RRC signaling for uplink semi-persistent scheduling (UL SPS) is 16, the RV value is {0, 2, 3, 1}, and R2 indicates 4. According to the set values, the UE repeatedly performs transmission 16 times for each RV value, and performs such an operation 4 times while changing the RV value.

More specifically, the UE sets the initial RV value to 0 and repeatedly transmits NPUSCH 16 times, and then repeatedly transmits the NPUSCH 16 times by setting the RV to 2. The UE performs repeated transmissions 16 times even for each of RV 3 and RV 1, and then performs an operation according to the legacy idle mode until the next SPS resource exists.

Since the UE is configured to perform retransmission in the idle mode, the base station should use a paging signal to request retransmission of UL data or retransmit downlink data to the UE. Specifically, the base station resumes the RRC connection by transmitting the paging to the UE which is in the idle mode due to the RRC connection which is suspended. The base station may schedule the retransmission using a dynamic grant for the UE switched to the connected mode.

Additionally, the base station may instruct SPS deactivation (or release or reconfiguration) to a UE in which SPS transmission/reception is activated using a paging narrowband physical downlink shared channel (paging NPDSCH). In this case, a UE in which SPS transmission/reception is activated through the RRC signaling may perform deactivation, release, or reconfiguration of the semi-persistent scheduling (SPS) in the idle mode. That is, there is a battery saving effect in that the UE may perform the SPS operation without being switched to the connected mode.

Embodiment 2-2

A method for indicating SPS retransmission through downlink control information (DCI) or signaling may be considered. Specifically, a method for indicating the SPS operation through downlink control information (or signaling) may be applied only to the SPS retransmission.

Since the downlink control information (or signaling) indicates only retransmission, compact DCI having a small payload size may be configured to be used. A resource for retransmission may be configured to be indicated together with the SPS configuration through the RRC signaling.

In the embodiment, although the UE should monitor the search space, there is an advantage that the base station may dynamically schedule the SPS retransmission.

Embodiment 3

A method for transmitting the SPS configuration through the RRC signaling and indicating the SPS operation (activation/deactivation/retransmission) using the paging narrowband physical downlink shared channel (paging NPDSCH) may be considered.

In the case of Embodiment 1 above, the SPS operation is indicated through the downlink control information (DCI). Therefore, the base station may dynamically indicate (re)activation, deactivation, or retransmission. However, a search space that should be monitored by a legacy idle mode UE increases.

In Embodiment 2 above, since the SPS operation is indicated through the RRC signaling, the search space monitored by the idle mode UE does not increase. However, in order to perform deactivation (or release), RRC signaling should be performed after switching the UE in the idle mode to the connected mode.

In the case of the embodiment, an SPS related parameter is configured through the RRC signaling, and the SPS operation is indicated by using the paging narrowband physical downlink shared channel (paging NPDSCH). Specifically, by including the SPS uplink/downlink grant (UL/DL grant) in the payload of the paging narrowband physical downlink shared channel, (re)activation, deactivation, or retransmission may be indicated through the SPS uplink/downlink grant (UL/DL grant).

The uplink/downlink grant (UL/DL grant) included in the paging narrowband physical downlink shared channel (NPDSCH) may be configured to be UE specific.

The following method may be considered in order to configure the uplink/downlink (UL/DL) grant UE-specifically. As an example, the UE may be configured to receive a new UE specific ID from the base station through the RRC signaling. As another example, the UE may be configured to use resumeIdentity which is a parameter which the UE already has.

The configuration of a validation field for confirming that the uplink/downlink grant (UL/DL grant) indicates (re)activation or deactivation may be made similarly to the LTE or eMTC system. Retransmission may be indicated by setting a new data indicator (NDI) value to 1.

According to the embodiment, the number of search spaces to be monitored by the UE in the idle mode does not increase compared to the number of search spaces monitored by a legacy idle mode UE. This means that a battery usage does not increase while supporting the SPS operation. In addition, the base station may dynamically instruct (re)activation, deactivation, or retransmission, and the UE need not switch to the connected mode to receive the corresponding indication.

Embodiment 3-1

A method for additionally utilizing a common search space (e.g., Type1-CSS, Type1A-CSS) in order to indicate the SPS operation of (re)activation, deactivation, or retransmission may be considered.

Embodiment 3 described above indicates SPS (re)activation, deactivation, or retransmission by using only the payload of the NPDSCH, but in the case of the embodiment, a search space in which the downlink control information for scheduling the NPDSCH is transmitted is additionally utilized.

In a corresponding search space, candidates of the NPDCCH used for the original purpose and candidates of the NPDCCH indicating the SPS operation may be configured not to overlap. This is to prevent an influence on the legacy UE.

Specifically, the narrowband physical downlink control channel (NPDCCH) candidates in which the downlink control information for indicating the SPS operation is transmitted may be configured to be transmitted not to overlap with the narrowband physical downlink control channel (NPDCCH) candidates according to the type 1-common search space (Type1-CSS or Type1A-CSS).

In order for the base station to simultaneously transmit legacy downlink control information (legacy DCI) and downlink control information for SPS indication, the maximum repetition number (Rmax) of both downlink control information may be set to be large and the repetition number may be set to a small value.

Furthermore, the base station indicates a fake repetition number different from an actual repetition number value to a field indicating a legacy DCI repetition number to control to control a start timing of the legacy physical downlink shared channel (NPDSCH).

Through such a configuration, the UE may monitor the downlink control information indicating the SPS operation between the legacy downlink control information (legacy DCI) and the legacy physical downlink shared channel (legacy NPDSCH). The RNTI value for monitoring for the downlink control information indicating the SPS operation may be set through the RRC signaling to be UE specific (or UE group specific).

Embodiment 3-2

A method for using a paging occasion or a new indication parameter in order to indicate the SPS operation such as (re)activation, deactivation, or retransmission may be considered.

When the SPS operation is indicated by reusing the legacy common search space (CSS) as in Embodiment 3-1 above, another UE may also wake up in addition to the UE that uses the preconfigured UL resource (PUR).

In the case of this embodiment, a PUR paging opportunity (PPO) is configured so that the base station may indicate the SPS operation only to the terminals using the PUR. The PUR paging opportunity (PPO) may be broadcast through system information. The UE may indicate the SPS operation such as activation/deactivation/retransmission through the PUR paging opportunity (FPO).

The UE may be configured to monitor both a paging opportunity (PO) and a PUR paging opportunity (PPO) for a legacy paging procedure. Only one of the paging opportunity (PO) and the PUR paging opportunity (PPO) may be considered from the viewpoint of battery saving.

Specifically, a UE capable of using the aging opportunity (PO) and the PUR paging opportunity (PPO) may be configured to perform the legacy paging procedure by using the PUR paging opportunity (FPO). Since the base station knows, in advance, which UE uses the PUR based on a non-contention-based SPS resource (PUR), a legacy paging signal for the corresponding UE may also be configured through the PUR Paging Opportunity (FPO).

According to an embodiment, the PUR paging opportunity (PPO) may be applied to be replaced by the wake up signal. That is, only a UE to which the PUR is allocated may be configured to monitor the paging by using a Group Wise Wake UP signal for waking up the UE to which the PUR is allocated.

According to another embodiment, a wake up signal for waking up the UE in which the PUR is configured may be configured to exist in front of the PUR paging opportunity (FPO). The base station may inform the UE that paging containing activation/deactivation/retransmission, etc., through the corresponding wake up signal is delivered.

By a different scheme from the paging occasion, a system information change notification which may be recognized only by the UEs using the PUR may be added or a system information channel monitored by the UEs using the PUR may be configured. The methods may also wake up only the UE using the PUR as proposed above.

The paging opportunity (or the SI Change Notification or SI Channel) may be configured differently depending on the PUR type. That is, a paging occasion configuration or resource may be different according to the PUR type used by the UE. When a part or the entirety of the downlink channel for monitoring the PUR overlaps with the system information, the UE may configure the monitoring DL channel for the PUR to be prioritized. In this case, since the UE performs the SPS operation for the PUR in the idle mode, it may be preferable to first confirm the monitoring DL channel for the PUR and confirm the system information in a next period.

Hereinafter, a RACH procedure will be described with reference to FIG. 11 in association with the resource configured for the SPS operation.

FIG. 11 is a diagram for describing an RACH procedure in relation to a semi-persistent scheduling operation according to an embodiment of the present disclosure.

Embodiment 4

A method for utilizing the RACH procedure in relation to the preconfigured resource (PUR) for the SPS operation may be considered. It is preferable that used power of a UE entering the RRC idle state is minimized. However, in this case, an oscillator drift of the UE occurs, and as a result, it may be difficult to ensure the timing advance (TA).

Therefore, when a method in which the timing advance (TA) is ensured while the UE periodically does not consume power is considered, the PUR may be used based on the RACH procedure as illustrated in FIG. 11.

Hereinafter, it will be described in detail according to a time sequence.

The base station may configure a resource that may perform an idle mode semi-persistent scheduling request (IM-SPS request) to the UE.

A narrow physical random access channel (NPRACH) for triggering IM-SPS may be indicated to UEs which receive the SPS configuration in the RRC connected state and move to the RRC idle state. The NPRACH preamble may be delivered to the UE through the system information block (SIB) or RRC signaling.

The NPRACH preamble may be configured to be indicated through one of a contention based random access (CBRA) or contention free random access (CFRA) resource. In this case, it may be preferable that the NPRACH preamble is indicated through the CFRA resource without a contention process in order reduce power consumption of the UE.

The CFRA resource may be indicated to be UE specific through the RRC signaling. NPRACH resource related parameters (period, repetition number or CE level, PRB index, etc.) may also be configured to be delivered together.

The UE that is indicated with one of the CFRA resources transmits the corresponding NPRACH preamble to request the IM-SPS (IM-SPS request). The base station may accept the IM-SPS request through a preamble response message (MSG2). A Transport Block Size (TBS) required for the UE may follow a similar structure to Early Data Transmission (EDT) or may be configured according to a request from the UE in the RRC connected state.

A UE that does not receive the SPS configuration in the RRC connected state may be configured to trigger the IM-SPS in the RRC idle state. Specifically, the base station may indicate the NPRACH preamble for triggering the IM-SPS through an SIB (e.g., SIB2-NB, SIB22-NB, etc.). The NPRACH preamble may be configured to be indicated as one of the CBRA resources. The NPRACH resource related parameters (period, repetition number (or CE level), PRB index, etc.) may also be delivered together through the system information block (SIB).

When the UE that is indicated with one of the CBRA resources requests the IM-SPS by transmitting the corresponding NPRACH preamble, the base station may accept the IM-SPS request through MSG4. The UE may request the SPS period, the TBS, etc., through MSG3.

The base station that accepts the trigger of the IM-SPS of the UE may indicate parameters related to the IM-SPS to the corresponding UE. The parameters related to the IM-SPS may include at least one of timing advance (TA), transmission power control (TPC), radio network temporary identifier (RNTI), duration, periodicity, TBS, resource allocation (RA), and repetition.

The UE that receives the IM-SPS related parameters may transmit uplink data within a valid transmission interval or as large as a valid transmission number. When transmitting the last NPUSCH of the transmission period, the UE may indicate that the corresponding transmission is the last transmission. The base station may determine that the corresponding IM-SPS is terminated according to the indication.

When the base station receives the indication for the last transmission, the base station may be configured to give a feedback to the corresponding UE. In addition, when uplink transmission skipping (UL skipping) is allowed in the transmission interval according to the IM-SPS, if the uplink transmission (UL skipping) occurs as large as a number indicated by the base station, the IM-SPS may be configured to be implicitly released. The base station may be configured to implicitly indicate the release of the IM-SPS. The base station may be configured to perform an HARQ-feedback and the corresponding HARQ-feedback may be indicated together with explicit release.

When the uplink transmission skipping is allowed, the base station may be configured to inform the number of NPUSCHs actually transmitted from the UE. An ACK/NACK may be configured to be indicated in the form of a bitmap for each corresponding NPUSCH.

When the UE is indicated with the NACK, the UE may perform retransmission even though the IM-SPS transmission interval ends and may additionally notify the timing advance (TA) or transmission power control (TPC) value while indicating the NACK. As another method, the NPUSCH in which the NACK occurs may be configured to be retransmitted in a next SPS interval.

When the UE determines that there is no uplink to be transmitted in spite of being indicated with the resource that may trigger the IM-SPS, the corresponding NPRACH preamble may be configured not to be transmitted. As another method, when the UE is indicated with the resource that may trigger the IM-SPS, the UE may be configured to perform the IM-SPS request and performs IM-SPS transmission first once, and then be indicated with a back-off parameter through a feedback channel or signal from the base station and determine a time at which the IM-SPS request may be transmitted next.

An item which may be commonly applied to the aforementioned embodiments will be described below in detail.

In the aforementioned embodiments, collision handling may be additionally considered. In this regard, when the SPS related operation collides with the legacy operation, the UE may operate by giving a priority to any one of both operations.

When an operation related to a predetermined region or data which may exert a large influence on the system of the UE collides with the SPS related operation, the UE may be configured to operate by giving the priority to the operation related to the preconfigured region or data.

According to an embodiment, the preconfigured region or data may be related to at least one of the paging or the RACH procedure.

Specifically, when an operation related to data transmitted in relation to the SPS or the SPS-SS partially or totally overlaps with the operation related to the preconfigured region or data in terms of the time or frequency, the UE may operate by giving the priority to the operation related to the preconfigured region or data.

Data transmitted in relation to the SPS may be a narrowband physical downlink/downlink shared channel (SPS NPDSCH/NPUSCH) or a narrowband physical downlink control channel (NPDCCH) indicting the SPS operation such as activation/deactivation/retransmission.

The preconfigured region or data may be at least any one of a region in which the wake up signal WUS may be transmitted, the paging narrowband physical downlink shared channel (NPDSCH), or and a type-1 common search space (CSS) in which the narrowband physical downlink control channel (NPDCCH) for scheduling the paging NPDSCH.

Since monitoring the paging by the idle mode UE is important to the operation of the entire system, the preconfigured region or data may be configured to have a higher priority to the data or search space (i.e., SPS NPDSCH/NPUSCH or SPS SS) related to the SPS transmission.

When even the entirety or a part of the preconfigured region or data overlaps with the data transmitted in relation to the SPS or the semi-persistent scheduling search space (SPS-SS) on the time or frequency, the UE may be configured not to transmit/receive the data related to the SPS operation.

A priority for the collision handling may be equally applied between the RACH procedure and the SPS transmission. The preconfigured region or data may include at least one of an NPRACH resource that should transmit the NPRACH preamble or type-2 common search space (CSS) in which an NPDCCH for scheduling an NPDSCH to which a random access response (RAR) grant is to be transmitted may be transmitted.

In relation to the operation according to the priority, the UE may be configured to postpone transmission of the corresponding data rather than drop the data related to the SPS operation according to the priority. The corresponding operation may be applied to a UE which may receive an indication of early termination from the base station.

That is, when the NPUSCH transmission overlaps with the paging search space, the UE temporarily stops the NPUSCH transmission according to the SPS configuration. In a state in which the NPUSCH transmission is stopped, the UE determines whether the early termination is made by monitoring the paging search space. When the UE receives the indication of early termination, the UE may stop the NPUSCH transmission and when the UE does not receive the indication of the early termination, the UE may perform the remaining NPUSCH transmission according to the SPS configuration.

In the aforementioned embodiments, a method for controlling the timing advance (TA) or power through the retransmission may be considered.

Specifically, in relation to the embodiments considering the SPS retransmission, the timing advance (TA) control and the power control may be configured to be performed through retransmission.

A method for gradually increasing transmission (tx) power according to a retransmission number indicated by the base station for the timing advance (TA) or transmission (tx) power control from the viewpoint of the uplink semi-persistent scheduling (UL SPS) may be considered. When the retransmission number reaches the maximum retransmission number, the UE may determine that there is a problem in the timing advance (TA) or transmission (tx) power. As a result, the UE may transmit an RRC connection resume request message to the base station in order to move to the RRC connected state.

According to an embodiment, when the retransmission number reaches the maximum retransmission number, the corresponding SPS configuration may be configured to be implicitly deactivated (or released).

According to an embodiment, when the base station intends to indicate retransmission for the preconfigured uplink resource (PUR) for the SPS operation through a downlink channel or signal, the base station may be configured to additionally indicate the timing advance (TA) or transmission power (TP) value together with parameters for retransmission. That is, since the timing advance (TA) is wrong, before the UE performs a procedure for tracking, the base station indicates the timing advance (TA) or transmission power (TP) value in advance to contribute the battery saving of the UE.

According to another embodiment, the RACH procedure may be used to control the timing advance (TA) and the power for the idle mode SPS operation.

Specifically, when SPS transmission/reception is performed at a set number of times or a predetermined number of times or a specific time has elapsed, the UE may be configured to receive confirmation from the base station so as to continuously use the corresponding SPS transmission/reception by transmitting the NPRACH preamble and receiving the random access response (RAR).

The base station may configure the NPRACH preamble for SPS confirmation. When the base station receives the NPRACH preamble for the SPS confirmation, the base station may deliver Random Access Preamble Identifier (RAPID) and timing advance (TA) values to the UE or explicitly deliver a confirm message.

The base station may indicate an RACH carrier and a CE level for performing the SPS confirmation to the UE through SIB-NB (e.g., SIB2-NB or SIB22-NB). When there is a limit in a part for dividing the NPRACH preamble for the SPS confirmation, MSG3 may be configured to be scrambled to Semi-persistent Cell RNTI (SPS-C-RNTI) instead of Temporary Cell RNTI (TC-RNTI).

When there is a feedback channel for TA tracking, the UE may acquire the timing advance TA again according to a preconfigured condition.

Specifically, 1) when the timing advance (TA) value is out of a specific range or corresponds to a specific value, 2) when the base station indicates retransmission of a specific number of times or more, 3) a timer for TA tracking expires, the UE performing the SPS transmission/reception in any one of the above 1) to 3) may obtain the timing advance (TA) again by performing the RACH procedure.

In the RACH procedure for acquiring the timing advance (TA) again, MSG3 may include information indicating that the MSG3 is transmitted for TA update. The UE may receive the ACK from the base station through MSG4 and terminate the RACH procedure or receive an indication for idle mode SPS reconfiguration/release from the base station.

When the random access procedure (RA) is triggered in the feedback channel for TA tracking, a dedicated resource to be used for MSG1 may be designated to the UE and UE-ID to be used in MSG3 may be indicated.

When there is a TA valid window based on the timer for TA tracking, if the timing advance (TA) is acquired again by using the RACH procedure (e.g., early data transmission) until the corresponding timer expires, the time of the corresponding timer may increase or the corresponding timer may be configured to be reset.

A UE that is configured with the idle mode SPS may transmit information indicating the operation for TA update instead of transmitting uplink (UL) data through early data transmission (EDT).

The UE that receives the SPS configuration in the idle mode may be instructed to perform the RACH procedure for TA tracking. To this end, the base station may transmit, to the UE, configuration information (e.g., NPRACH preamble index, CE level, preamble transmission carrier, RAR carrier, RNTI value, EDT timer, etc.) for the RACH procedure together with the SPS configuration.

The UE that receives the SPS configuration in the idle mode as described above may be configured to perform the SPS transmission/reception at a period according to the SPS configuration and then perform the RACH procedure (e.g., EDT) at a specific period. The RACH procedure may be configured to be additionally performed at a time when the semi-persistent scheduling (SPS) resource and the NPRACH resource collide with each other.

When there is no feedback channel for TA tracking, if the base station determines that the timing advance (TA) value exceeds a specific range or corresponds to a specific value, the base station may indicate a narrowband physical downlink control channel (NPDCCH) order based RACH procedure.

In terms of the uplink semi-persistent scheduling (UL SPS), the base station may be configured to determine the timing advance (TA) by configuring the UE to continuously transmit minimum data (e.g., SRS, etc.) without an uplink transmission skipping (UL skipping) operation.

Even though the uplink transmission skipping (UL skipping) is indicated, the UE may be configured not to allow the uplink transmission skipping in order to perform the TA tracking at a specific period. In order for the UE in the idle mode to receive the indication for the aforementioned operation, downlink control information indicating the NPDCCH order may be transmitted even in the common search space (e.g., Type1-CSS, Type1A-CSS, or Type2A-CSS).

Additionally, a configuration (e.g., MSG1 dedicated resource, UE-ID, RNTI value, etc.) for NPRACH trigger may be together included at the time of the idle mode SPS configuration. An MSG1 resource may be implicitly mapped according to a specific location of the semi-persistent scheduling (SPS) resource configured through the RRC signaling and the contention based random access (CBRA) may be performed in spite of the NPDCCH order based NPRACH.

While the RACH procedure for TA update is being performed, the SPS configuration indicated by the RRC may be considered invalid until it is confirmed that the timing advance (TA) is valid and the UE may not perform the corresponding transmission/reception operation.

Additionally, the UE that is instructed with the UL idle mode SPS may transmit a preconfigured specific signal for the TA tracking even though the uplink transmission skipping according to the UL SPS is enabled.

According to an embodiment, the preconfigured specific signal may be transmitted in the SPS resource specified by at least any one of a specific period, a specific interval, or a specific number. As an example, in Nth uplink transmission according to the SPS resource, the preconfigured specific signal may be transmitted for the TA tracking.

According to an embodiment, the preconfigured specific signal may be an uplink demodulation reference signal (UL DMRS) or a narrowband physical random access (NPRACH) preamble. However, although not limited thereto, the preconfigured specific signal may be another type of uplink signal specifically indicated to be UE specific by the base station.

In regard to the TA feedback, the UE may detect downlink control information scrambled with an RNTI value defined based on the location of the time and/or frequency of uplink semi-persistent scheduling (UL SPS resource). The TA feedback of the UE may be performed by being divided into a UE ID in the MAC of a narrowband physical downlink shared channel payload (NPDSCH payload) scheduled by the corresponding downlink control information.

In this case, the downlink control information may be transmitted together in a search space indicating (re)activation/deactivation of the SPS configuration. In order to prevent an increase in the number of blind detection (BD) times, the payload size of the downlink control information may be adjusted to be the same as the payload size according to the search space through zero padding.

According to an embodiment, the UE may be configured to monitor (or detect) a downlink channel or signal for TA tracking.

Specifically, the UE may be configured to monitor specific downlink control information of the NPDCCH search space for TA tracking, or detect at least one signal of a Narrowband Reference Signal ( ) a Narrowband Primary Synchronization Signal (NPSS), a Narrowband Secondary Synchronization Signal (NSSS), or a Wake Up Signal (WUS).

The SPS resource may be used to control the timing advance (TA) and the power for the idle mode SPS operation.

Specifically, the UE may transmit a TA validity request or a Tx power control request to the base station through the configured resource. The base station may update the corresponding information through a feedback channel.

When TA update or power control is performed through the above configuration, a resource for TA update or Transmission Power control (TPC) need not be separately configured.

In the following description, both the TA and the TPC may be interpreted as TA update and/or TPC update.

According to an embodiment, MSG1 for requesting the TA update and the Tx power control may be transmitted by configuring a resource of a longer period than that of the configured semi-persistent scheduling resource.

The resource through which the corresponding MSG1 is transmitted may be a part of the configured semi-persistent scheduling (SPS) resource or a resource for Early Data Transmission (EDT). The base station may configure dedicated MSG1 for requesting the TA update and the Tx power control in the UE.

As the timing advance (TA) value used when transmitting the corresponding MSG1, a latest timing advance (TA) value may be configured to be used. The UE transmitting the MSG1 may be configured to monitor the random access response message (RAR) to receive only timing advance (TA) command information of the RAR and ignore the uplink (UL) grant for the remaining MSG3 transmission.

When the UE transmits MSG1 for requesting the control of the timing advance (TA) and the power as described above and the base station confirms that transmission of the MSG1, the base station may be configured to transmit a Tx power command to a UL grant location of the RAR. In addition, information included in MSG2 which is a response to MSG1 used for the purpose may be configured in a different format or interpreted differently from MSG2 in the legacy random access process. Alternatively, based on the delivered MSG2 information (e.g., TA and/or TPC), when there is data to be transmitted to the SPS resource, the UE may send the corresponding data and when there is no data, the UE may inform the base station that the MSG2 information is well received by transmitting dummy data.

As another method, the UE that receives the random access response message (RAR) receives the timing advance (TA) command and an MSG3 uplink (UL) grant to continuously use the configured semi-persistent scheduling (SPS) resource (for example, a timer meaning an interval in which the SPS resource is valid) after transmitting the MSG3 and receiving the MSG4. The MSG4 may reconfigure the semi-persistent scheduling (SPS) resource (for example, a timer reset meaning the interval in which the SPS resource is valid may be performed at the time of receiving the MSG4).

Hereinafter, a method for determining the validity of the timing advance (TA) value of the UE will be described in detail.

A TA validity confirmation algorithm for determining the validity of the timing advance (TA) value which the corresponding UE currently has at a timing when the UE which intends to transmit the uplink data through the preconfigured UL resource (PUR) for the SPS operation is to transmit the corresponding UL data or according to a period configured by the base station, or according to a preconfigured period may be performed.

The TA validity confirmation algorithm may be constituted by AND operations of various determination criteria including TA validity timer, Narrowband Reference Signal Received Power ((N)RSRP) detection, Time Difference of Arrival (TDoA), and the like. That is, when all determination criterions included in the corresponding algorithm are positive (or mean that there is no problem), it may be determined that the timing advance (TA) value of the corresponding UE is valid.

The base station may independently set thresholds of respective determination criteria. A case where a TA validity timer and a narrowband reference signal reception power (NRSRP) level are included in the validity confirmation algorithm will be described below in detail as an example.

It is assumed that the base station indicates 10 min with the TA validity timer value and X dBm with the narrowband reference signal reception power (NRSRP) level in relation to each threshold. When the current TA validity timer does not currently expire and the narrowband reference signal reception power (NRSRP) level is equal to or more than X dBm at the corresponding timing, the UE may determine that the current timing advance (TA) value is valid. The UE may transmit the uplink data in the PUR according to the corresponding determination result.

In relation to the start time of the TA validity timer, when the UE enters an idle mode for the first time after being configured from the base station, the TA validity timer may start a count. As another example, the TA validity timer may (re)start when the valid timing advance (TA) value is received from the base station through an immediate previous TA update procedure (e.g., RACH, EDT, etc.).

Since an operation of measuring the NRSRP each time the TA validity confirmation algorithm is performed is not beneficial in terms of the power saving of the UE, an NRSRP measurement period may be introduced. It may be configured that the UE is configured with the NRSRP measurement period from the base station and measures the NRSRP according to the corresponding period to apply a comparison result with a threshold configured from the base station to the TA validity confirmation algorithm.

In this case, a period in which the TA validity confirmation algorithm is performed and a period in which the NRSRP is measured may be independent of each other. Therefore, except for the period in which the TA validity confirmation algorithm is performed, when the UE determines that the current UE's NRSRP value is less than the threshold in the NRSRP measurement period, the UE may immediately determine that the current timing advance (TA) of the corresponding UE is invalid. The UE may attempt the TA update according to the corresponding determination result.

When the timing advance (TA) is invalid, the UE may not transmit the uplink data in a subsequent PUR. Alternatively, when the timing advance (TA) is invalid, it may be configured that the subsequent PUR is also invalid.

Thereafter, when the timing advance (TA) becomes valid through he TA update, the UE may transmit the uplink data in the PUR after the corresponding timing. Further, when the timing advance (TA) is valid, it may be configured that the subsequent PUR is also valid.

The base station may independently configure the PUR for each type. The type of PUR may include at least one of a Dedicated PUR, a Contention free shared PUR, or a Contention based shared PUR. The PUR for each type may be defined to be cell specific and/or CE-level specific.

As a method which may perform the TA update by using only two steps (e.g., MSG1 and MSG2 or NPUSCH and NPDCCH+NPDSCH) other than the legacy RACH procedure or EDT procedure for the TA update, the following method may be considered.

Method 1: The timing advance (TA) may be updated by using only MSG1 and MSG2.

The method may be applied to the contention free based PUR (e.g., dedicated PUR) and the contention free shared PUR. The base station may allocate a specific NPRACH resource and an NPRACH preamble for performing the TA update to be UE specific. The specific NPRACH resource may be specified by at least one of a carrier index, a period, a starting offset, a resource subcarrier number, or a repetition number.

A dedicated NPRACH resource for the TA update of the UE using the PUR may be limited to be used only in an NPRACH resource configured in a specific relationship with a PUR period. Further, NPRACH preamble transmission for the TA update may be allowed only in a preconfigured NPRACH resource.

The NPRACH preamble for the TA update is preferably a preamble for the contention based random access (CBRA). The reason is that ambiguity does not occur in the base station operation only when the UE that transmits the corresponding preamble should be one specific UE designated by the base station. Therefore, the base station may know which UE transmits the preamble through a preamble index in advance. When the base station detects the corresponding preamble index, the base station may update the TA value for the corresponding UE through the random access response (RAR).

According to an embodiment, since the base station knows that the corresponding UE transmits the NPRACH preamble for the TA update, the base station may be configured not to transmit the UL grant for the random access response (RAR).

Additionally, the base station may transmit the RNTI value configured to be used for the PUR to the corresponding UE once more for the confirmation operation. The base station may exchange the RNTI value configured to be used for the PUR through the corresponding random access response (RAR). When the UE need not perform MSG3 and MSG4 procedure operations in such a configuration, an advantage may be obtained in terms of a battery life.

However, the number of NPRACH resources to be configured in advance by the base station may increase. The base station should be able to share legacy NPRACH resources that do not additionally allocate the NPRACH resource for the TA update and in this case, the NPRACH preamble resources may be significantly insufficient.

In the method, since the base station configures a lot of NPRACH resources for updating the timing advance (TA) of the UE for the PUR transmission, overload is large in terms of resource utilization.

Method 1-1: As a method for solving the overload in the aforementioned resource utilization, a method for configuring the NPRACH preamble to be transmitted in the PUR will be described below.

A detailed example is described below. It is assumed that the base station is configures 12 different UEs to use 3.75 kHz subcarrier spacing single tones #k to #k+11 for dedicated PUR transmission, respectively. The period for the TA update may be set to a period that is N times larger than the period of the dedicated PUR set by the base station. 12 different UEs transmit different NPRACH preambles configured from the base station in the PUR positioned in the TA update period to update the TA.

As another example, it is assumed that the base station is configured to use 15 kHz subcarrier spacing single tones #k to #k+2 for dedicated PUR transmission in 3 different UEs, respectively. Similarly, 3 different UEs transmit different NPRACH preambles configured from the base station in the PUR positioned in the TA update period to update the TA. Since one of the PURs is used as the NPRACH resource for the TA update in such a configuration, there is an advantage in that a burden of the NPRACH resource which should be configured in advance by the base station is reduced.

However, the following items should be considered in order to update the TA through the second method.

First, all of time domain sizes of the PURs of the UEs configured back-to-back should be the same as each other. An example of the time domain size may be a repetition number.

Second, the corresponding UEs should update the timing advance (TA) at the same period. The corresponding method may be used even in the contention free based shared (CFS) PUR in addition to the dedicated PUR.

Method 2: A method for transmitting a known sequence in the PUR may be considered.

When the timing advance (TA) is updated by using the NPRACH preamble, there is an advantage that a timing advance (TA) in a range such as an initial access procedure may be estimated. When the timing advance (TA) of the UE using the PUR becomes invalid, it is determined that the TA may be updated to the extent of TA tracking in most cases. Therefore, it may be configured that the base station and the UE transmit the known sequence known thereby to the PUR instead of the NPRACH preamble to perform the TA update. In this case, the known sequence may be a QAM type signal, the DMRS sequence may be mapped in an order indicated in advance by the base station, and the DMRS sequence may be an RACH sequence (in the case of eMTC). There is an advantage in that the base station need not additionally allocate/spare the NPRACH resource for the PUR UE. However, the range of the TA which may be estimated may be limited to a cyclic prefix (CP) length of the NPUSCH.

Additionally, the proposed TA update methods may be configured to be performed when the timing advance (TA) of the corresponding UE is invalid, but when it is predicted that the timing advance (TA) will become invalid before next PUR transmission, the UE may be configured to perform the TA update in the TA update resource configured at the timing before the corresponding PUR. The base station may transmit only the TA command in the form of MAC CE in response to the corresponding information. Thereafter, the UE may operate to report to the UE that the timing advance (TA) of the UE is updated as much as the corresponding TA command through an initial PUR transmitted by applying the corresponding TA command.

The following cases may be considered as an algorithm that may predict that the timing advance (TA) of the corresponding terminal will be invalid before the next PUR transmission. As an example, when an NACK for PUR transmission is received (continuously) at a specific number of time (e.g., X times) (or Y % within a specific interval) or more, it may be predicted that the timing advance (TA) will become invalid. As another example, when an ACK for PUR transmission is not received (continuously) at a specific number of time (e.g., X times) (or Y % within a specific interval) or more, it may be predicted that the timing advance (TA) will become invalid.

This may also be a case where the UE directly determines when the TA validity timer expires know thereby and the TA validity timer expires before the next PUR. Furthermore, this may also be a case where the base station directly receives an indication that the timing advance (TA) of the corresponding UE is invalid through a physical channel such as the feedback channel from the UE.

Additionally, in a UE that is configured to use a TA update method not using the NPRACH preamble, the TA update may not be easy when the timing advance (TA) is actually changed a lot for any reason. Therefore, in order to supplement such a disadvantage, the UE that is configured to use the TA update method not using the NPRACH preamble may be configured to perform the TA update method using the NPRACH preamble when the timing advance (TA) is not updated within a specific threshold (e.g., timing window, number of attempts, etc.).

As an example, when the UE that performs the TA update through a method for transmitting a known sequence to the PUR fails to update the timing advance (TA) while attempting the TA update N times, the base station may be configured to perform the TA update by using a preconfigured TA update dedicated NPRACH preamble. When such a method is used, the TA update may be attempted through the PUR and the TA may be actually updated, and as a result, an NPRACH preamble for the TA update may be configured at a larger period than the methods using the NPRACH preamble among the methods proposed as above.

Even in any method, when the UE is updated with a valid timing advance (TA) through the TA update, a TA validation timer may be configured to restart.

When one or a plurality of criteria for determining the TA validity for PUR transmission are configured or if it is configured that when there is no UL data to be sent by the UE, the PUR transmission may be skipped, when the UE should apply the TA validity criterion needs to be configured.

When it is configured that the TA validity should be determined by applying the TA validity criterion before every PUR, there is no UL data to be sent to the corresponding PUR by the UE, and as a result, the PUR is intended to be skipped, but it should be determined whether a current timing advance (TA) is valid according to the TA validity criterion. In this case, since even a UE that does not perform the PUR transmission should always test the TA validity by consuming the power of the UE (e.g., serving cell NRSRP measurements, etc.), there is a disadvantage in terms of the battery life of the UE.

Therefore, the timing when the UE determines whether the TA is valid by applying the TA validity criterion may be configured as a timing earlier than, a subframe in which the corresponding PUR transmission starts when there is UL data to be transmitted in a specific PUR by the corresponding UE, by a specific subframe (i.e., specific time). That is, when there is no UL data to be sent, it may be advantageous because unnecessary power need not be wasted for TA validity test.

As another method, when there is no UL data to be sent in the corresponding PUR by the UE, operations (e.g., serving cell NRSRP measurements, etc.) of the UE should use the power among the TA validity criteria may be configured not to be performed. In this case, the TA alignment timer performs the validity test before every PUR location and in an operation such as narrowband reference signal reception power (NRSRP) measurements, the validity test is performed only when there is UL data to be transmitted. Even in this case, when there is no UL data to be sent, it may be advantageous because unnecessary power need not be wasted for the TA validity test.

According to an embodiment, when there is no UL data to be sent in the PUR by the UE, a timer (or a timer that should perform operations of consuming the power of the UE among the TA validity criteria) for validity determination according to the TA validity criterion may be configured to be held. When the corresponding timer is held and there is UL data to be sent in the subsequent PUR, the TA validity may be configured to be determined by restarting a timer that should perform the TA validity criterion.

Furthermore, the size of the corresponding cell may be implicitly indicated to the UE through the (N)PRACH preamble format configured in the corresponding cell. The UE may determine the size of the corresponding cell by using the information and if the cell size is small, the TA validity test may be intermittently performed. That is, the test period may be configured to be longer than when the cell size is not determined to be small (e.g., a general cell size).

For example, when the base station is indicates an (N)PRACH preamble format in which a cyclic prefix (CP) length is set to be short, such as FDD NPRACH preamble format 0, or TDD NPRACH preamble format 0-a, (or eMTC PRACH preamble format 4), the UE may determine that the size of the corresponding cell is small. The UE may be configured to perform the test at a longer period by a specific multiple of a TA validity test period indicated by the base station or by a specific multiple of a predefined TA validity test period.

In this case, the specific multiple may be indicated by the base station or may be predefined in a specification. When the corresponding method is applied, the UE may maintain the same level of TA validity in spite of performing only tests a smaller number of times compared to the general number of TA validity tests, and as a result, there is an advantage in terms of power saving of the UE.

Additionally, transmission power of the UE may be added based on the TA validity criteria. That is, when the UL TX power value of the UE is not larger than a specific threshold set by the base station, the UE may be configured not to transmit in the corresponding PUR. Since a UL Tx max power value which may be used with a change in a downlink CE level of the UE may be set, this method may be used as an indirect index indicating whether the current PUR may be used.

A UE that intends to perform transmission in a specific PUR may determine that the TA alignment timer expires through the TA validity test (or determine that the TA alignment timer will soon expire), and perform an operation for the TA update. When the corresponding UE fails to receive a TA update command from the base station, a UE operation needs to be defined.

When the UE fails to receive the TA update command from the base station for a time duration in which the TA update command may be received, the UE may regard that the current TA update is not required. Such an operation has an advantage of being simple, but a case where the base station sends the TA update command, but the UE fails to receive the TA update command may not be considered.

As another method, when the UE fails to receive the TA update command from the base station for the time duration in which the TA update command may be received, the UE may be configured to continuously operate on the assumption that the current timing advance (TA) is invalid. Thereafter, the UE may preferably perform an operation such as legacy RACH/EDT again.

As another method, when the UE fails to receive the TA update command from the base station for the time duration in which the TA update command may be received, the UE may determine that a current PUR configuration is invalid (that is, the current PUR configuration is released). In such a case, since an operation of the UE which processes that the PUR is released (the base station should also know that) may be a desirable operation in terms of resource utilization of the base station and an actual timing advance (TA) may be changed a lot, it may be preferable that the UE conservatively operates until the UE receives explicit information from the base station.

Hereinafter, a mechanism for the base station to facilitate BD will be described in detail.

When skipping of uplink data (that is, a case where when there is data to be sent, data is not sent) is allowed in a resource configured as idle mode uplink semi-persistent scheduling (UL SPS), the base station should perform blind detection (BD) regardless of whether the UE transmits data. This may become a burden for the base station, and even when no UE transmits the data, the corresponding resource may not be used for other purposes (e.g., NPUSCH, NPRACH, etc.). Therefore, a method for informing the base station of whether the UE transmits the data in a semi-permanent scheduling (SPS) resource may be considered.

As a first method, the UE transmits a preconfigured signal/channel at a specific location in relation to the SPS resource to inform the base station of transmitting the data by using the corresponding SPS resource.

Specifically, the specific location may be a location configured from the base station before the semi-persistent scheduling (SPS) resource or a location separated from the SPS resource by a predetermined number of subframes (SFs), slots, or symbols. The UE transmits a predetermined signal/channel at the specific location to inform the base station of transmitting the data in the corresponding SPS resource.

According to an embodiment, the corresponding signal/channel may be configured to be cell specific. In this case, when the base station transmits that even one UE transmits the data to the corresponding resource, the base station should perform blind detection (BD) for the corresponding resource, and as a result, the base station may be commonly configured in the same cell. Meanwhile, since the corresponding signal/channel should be distinguished from a signal/channel used in an adjacent cell, a cell ID, a frame index, etc., may be required for the corresponding signal/channel.

When the idle mode SPS resource is independently configured for each CE level, the corresponding signal/channel may be configured differently for each CE level even in the same cell. When only one signal/channel is used in the same cell, the base station needs to appropriately configure the idle mode SPS resource so as to prevent a location on which the corresponding signal/channel is transmitted from overlapping for each CE level.

That is, when an important element indicating whether even any UE is to actually transmit the data in the SPS resource from the standpoint of the base station, all or some UEs using the corresponding resource may be configured to use the same signal/channel other than a different signal/channel for each UE.

As a second method, the UE may inform the base station of whether to transmit the data to the idle mode SPS resource in each specific period. In this case, a specific period may be a period in which the UE wakes up from a sleep in order to monitor or receive a paging or a wake up signal or a period such as DRX or eDRX. Characteristically, the specific period may be larger than or equal to the period of the idle mode SPS resource.

A UE that notifies data transmission by using this method has an advantage of informing the base station of whether to transmit one or more SPS resources through one notification. The one notification may be transmitted in the form of each bitmap to be UE specific or may be a cell specific signal/channel as mentioned above.

According to an embodiment, the UE transmits uplink control information (UCI) to inform the base station of whether to transmit the data in the idle mode SPS resource. In this case, the uplink control information (UCI) may include HARQ process ID, initial transmission/retransmission or not, Transport Block Size (TBS), and the like and this may be included in MSG1/MSG3 or DMRS.

According to this method, since the base station need not perform blind detection (BD) for a region which the UE does not transmit, there is an effect in terms of power saving of the base station and further, since the corresponding resource may be used to be dedicated for other purposes, there is an advantage even in terms of efficient resource utilization.

According to an embodiment, a notification related to whether to transmit the uplink data may be utilized other purposes. Specifically, the UE may inform the base station of not transmitting the uplink data in the SPS resource (i.e., PUR).

That is, when the UE informs the base station of not transmitting the uplink (UL) data in the PUR, the base station may use the PUR for different UEs by detecting the corresponding signal. The embodiment has an advantage in the case of the dedicated PUR. Specifically, when a specific PUR is allocated to a single UE, if the corresponding UE notifies that the specific PUR is not used, the base station may reallocate the corresponding PUR resource to another UE.

A signal related to whether to transmit the uplink data may be transmitted away in front of the PUR resource by a specific location, but may be delivered to the frontmost part of the corresponding PUR resource. For example, when it is assumed that the PUR resources allocated by the base station are K subframes, N subframes among them may be used for notifying that the UL data is transmitted or not transmitted in the PUR. If it is notified that the data is transmitted in the PUR resource, the UE may transmit the UL data in K-N subframes.

Hereinafter, an SPS search space configuration will be reviewed in detail.

A carrier to be monitored in relation to the search space for idle mode semi-persistent scheduling (Idle mode SPS) may be indicated by RRC.

Specifically, when the search space for the idle mode SPS is newly introduced or a legacy search space configuration is reused, the carrier to be monitored in relation to the search space for the idle mode SPS may be indicated through RRC signaling.

As an example, when the search space is newly introduced for the idle mode SPS and the base station does not explicitly indicate the corresponding carrier, the UE may be configured to monitor the corresponding search space in an anchor DL carrier.

As another example, when the legacy search space configuration is reused and the base station does not explicitly indicate the carrier to be monitored in relation to the search space for the idle mode SPS, the UE may be configured to monitor the search space at the same location as the carrier corresponding to the legacy search space.

Specifically, when a legacy USS is reused as the search space for the idle mode SPS, the base station may explicitly indicate the carrier for the idle mode SPS. When the base station does not explicitly indicate the corresponding carrier information, the NPDCCH for the idle mode SPS may be configured to be transmitted in the same carrier as the carrier for monitoring the legacy USS.

Hereinafter, an HARQ procedure related to the SPS will be reviewed in detail.

The maximum number of HARQ processes usable for the idle mode SPS may be determined based on an HARQ capability of each UE.

In the case of narrowband Internet of things (NB-IoT), the maximum number of HARQ processes usable for the idle mode SPS by a single HARQ capable UE becomes 1 and the maximum number of HARQ processes usable for the idle mode SPS by two HARQ capable UEs becomes 2. Like eMTC, in the case of 8 HARQ or 16 HARQ capable UEs, the maximum number of HARQ processes usable for the idle mode SPS becomes 8 or 16.

Meanwhile, the base station may indicate the actual number of HARQ processes to be used for the idle mode SPS through an RRC configuration. When the actual number of HARQ processes to be used for the idle mode SPS indicated by the base station is larger than the number of HARQ processes which the corresponding UE may have, the UE may discard a related configuration by regarding that the corresponding RRC configuration is invalid.

Hereinafter, early termination related to the idle mode SPS will be reviewed in detail.

The UE may additionally receive an indication of the early termination from the base station. Specifically, when the indication of (re)activation/deactivation/retransmission is received through the downlink control information (DCI) of the search space for the idle mode SPS or the payload of the paging narrowband physical downlink shared channel (NPDSCH), the UE may additionally receive the indication of the early transmission.

When the base station semi-statically indicates the UL resource and the repetition number and then determines that the uplink data need not be received from the UE any longer, the base station may indicate the early transmission to the UE.

According to an embodiment, when receiving the indication of (re)activation/deactivation of the SPS configuration from the base station while transmitting the NPUSCH according to the SPS configuration, the UE may stop transmission of the NPUSCH which is repeatedly transmitted.

According to an embodiment, by newly defining a validation scheme for the early termination, the base station may explicitly indicate the early termination to the UE. Alternatively, by adding a field of 1 bit to a field of the UL grant, the base station may explicitly indicate the early termination to the UE.

Hereinafter, items which may be additionally considered in related to the method for indicating the SPS operation by using the paging or wake up signal will be described in detail.

Among the aforementioned embodiments or methods, the following method may be considered for an operation of the base station which indicates (re)activation or deactivation or retransmission or release by using the paging NPDCCH/NPDSCH or wake up signal (WUS).

(1) The WUS for a purpose of indicating SPS (re)activation or deactivation, or retransmission or release may be additionally configured in the SPS configuration.

That is, in this method, in the case of a UE supporting the SPS operation, a WUS resource for SPS-related indication purpose and a WUS resource for A paging indication purpose are separately configured. For the SPS-related indication purpose, retransmission, (re)activation, deactivation, or release may be configured to be indicated by using different WUSs. The corresponding WUS is configured differently from the WUS for the paging purpose, and as a result, the corresponding WUS should be able to be distinguished from a legacy WUS operation. In this case, the overhead of the base station may increase and a time for which the UE wakes up in order to receive the WUS for the SPS-related indication purpose may increase.

(2) A method may be considered in which some WUS resources classified by grouping in the WUS for the paging purpose are used for the SPS-related indication purpose.

In this method, there is an advantage in that separate resource allocation for the WUS for the SPS indication purpose is not required, but a capacity capable of grouping the WUSs for the paging purpose is reduced and collision may thus occur.

(3) A new paging occasion for the UEs configured with the SPS operation may be independently configured by using the SIB or RRC signaling.

The new paging occasion may be configured to be shorter than the DRX (or eDRX) period of the legacy paging occasion. The shortened period may be configured to be dependent on a time during which the timing advance (TA) between the UE and the base station performing the SPS operation may be maintained. When the new paging occasion is introduced, a location at which the WUS is transmitted may also be configured according to the corresponding paging occasion (PO).

Hereinafter, a UE initiate release process will be described in detail in relation to the operation of the idle mode semi-persistent scheduling (IM-SPS).

There are several methods described above as the method for indicating the release by the base station in a situation where the timing advance (TA) is correct, but when the UE in the RRC idle state reaches a situation where the TA may not be correct for any reason, the UE may need to perform self-release.

When the TA tracking is performed through the RACH procedure, if the UE fails in the TA tracking within a time according to a specific number of times or a specific timer, the idle mode semi-persistent scheduling (IM-SPS) may be configured to be self-released.

As another method, the base station may be configured to periodically transmit a (re-)confirm message for the idle mode semi-persistent scheduling (IM-SPS) through the downlink channel or signal. When the UE fails to receive the (re-)confirm message within the time according to the specific number of times or specific timer, the UE may self-release the idle mode semi-persistent scheduling (IM-SPS).

The specific number of times and the specific timer value of the above methods may be indicated by the base station or may be defined as a specific value in advance when the SPS is configured through the RRC signaling.

As another scheme, a method in which the UE informs the base station of release or reconfiguration of the idle mode semi-persistent scheduling (IM-SPS) may be considered.

In the case of performing the TA tracking through the RACH procedure, the UE may be configured to report, to the base station, that the RACH procedure is to request the release or reconfiguration of the idle mode semi-persistent scheduling (IM-SPS) through the MSG3. The base station may confirm the release/reconfiguration request of the idle mode semi-persistent scheduling (IM-SPS) through the MSG4.

According to an embodiment, the UE may perform the corresponding operation after returning to the connected mode through an RRC resume request. Specifically, the UE that returns to the connected mode may perform a scheduling request/buffer status report (SR/BSR) and perform an idle mode semi-persistent scheduling (IM-SPS) release/reconfiguration request by using the narrowband physical uplink shared channel (NPUSCH). In this regard, the base station may confirm the corresponding request and the UE may be configured to operate according to the indication of the base station.

When there is no data to be sent by the UE or uplink data transmission skipping is performed continuously or discontinuously N times (in this case, N is a natural number equal to or more than 1), the corresponding semi-persistent scheduling (SPS) resource is automatically released or information for informing the base station of the release may be transmitted in an 'SPS resource after skipping N times'. In such a configuration, there is an advantage in that the UE may perform the self-release without receiving release information from the base station.

In the case where the uplink data transmission skipping is continuous or discontinuous, a detailed operation related to the release of the SPS configuration will be described below.

In the release of the SPS configuration due to skipping of uplink data transmission N times, the SPS configuration may be configured to be released when there is skipping N times for consecutive PURs.

In this case, only when skipping is continuously performed for N consecutive PURs, the release may be configured to be automatically (implicitly) released. For example, it may be assumed that the UE does not transmit the UL data for N−1 consecutive PURs.

Thereafter, when the UE transmits the UL data to the immediately subsequent PUR, the skipping count of N−1, which has already been skipped, may be initialized, and the UE may newly start a count for filling the skipping count N from the beginning. In this case, the SPS configuration is maintained.

On the contrary, when the corresponding UE does not transmit the UL data to the immediately subsequent PUR, the UE may be configured to determine that skipping of consecutive PURs is completed N times and (automatically) (implicitly) release the SPS configuration.

Even though the base station fails to receive the UL data in N−1 consecutive PURs, when the base station receives the UL data in the immediately subsequent PUR, the skipping count of N−1 in which skipping is already completed may be initialized and the count for filling a skipping count of N may newly start from the beginning.

In this method, since the PUR configuration for the SPS operation is continued for UEs that do not perform N-times consecutive skipping, the UE that intends to the uplink data in the PUR need not receive a new PUR configuration. The UE that receives the SPS configuration through the RRC signaling need not re-enters the connected mode and there is an advantage in terms of the power saving of the UE.

Meanwhile, in the release of the SPS configuration due to N-times skipping of uplink data transmission, the SPS configuration may be configured to be released when there is N-times skipping for the PUR regardless of consecutive/inconsecutive PURs.

Unlike the method in which the number of skipping times is counted only when the UL data is skipped for the aforementioned consecutive PURs, the release may be configured to be (automatically) (implicitly) allowed when skipping the UL data for N-times PURs regardless of consecutiveness/inconsecutiveness.

For example, it may be assumed that the UE does not transmit the UL data for N−1-times consecutive PURs (regardless of consecutiveness/inconsecutiveness). Thereafter, even though the corresponding UE transmits the UL data in the immediately subsequent PUR, the skipping count of N−1 counted above is not initialized but maintained. At a moment when the skipping count of N is filled because the corresponding UE does not transmit the UL data in the subsequent PUR (regardless of consecutiveness/inconsecutiveness), the PUR configuration may be configured to be (automatically) (implicitly) released.

The advantage of applying this method is that the base station may efficiently manage the resource. The reason is that resources are limited to allocate the PURs to all of a large number of UEs that want to use the PUR. Therefore, when the base station gives a total of N-times skipping occasions to the UE and the UE that performs N-times skipping intends to transmit the uplink data in the PUR again, the base station may be configured with new PUR.

Further, in the case of the method for releasing the PUR configuration only N-times consecutive skipping, the UE may intentionally send the UL data in the PUR which exists immediately after skipping the PUR N−1 times. In this case, the UE may occupy the corresponding PUR without a limit. Such a problem may be solved by setting the skipping count which is a condition of the release to a total of N times regardless of consecutiveness/inconsecutiveness.

Furthermore, even though skipping is allowed when there is no data to be sent by the UE, when confirmation of the UE for (re)activation and release transmitted by the base station is required, skipping may be configured not to be allowed. The configuration of a skipping exception interval has an advantage in that the base station may receive the confirmation of the UE for (re)activation and release.

Additionally, it may be configured to be expected that the base station does not send a retransmission request for the confirmation transmitted by the UE. The reason for such a configuration is that since confirmation information transmitted by is not actual UL data, retransmission of the corresponding information may not be required in terms of the UE. Accordingly, when the base station requests retransmission for the corresponding information, the UE may determine that the request for retransmission is invalid.

Downlink control information indicating retransmission may be introduced in a PUR in which HARQ is introduced. The base station may be configured to explicitly release a PUR which operates in the idle mode through the NPDCCH indicating the corresponding retransmission.

The release of the PUR may be indicated by using a specific 1-bit field of the downlink control information indicating the corresponding retransmission. Alternatively, by a specific field value of a corresponding downlink control information format (DCI format) to a predetermined value, it may be configured to deliver that the corresponding release indication is valid. Alternatively, it may be configured that a DL grant other than a retransmission UL grant (UL grant) may come through the NPDCCH indicating the corresponding retransmission, and the release of the PUR may be configured to be explicitly indicated through the NPDSCH scheduled by the corresponding DL grant.

According to an embodiment, when the UE that fails to receive the indication of the explicit release for the PUR from the base station enters the connected mode, the UE may be configured to determine that the legacy PUR configuration is released. In order to configure to reuse the corresponding PUR configuration value, the base station may explicitly instruct the UE entering the connected mode to use the legacy PUR configuration.

Hereinafter, an idle mode operation of a UE in which semi-persistent scheduling is configured will be reviewed.

Among the aforementioned embodiments or methods, methods that may be used even in the connected mode may be basically applied. Meanwhile, the legacy connected mode SPS is applied to LTE/eMTC and SPS for a BSR purpose is introduced into the narrowband Internet of things (NB-IoT). When SPS for a unicast purpose is introduced into the NB-IoT, the following items may be considered.

First, a dynamic grant based deactivation may be considered.

Since the connected mode UE continuously monitors the UE-specific search space (USS), the connected mode UE may receive the indication such as (re-)activation/deactivation/retransmission from the base station by using a search space such as a dynamic grant.

The base station may be configured to indicate dynamic grant based deactivation. Whether the dynamic grant based deactivation is indicated may be distinguished according to a transmission/reception timing of the NPDSCH/NPUSCH according to the corresponding dynamic grant and a transmission/reception timing of the NPDSCH/NPUSCH according to the SPS grant.

When the NPDSCH/NPUSCH transmission/reception timing according to the dynamic grant overlaps with the NPDSCH/NPUSCH transmission/reception timing according to the SPS grant at least partly, the UE may determine that the dynamic grant indicates SPS deactivation.

When the NPDSCH/NPUSCH transmission/reception timing according to the dynamic grant does not overlap with the NPDSCH/NPUSCH transmission/reception timing according to the SPS grant, the UE may determine that the dynamic grant indicates the SPS deactivation.

Second, an item related to the HARQ procedure may be considered.

In a state in which 2 HARQ capable UEs are instructed to perform 2 HARQ, when using one HARQ process for the SPS purpose, the UE may be configured to expect only single HARQ. Specifically, when the corresponding UE monitors a UE specific search space (USS) which exists during a specific period (e.g. PDCCH period) from a resource instructed to be transmitted/received according to the configured grant after the SPS is (re)activated, the corresponding UE may be configured to expect only the single HARQ.

Hereinafter, a shared resource among types of resources related to the semi-persistent scheduling operation will be described in detail with reference to FIG. 12.

FIG. 12 is a diagram for describing a shared resource configured in relation to a semi-persistent scheduling operation according to an embodiment of the present disclosure.

As a method in which multiple UEs share the resource for a configured resource in the idle mode and/or connected mode, MU-MIMO may be considered. An example of a situation considering the MU-MIMO may be illustrated as in FIG. 12.

The base station may configure UL SPS information in each UE through the SIB or RRC signaling. The configuration may include an SPS share resource, DMRS for each UE and/or PUSCH orthogonal cover code (OCC) for each UE, a channel/signal configuration (e.g., period, offset, etc.) indicating (re-)activation/deactivation/retransmission, and the like.

Thereafter, activated UEs may transmit the NPUSCH to a share resource according to a configuration of each UE. The uplink data transmission skipping (UL skipping) may be allowed and each UE may also receive an indication how many UEs share the corresponding shared resource.

Thereafter, all UEs that are configured with each shared resource may monitor and/or detect a region in which a channel and/or a signal indicating (re-)activation/deactivation/retransmission may be transmitted.

Characteristically, in the case of using the shared resource as described above, the SPS operation such as (re-)activation/deactivation/retransmission may be performed in the form of a UE group.

In this case, when the downlink control information (DCI) performs a role of indicating (re-)activation/deactivation/retransmission, a search space in which the DCI may be transmitted may be configured similarly to the random access response (RAR) search space. That is, the corresponding DCI may be scrambled with different RNTI values according to which shared resource is transmitted and the UE may also know the corresponding RNTI value according to information such as the time and/or frequency of the shared resource transmitted thereby.

In addition, the search space in which the corresponding DCI may be transmitted may be configured to be the same as a search space in which the DCI indicating (re-)activation/deactivation may be received. In this case, the RNTI value may be predetermined according to the time and/or frequency of the shared resource as mentioned above.

Additionally, the DCI payload size may be configured to equally by performing zero padding on the shorter side to prevent an increase in blind detection (BD). A specific field of the corresponding DCI may indicate the ACK/NACK in the form of the bitmap. The location/order of each bit constituting the corresponding bitmap may be implicitly mapped by the demodulation reference signal sequence (DMRS sequence) or the orthogonal cover code (OCC).

Further, a DL assignment field of the corresponding DCI may schedule an NPDSCH for adaptive retransmission. A specific field of the corresponding DCI may be configured to indicate whether there is adaptive retransmission scheduling information for the NACK of the ACK/NACK indicated in the form of the bitmap as described above. In this case, the UE that detects the ACK need not receive a subsequent NPDSCH.

On the contrary, when the UE that detects the NACK receives an indication that there is no adaptive retransmission information in the NPDSCH in the aforementioned specific field, the UE need not receive the subsequent NPDSCH and performs non-adaptive retransmission in a next UL SPS resource.

When the UE that detects the NACK receives an indication that there is the adaptive retransmission information in the NPDSCH in the aforementioned specific field, the UE need not receive the subsequent NPDSCH. In addition, the UE may read the UL grant of the payload (e.g., MAC message, etc.) of the corresponding NPDSCH, and accordingly perform dynamic UL retransmission or adaptive retransmission in the next UL SPS resource.

Unlike described above, when there is no downlink control information (DCI) indicating (re-)activation/deactivation and the operation such as (re-)activation/deactivation is indicated to the NPDSCH scheduled by the corresponding DCI, a specific field of the corresponding DCI may indicate whether the indication for the operation such as the (re-)activation/deactivation is included in the subsequent NPDSCH.

In this case, a UE which is not activated or does not transmit the NPUSCH due to the UL data transmission skipping (UL skipping) may also attempt to detect the corresponding DCI. In addition, the RNTI value for this may be delivered through the system information block (SIB) or RRC signaling.

When receiving an indication that information indicating (re-)activation/deactivation in the specific field of the DCI detected by the UE, the corresponding UE needs to receive the NPDSCH. The UE may perform the operation such as the (re-)activation/deactivation according to the information included in the NPDSCH.

Additionally, the base station may configure the shared resource to a plurality of UEs through the RRC signaling or system information and a resource suitable for each UE may be configured to be selected by applying a UE ID or a UE specific value to a predetermined specific equation.

Alternatively, as a method applicable to a system that similarly uses uplink/downlink (UL/DL) carriers, such as time division duplex (TDD), the following item may be considered.

The base station may independently configure a UL SPS transmission resource of each UE through the RRC signaling. In addition, each UE may determine whether the uplink data of another UE is transmitted based on energy detection by sensing the corresponding UL resource from a location prior to the starting subframe (SF) of the resource configured thereto by K subframes (K SFs) (e.g., K=4) to determine whether a preconfigured grant of the corresponding UE is valid.

Hereinafter, in FIG. 13, the aforementioned embodiments will be described in detail in terms of the method in which the base station transmits the uplink data in the wireless communication system supporting the narrowband Internet of things system.

FIG. 13 is a flowchart for describing a method for transmitting, by a UE, uplink data in a wireless communication system supporting a narrowband Internet of things system according to an embodiment of the present disclosure.

Referring to FIG. 13, the method for transmitting, by a UE, uplink data in a wireless communication system supporting a narrowband Internet of things system according to an embodiment of the present disclosure may include receiving preconfigured uplink resource information in an RRC connected state (S1310) and transmitting uplink data in an RRC idle state (S1320).

In S1310, the UE receiving information related to a preconfigured uplink (UL) resource (PUR) in the RRC connected state. The preconfigured uplink resource (PUR) may be a resource configured for the UE to transmit the uplink data in the RRC idle state.

According to an embodiment, the preconfigured uplink resource (PUR) may be a dedicated resource for the UE in the RRC idle state.

In S1320, the UE may transmit the uplink data by using the preconfigured uplink resource (PUR) in the RRC idle state.

According to an embodiment, when the preconfigured UL resource (PUR) is the dedicated resource and there is no data to be transmitted in the preconfigured UL resource (PUR), transmission of the uplink data may be skipped.

According to an embodiment, when the transmission of the uplink data is skipped for a predetermined number of times or more, the preconfigured uplink resource (PUR) may be released.

According to an embodiment, when the preconfigured uplink resource (PUR) is released, the UE may transmit information indicating the release in the preconfigured uplink resource (PUR) positioned at a timing after the transmission of the uplink data is skipped by the predetermined number of times. Specifically, the UE may transmit information indicating the release in a next PUR of a PUR in which the skip is last performed.

According to an embodiment, when the transmission of the uplink data is skipped in the preconfigured uplink resource (PUR), the UE may transmit skip related information indicating the skip of the uplink data to the base station.

According to an embodiment, the skip related information may be transmitted in one region of the preconfigured uplink resource (PUR). As a specific example, the skip related information may be transmitted in the earliest part of the preconfigured uplink resource (PUR).

According to an embodiment, the skip related information may include information on the number of times related to the skip of the uplink data transmission and may be transmitted only once when the uplink data transmission is consecutively skipped for a multiple number of times.

According to an embodiment, in a resource region corresponding to the skip of the multiple number of times among regions according to the preconfigured uplink resource (PUR), uplink data of another UE in the RRC idle state may be transmitted. This is to increase resource utilization when the preconfigured uplink resource (PUR) is the dedicated resource.

According to an embodiment, the transmitting of the uplink data may further include receiving a narrowband physical downlink control channel (NPDCCH) in the RRC idle state. The narrowband physical downlink control channel (NPDCCH) may include information indicating disable of the skip.

According to an embodiment, when the skip of the transmission of the uplink data is disabled, the UE may transmit a specific signal. Specifically, the specific signal may be a signal for tracking of a timing advance (TA) related to a transmission timing of the uplink data or a signal related to confirmation of configuration or release of the preconfigured uplink resource (PUR).

According to an embodiment, the signal for the tracking of the timing advance (TA) may be a demodulation reference signal (DMRS) for demodulation of the uplink data or a narrowband physical random access channel (NPRACH) preamble.

Hereinafter, the consecutive uplink data skip in the transmitting of the uplink data (S1320) will be described in detail with reference to FIG. 14.

FIG. 14 is a diagram for specifically describing an operation related to skip of uplink data transmission according to an embodiment of the present disclosure.

Only when the transmission of the uplink data is consecutively skipped for the predetermined number of times in the preconfigured uplink resource (PUR), the configuration or release of the preconfigured uplink resource (PUR) may be configured to be released.

Referring to FIG. 14, after the transmitting of the uplink data (S1320) is started, when the UE has no uplink data to be transmitted or receives an indication of uplink data transmission skipping (UL skipping), the UE may skip the transmission of the uplink (S1321). When the transmission of the uplink data is skipped, the number of skipping times is counted, and as a result, the number of skipping times increases by 1 (S1322).

In S1323, when the current number of skipping times is equal to or more than a predetermined number of times (e.g., N is equal to or more than 1), the preconfigured uplink resource (PUR) is released (S1324).

In step S1323, when the current number of skipping times is less than the predetermined number of times, the preconfigured uplink resource (PUR) is maintained (S1325). When the UE transmits the uplink data in the preconfigured uplink resource (PUR), the number of skipping times may be initialized.

Since the configuration of the preconfigured uplink resource (PUR) is maintained for UEs that do not perform N consecutive skippings, a UE that intends to transmit the uplink data in the preconfigured uplink resource (PUR) need not receive a new PUR configuration. In this case, the UE that receives the PUR configuration through the RRC signaling need not re-enter the RRC connected state and there is an advantage in terms of power saving of the UE.

In terms of implementation, the operation of the UE described above may be specifically implemented by terminal devices 1620 and 1720 illustrated in FIGS. 16 and 17 of the present disclosure. For example, the operation of the UE described above may be performed by processors 1621 and 1721 and/or radio frequency (RF) units (or modules) 1623 and 1725.

For example, the processor may be configured to receive information related to a preconfigured uplink (UL) resource (PUR) for transmitting the uplink data in an RRC connected state. The processor may be configured to transmit the uplink data by using the preconfigured uplink resource (PUR) in an RRC idle state.

The processor may be configured to skip transmission of the uplink data when the preconfigured UL resource (PUR) is the dedicated resource and there is no data to be transmitted in the preconfigured UL resource (PUR).

Hereinafter, in FIG. 15, the aforementioned embodiments will be described in detail in terms of a method for receiving, by a base station, uplink data in a wireless communication system supporting a narrowband Internet of things system.

FIG. 15 is a flowchart for describing a method for receiving, by a base station, uplink data in a wireless communication system supporting a narrowband Internet of things system according to another embodiment of the present disclosure.

Referring to FIG. 15, the method for receiving, by a base station, uplink data in a wireless communication system supporting a narrowband Internet of things system according to another embodiment of the present disclosure may include transmitting preconfigured uplink resource information to a UE in an RRC connected state (S1510) and receiving uplink data from a UE in an RRC idle state (S1520).

In S1510, the base station may transmit information related to a preconfigured UL resource (PUR) to UE receiving information related to a preconfigured uplink (UL) resource (PUR) to the UE in the RRC connected state. The preconfigured uplink resource (PUR) may be a resource configured for the UE to transmit the uplink data in the RRC idle state.

According to an embodiment, the preconfigured uplink resource (PUR) may be a dedicated resource for the UE in the RRC idle state.

In S1520, the base station may receive the uplink data from the UE in the RRC idle state through the preconfigured uplink resource (PUR).

According to an embodiment, when the preconfigured UL resource (PUR) is the dedicated resource, transmission of the uplink data may be skipped. When the transmission of the uplink data is skipped for a predetermined number of times or more, the preconfigured uplink resource (PUR) may be released.

According to an embodiment, when the preconfigured uplink resource (PUR) is released, the base station may receive information indicating the release in the preconfigured uplink resource (PUR) positioned at a timing after the transmission of the uplink data is skipped by the predetermined number of times. Specifically, the base station may receive the information indicating the release in a next PUR of a PUR in which the skip is last performed.

Accordingly, only when the transmission of the uplink data is consecutively skipped for the predetermined number of times or more in the preconfigured uplink resource (PUR), the preconfigured uplink resource (PUR) may be configured to be released. Specifically, when the transmission of the uplink data is skipped, the base station may count the number of skipping times. When the base station receives the uplink data in the preconfigured uplink resource (PUR), the number of skipping times may be initialized.

According to an embodiment, when the transmission of the uplink data is skipped in the preconfigured uplink resource (PUR), the base station may receive skip related information indicating the skip of the uplink data from the UE.

According to an embodiment, the skip related information may be transmitted in one region of the preconfigured uplink resource (PUR). As a specific example, the skip related information may be transmitted in the earliest part of the preconfigured uplink resource (PUR).

According to an embodiment, the skip related information may include information on the number of times related to the skip of the uplink data transmission and the base station may receive the corresponding information only once when the uplink data transmission is consecutively skipped for a multiple number of times.

According to an embodiment, the base station may allocate a resource region corresponding to the skip of the multiple number of times among regions according to the preconfigured uplink resource (PUR) to another UE in the RRC idle state. As a result, the base station may receive the uplink data from another UE in the RRC idle state in the resource region corresponding to the skip of the multiple number of times. This is to increase resource utilization when the preconfigured uplink resource (PUR) is the dedicated resource.

According to an embodiment, the base station may indicate the skip of the transmission of the uplink data to be disabled.

Specifically, the transmitting of the uplink data may further include transmitting a narrowband physical downlink control channel (NPDCCH) to the UE in the RRC idle state. The narrowband physical downlink control channel (NPDCCH) may include information indicating disable of the skip.

According to an embodiment, when the skip of the transmission of the uplink data is disabled, the base station may receive a specific signal. Specifically, the specific signal is a signal for tracking of a timing advance (TA) related to a transmission timing of the uplink data or a signal related to confirmation of the SPS configuration.

According to an embodiment, the signal for the tracking of the timing advance (TA) may be a demodulation reference signal (DMRS) for demodulation of the uplink data or a narrowband physical random access channel (NPRACH) preamble.

In terms of implementation, the operation of the base station described above may be specifically implemented by terminal devices 1610 and 1710 illustrated in FIGS. 16 and 17 of the present disclosure. For example, the operation of the UE described above may be performed by processors 1611 and 1711 and/or radio frequency (RF) units (or modules) 1613 and 1715.

For example, the processor may be configured to transmit information related to a preconfigured uplink (UL) resource (PUR) for transmitting the uplink data to the UE in the RRC connected state. The processor may be configured to receive the uplink data in the preconfigured uplink resource (PUR) from the UE in the RRC idle state.

When the preconfigured UL resource (PUR) is the dedicated resource, the transmission of the uplink data may be skipped.

When the processor fails to receive the uplink data from the UE in the RRC idle state in which the dedicated PUR is configured more than a predetermined number of times, the processor may be configured to release the semi-persistent scheduling (SPS) configuration.

Since the information related to the preconfigured UL resource (PUR) is transmitted through radio resource control (RRC) signaling in the present disclosure as described above, and as a result, the UE in the RRC idle state may transmit the uplink data. Therefore, in the present disclosure, complexity may be reduced and power consumption may be reduced.

Furthermore, in the present disclosure, when there is no data to be transmitted in the preconfigured uplink resource, the transmission of the uplink data is skipped and when the transmission of the uplink data is skipped for a predetermined number of times or more, the preconfigured uplink resource (PUR) is released. Therefore, since the UE need not separately receive release information from the base station, battery performance of the UE may be improved in the present disclosure.

Furthermore, in the present disclosure, when the transmission of the uplink data is consecutively skipped for a predetermined number of times or more, the preconfigured uplink resource (PUR) is released, and as a result, the UE in the RRC idle state need not re-enter the RRC connected state for reconfiguration of the preconfigured uplink resource (PUR). Therefore, in the present disclosure, even when the transmission of the uplink data is intermittently skipped, the number of skipping times is accumulated to prevent the SPS configuration from being released, thereby further saving power consumed in the UE.

Furthermore, in the present disclosure, when the transmission of the uplink data is consecutively skipped for a multiple number of times, in a resource region corresponding to the skip of the multiple number of times among regions according to the preconfigured uplink resource (PUR), uplink data of another UE in the RRC idle state may be transmitted. Therefore, resource utilization may be increased when the preconfigured uplink resource (PUR) is configured to be UE specific.

Furthermore, in the present disclosure, when the skip of the uplink data transmission is disabled, the specific signal is transmitted, and as a result, it is possible to confirm TA tracking or the configuration or release of the preconfigured uplink resource (PUR) by using the specific signal. Therefore, in the present disclosure, it is possible to minimize an influence which the skip of the uplink data transmission exerts on the semi-persistent scheduling (SPS) operation.

Overview of Devices to which Present Disclosure is Applicable

FIG. 16 illustrates a wireless communication device to which methods proposed by the present disclosure are applicable according to another embodiment of the present disclosure.

Referring to FIG. 16, a wireless communication system may include a first device 1610 and multiple second devices 1620 positioned in a region of the first device 1610.

According to an embodiment, the first device 1610 may be the base station and the second device 1620 may be the UE, and expressed by wireless devices, respectively.

The base station 1610 includes a processor 1611, a memory 1612, and a transceiver 1613. The processor 1611 implements a function, a process, and/or a method which are proposed in FIGS. 1 to 15 above. Layers of a radio interface protocol may be implemented by the processor. The memory 1612 is connected with the processor to store various information for driving the processor. The transceiver 1613 is connected with the processor to transmit and/or receive a radio signal. Specifically, the transceiver 1613 may include a transmitter transmitting the radio signal and a receiver receiving the radio signal.

The UE 1620 includes a processor 1621, a memory 1622, and a transceiver 1623.

The processor 1621 implements a function, a process, and/or a method which are proposed in FIGS. 1 to 15 above. The layers of the radio interface protocol may be implemented by the processor. The memory 1622 is connected with the processor to store various information for driving the processor. The transceiver 1623 is connected with the processor to transmit and/or receive a radio signal. Specifically, the transceiver 1623 may include a transmitter transmitting the radio signal and a receiver receiving the radio signal.

The memories 1612 and 1622 may be positioned inside or outside the processors 1611 and 1621 and connected with the processors 1611 and 1621 by various well-known means.

Further, the base station 1610 and/or the UE 1620 may have a single antenna or multiple antennas.

The first device 1610 and the second device 1620 according to another embodiment are described.

The first device 1610 may be a base station, a network node, a transmitting terminal, a receiving terminal, a wireless device, a wireless communication device, a vehicle, a vehicle equipped with an autonomous driving function, a connected car, a unmanned aerial vehicle, UAV), an Artificial Intelligence (AI) module, a robot, an Augmented Reality (AR) device, a Virtual Reality (VR) device, a Mixed Reality (MR) device, a hologram device, a public safety device, an MTC device, an IoT device, a medical device, a fin-tech device (or financial device), a security device, a climate/environmental device, devices related to 5G services, or other devices related to fourth industrial revolution fields.

The second device 1620 may be a base station, a network node, a transmitting terminal, a receiving terminal, a wireless device, a wireless communication device, a vehicle, a vehicle equipped with an autonomous driving function, a connected car, a unmanned aerial vehicle, UAV), an Artificial Intelligence (AI) module, a robot, an Augmented Reality (AR) device, a Virtual Reality (VR) device, a Mixed Reality (MR) device, a hologram device, a public safety device, an MTC device, an IoT device, a medical device, a fin-tech device (or financial device), a security device, a climate/environmental device, devices related to 5G services, or other devices related to fourth industrial revolution fields.

For example, the UE may include a cellular phone, a smart phone, a laptop computer, a digital broadcasting terminal, a personal digital assistants (PDA), a portable multimedia player (PMP), a navigation, a slate PC, a tablet PC, an ultrabook, a wearable device such as a smartwatch, a smart glass, or a head mounted display (HMD)), a foldable device, etc. For example, the HMD may be a display device worn on a head. For example, an HMD may be used to implement the VR, AR, or MR.

For example, the UAV may be a flying object that is not ridden by people but that flies by radio control signals. For example, the VR device may include a device that implements an object or background in a virtual world. For example, the AR device may include a device that connects and implements the object or background in the real world to the object or background in a real world. For example, the MR device may include a device that fuses and implements the object or background in the virtual world with the object or background in the real world. For example, the hologram device may include a device for implementing a 360-degree stereoscopic image by recording and reproducing stereoscopic information by utilizing a phenomenon of interference of light generated by the two laser lights meeting with each other, called holography. For example, the public safety device may include a video relay device or a video device that may be worn by a body of a user. For example, the MTC device and the IoT device may be a device which does not require direct human intervention or manipulation. For example, the MTC device and the IoT device may include a smart meter, a vending machine, a thermometer, a smart bulb, a door lock, or various sensors. For example, the medical device may be a device used for diagnosing, treating, alleviating, treating, or preventing a disease. For example, the medical device may be a device used for diagnosing, treating, alleviating, or correcting an injury or disability. For example, the medical device may be a device used for inspecting, replacing, or modifying a structure or function. For example, the medical device may be a device used for controlling pregnancy. For example, the medical device may include a medical treatment device, a surgical device, an (in vitro) diagnostic device, a hearing aid or a (medical) procedure device, and the like. For example, the security device may be a device installed to prevent a risk that may occur and to maintain safety. For example, the security device may be a camera, a CCTV, a recorder, or a black box. For example, the fin-tech device may be a device capable of providing financial services such as mobile payment. For example, the fin-tech device may include a payment device or a point of sales (POS). For example, the climate/environmental device may include a device for monitoring or predicting a climate/environment.

The first device 1610 may include at least one processor, such as a processor 1611, at least one memory, such as a memory 1612, and at least one transceiver, such as a transceiver 1613. The processor 1611 may perform the functions, procedures, and/or methods described above. The processor 1611 may perform one or more protocols. The processor 1611 may perform one or more layers of a radio interface protocol. The memory 1612 may be connected to the processor 1611 and store various types of information and/or commands. The transceiver 1613 may be connected to the processor 1611 and controlled to transmit/receive a radio signal.

The second device 1620 may include at least one processor, such as a processor 1621, at least one memory, such as a memory 1622, and at least one transceiver, such as a transceiver 1623. The processor 1621 may perform the functions, procedures, and/or methods described above. The processor 1621 may implement one or more protocols. For example, the processor 1621 may implement one or more layers of the radio interface protocol. The memory 1622 may be connected to the processor 1621 and store various types of information and/or commands. The transceiver 1623 may be connected to the processor 1621 and controlled to transmit/receive a radio signal.

The memory 1612 and/or the memory 1622 may be each connected inside or outside the processor 1611 and/or the processor 1621 and connected to other processors through various techniques such as wired or wireless connection.

The first device 1610 and/or the second device 1620 may have one or more antennas. For example, an antenna 1614 and/or an antenna 1624 may be configured to transmit and receive the radio signal.

FIG. 17 illustrates another example of the block diagram of a wireless communication device to which the methods proposed in the present disclosure may be applied.

Referring to FIG. 17, a wireless communication system includes a base station 1710 and multiple UEs 1720 positioned within a region of the base station. The base station may be represented by a transmitting device and the UE may be represented by a receiving device, or vice versa. The base station and the UE include processors 1711 and 1721, memories 1714 and 1724, one or more Tx/Rx radio frequency (RF) modules 1715 and 1725, Tx processors 1712 and 1722, Rx processors 1713 and 1723, and antennas 1716 and 1726. The processor implements a function, a process, and/or a method which are described above. More specifically, a higher layer packet from a core network is provided to the processor 1711 in DL (communication from the eNB to the UE). The processor implements a function of an L2 layer. In the DL, the processor provides multiplexing between a logical channel and a transmission channel and allocation of radio resources to the UE 1720, and takes charge of signaling to the UE. The transmit (TX) processor 1712 implement various signal processing functions for an L1 layer (i.e., physical layer). The signal processing functions facilitate forward error correction (FEC) at the UE and include coding and interleaving. Encoded and modulated symbols are divided into parallel streams, each stream is mapped to an OFDM subcarrier, multiplexed with a reference signal (RS) in a time and/or frequency domain, and combined together by using inverse fast Fourier transform (IFFT) to create a physical channel carrying a time domain OFDMA symbol stream. An OFDM stream is spatially precoded in order to create multiple spatial streams. Respective spatial streams may be provided to different antennas 1716 via individual Tx/Rx modules (or transceivers, 1715). Each Tx/Rx module may modulate an RF carrier into each spatial stream for transmission. In the UE, each Tx/Rx module (or transceiver, 1725) receives a signal through each antenna 1726 of each Tx/Rx module. Each Tx/Rx module reconstructs information modulated with the RF carrier and provides the reconstructed information to the receive (RX) processor 1723. The RX processor implements various signal processing functions of layer 1. The RX processor may perform spatial processing on information in order to reconstruct an arbitrary spatial stream which is directed for the UE. When multiple spatial streams are directed to the UE, the multiple spatial streams may be combined into a single OFDMA symbol stream by multiple RX processors. The RX processor transforms the OFDMA symbol stream from the time domain to the frequency domain by using fast Fourier transform (FFT). A frequency domain signal includes individual OFDMA symbol streams for respective subcarriers of the OFDM signal. Symbols on the respective subcarriers and the reference signal are reconstructed and demodulated by determining most likely signal arrangement points transmitted by the base station. The soft decisions may be based on channel estimation values. The soft decisions are decoded and deinterleaved to reconstruct data and control signals originally transmitted by the base station on the physical channel. The corresponding data and control signals are provided to the processor 1721.

UL (communication from the UE to the base station) is processed by the base station 1710 in a scheme similar to a scheme described in association with a receiver function in the UE 1720. Each Tx/Rx module 1725 receives the signal through each antenna 1726. Each Tx/Rx module provides the RF carrier and information to the RX processor 1723. The processor 1721 may be associated with the memory 1724 storing a program code and data. The memory may be referred to as a computer readable medium.

In the present disclosure, a wireless device may be the base station, a network node, a transmitting terminal, a receiving terminal, a wireless device, a wireless communication device, a vehicle, a vehicle equipped with an autonomous driving function, a connected car, a unmanned aerial vehicle, UAV), an Artificial Intelligence (AI) module, a robot, an Augmented Reality (AR) device, a Virtual Reality (VR) device, an MTC device, an IoT device, a medical device, a fin-tech device (or financial device), a security device, a climate/environmental device, or other devices related to fourth industrial revolution fields or 5G services. For example, the UAV may be a flying object that is not ridden by people but that flies by radio control signals. For example, the MTC device and the IoT device as devices that do not require direct human intervention or manipulation may include a smart meter, a vending machine, a thermometer, a smart bulb, a door lock, or various sensors. For example, the medical device as a device used for the purpose of diagnosis, treatment, alleviation, therapy, or prevention of a disease or a device used for the purpose of inspecting, replacing, or modifying a structure or function may include a treatment equipment, a surgical device, an (in vitro) diagnostic device, a hearing aid, a procedure device, etc. For example, the security device as a device installed to prevent a risk that may occur and to maintain safety may include a camera, a CCTV, a black box, etc. For example, the fin-tech device as a device capable of providing financial services such as mobile payment may include a payment device, a point of sales (POS), etc. For example, the climate/environmental device may mean a device for monitoring or predicting a climate/environment.

In the present disclosure, the UE may include a cellular phone, a smart phone, a laptop computer, a digital broadcasting terminal, a personal digital assistants (PDA), a portable multimedia player (PMP), a navigation, a slate PC, a tablet PC, an ultrabook, a wearable device such as a smartwatch, a smart glass, or a head mounted display (HMD)), a foldable device, etc. For example, the HMD as a display device worn on the head may be used to implement AR or VR.

In the embodiments described above, the components and the features of the present disclosure are combined in a predetermined form. Each component or feature should be considered as an option unless otherwise expressly stated. Each component or feature may be implemented not to be associated with other components or features. Furthermore, the embodiment of the present disclosure may be configured by associating some components and/or features. The order of the operations described in the embodiments of the present disclosure may be changed. Some components or features of any embodiment may be included in another embodiment or replaced with the component and the feature corresponding to another embodiment. It is apparent that the claims that are not expressly cited in the claims are combined to form an embodiment or be included in a new claim by an amendment after the application.

The embodiments of the present disclosure may be implemented by various means, e.g., hardware, firmware, software, or combinations thereof. In the case of implementation by hardware, according to hardware implementation, the exemplary embodiment described herein may be implemented by using one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

In the case of implementation by firmware or software, an embodiment of the present disclosure may be implemented in the form of a module, a procedure, a function, and the like to perform the functions or operations described above. A software code may be stored in the memory and executed by the processor. The memory may be positioned inside or outside the processor and may transmit and receive data to/from the processor by already various means.

It is apparent to those skilled in the art that the present disclosure may be embodied in other specific forms without departing from essential characteristics of the present disclosure. Accordingly, the aforementioned detailed description should not be construed as restrictive in all terms and should be considered to be exemplary. The scope of the present disclosure should be determined by rational construing of the appended claims and all modifications within an equivalent scope of the present disclosure are included in the scope of the present disclosure.

The invention claimed is:

1. A method for transmitting, by a user equipment (UE), uplink data in a wireless communication system supporting a NarrowBand-Internet of things (NB-IoT) system, the method comprising:

receiving, from a base station, configuration information related to a Preconfigured Uplink Resource (PUR) for transmitting uplink data; and transmitting, to the base station, the uplink data using the PUR, wherein the uplink data is transmitted in an RRC idle state, wherein the PUR is a dedicated resource and the transmission of the uplink data is performed or skipped,
wherein the transmission of the uplink data is performed based on a timing alignment validation which is related to a timing alignment value for the transmission of the uplink data using the PUR,
wherein the timing alignment validation is performed based on a time alignment timer and at least one threshold related to a Narrowband Reference Signal Received Power (NRSRP) which are configured by the base station,
wherein, based on i) the time alignment timer running and ii) a NRSRP fulfilling a condition based on the at least one threshold related to the NRSRP, the timing alignment value for the transmission of the uplink data using the PUR is determined to be valid,
wherein a number of times of a consecutive skipping of the transmission of the uplink data is counted and compared with a number of times configured by the base station, and
wherein, based on the number of times of the consecutive skipping of the transmission of the uplink data being equal to the number of times configured by the base station, the PUR is released.

2. The method of claim 1, wherein, based on the PUR being released, information representing the release is transmitted in a PUR subsequent to a PUR in which the skipping of the transmission of the uplink data is last performed.

3. The method of claim 1, wherein, based on the skipping of the transmission of the uplink data being performed, skip related information representing the skipping is transmitted.

4. The method of claim 3, wherein the skip related information is transmitted in a region of the PUR.

5. The method of claim 4, wherein the skip related information includes information for a number of times related to the skipping and is transmitted only once based on the skipping of the transmission of the uplink data being consecutively performed for a multiple number of times.

6. The method of claim 5, wherein in a resource region corresponding to the skipping of the multiple number of times among resource regions according to the PUR, uplink data of another UE in the RRC idle state is transmitted.

7. The method of claim 1,
wherein the transmitting of the uplink data further includes receiving a narrowband physical downlink control channel (NPDCCH) in the RRC idle state, and
wherein the narrowband physical downlink control channel (NPDCCH) includes information representing disable of the skipping of the transmission of the uplink data.

8. The method of claim 7, wherein, based on the skipping being disabled, a particular signal is transmitted in the PUR.

9. The method of claim 8, wherein the particular signal is a signal for tracking of the timing alignment value for the transmission of the uplink data using the PUR related to a transmission timing of the uplink data or a signal related to confirmation of setting or release of the PUR.

10. A user equipment (UE) for transmitting uplink data in a wireless communication system supporting a NarrowBand-Internet of things (NB-IoT) system, the UE comprising:
a transceiver transceiving a radio signal;
a memory; and
a processor connected to the transceiver and the memory,
wherein the processor is configured to:
receive, from a base station, configuration information related to a Preconfigured Uplink Resource (PUR) for transmitting uplink data; and
transmit, to the base station, the uplink data using the PUR, wherein the uplink data is transmitted in an RRC idle state, and
wherein the PUR is a dedicated resource and the transmission of the uplink data is performed or skipped,
wherein the transmission of the uplink data is performed based on a timing alignment validation which is related to a timing alignment value for the transmission of the uplink data using the PUR,
wherein the timing alignment validation is performed based on a time alignment timer and at least one threshold related to a Narrowband Reference Signal Received Power (NRSRP) which are configured by the base station,
wherein, based on i) the time alignment timer running and ii) a NRSRP fulfilling a condition based on the at least one threshold related to the NRSRP, the timing alignment value for the transmission of the uplink data using the PUR is determined to be valid,
wherein a number of times of a consecutive skipping of the transmission of the uplink data is counted and compared with a number of times configured by the base station, and
wherein, based on the number of times of the consecutive skipping of the transmission of the uplink data being equal to the number of times configured by the base station, the PUR is released.

11. A base station for receiving uplink data in a wireless communication system supporting a NarrowBand-Internet of things (NB-IoT) system, the base station comprising:
a transceiver transceiving a radio signal;
a memory; and
a processor connected to the transceiver and the memory,
wherein the processor is configured to:
transmit, to a user equipment (UE), configuration information related to a Preconfigured Uplink Resource (PUR) for transmitting uplink data; and
receive, from the UE, the uplink data using the PUR, wherein the uplink data is transmitted in an RRC idle state, and
wherein the PUR is a dedicated resource and the transmission of the uplink data is performed or skipped,
wherein the transmission of the uplink data is performed based on a timing alignment validation which is related to a timing alignment value for the transmission of the uplink data using the PUR,
wherein the timing alignment validation is performed based on a time alignment timer and at least one threshold related to a Narrowband Reference Signal Received Power (NRSRP) which are configured by the base station,
wherein, based on i) the time alignment timer running and ii) a NRSRP fulfilling a condition based on the at least one threshold related to the NRSRP, the timing alignment value for the transmission of the uplink data using the PUR is determined to be valid,
wherein a number of times of a consecutive skipping of the transmission of the uplink data is counted and compared with a number of times configured by the base station, and wherein, based on the number of times of the consecutive skipping of the transmission of the uplink data being equal to the number of times configured by the base station, the PUR is released.

* * * * *